US005790853A

United States Patent [19]
Nomura et al.

[11] Patent Number: 5,790,853
[45] Date of Patent: Aug. 4, 1998

[54] WORKSPACE MANAGEMENT APPARATUS

[75] Inventors: Takahiko Nomura; Koichi Hayashi; Tan Hazama, all of Kanagawa, Japan

[73] Assignee: Fuji Xerox Co., Ltd., Tokyo, Japan

[21] Appl. No.: 575,249

[22] Filed: Dec. 20, 1995

[30] Foreign Application Priority Data

Dec. 22, 1994 [JP] Japan .................................. 6-320466
Dec. 20, 1995 [JP] Japan .................................. 7-331779

[51] Int. Cl.$^6$ ........................................................ G06F 9/00
[52] U.S. Cl. ........................ 395/674; 395/682; 395/181; 395/183.2
[58] Field of Search .................................. 395/672, 673, 395/674, 800, 183.2, 181

[56] References Cited

U.S. PATENT DOCUMENTS

| | | | |
|---|---|---|---|
| 5,214,778 | 5/1993 | Glider et al. | 395/181 |
| 5,361,347 | 11/1994 | Glider et al. | 395/183.2 |
| 5,394,521 | 2/1995 | Henderson, Jr. et al. | |
| 5,442,791 | 8/1995 | Wrabetz et al. | 395/674 |
| 5,481,698 | 1/1996 | Itoh et al. | 395/185.01 |
| 5,574,914 | 11/1996 | Hancock et al. | 395/561 |

FOREIGN PATENT DOCUMENTS

| | | |
|---|---|---|
| A-60-108975 | 6/1985 | Japan . |
| A-5-35737 | 2/1993 | Japan . |
| B2-5-81938 | 11/1993 | Japan . |

OTHER PUBLICATIONS

ACM Transactions On Graphics, vol. 5, no. 3, Jul. 1986, "Rooms: The Use of Multiple Virtual Workspace to Reduce Space Contention in a Window–Based Graphical User Interface", D. Austin Henderson, Jr. et al., pp. 211–243.

Rooms For Windows (1993), no. N68M, Fuji Xerox, pp. 1–15.

Tabworks (HTTP://www.xerox.com/Xsoft/DataSheets/TabWorks.html).

The Complete Hypercard Handbook, Bantam Books (1987), Danny Goodman, pp. 17–63.

In Concert, Desktop Guide, Xerox, Software release 2.6.3, pp. 5.1–7.11.

Lotus Notes Release 3J, "Application Development Reference", pp. 1.1–4–11.

*Primary Examiner*—Majid A. Banankhan
*Attorney, Agent, or Firm*—Oliff & Berridge, PLC

[57] ABSTRACT

A workspace management section collects resources related to a job and manages them as a workspace separately from resource management of a primary resource management section. The workspace has resource administration information as job relevant information, area information on a display screen, a base image, etc. A program can define the area information together with areas on the screen. A workspace display section superposes icons corresponding to the resources on the base image for display. The icons can be moved by a resource placement section. When an icon is moved to a different area, a job support processing execution section executes a program defined corresponding to the area to which the icon is moved, whereby different meanings can be imparted to the same resource depending on the area in which the corresponding icon is placed.

18 Claims, 44 Drawing Sheets

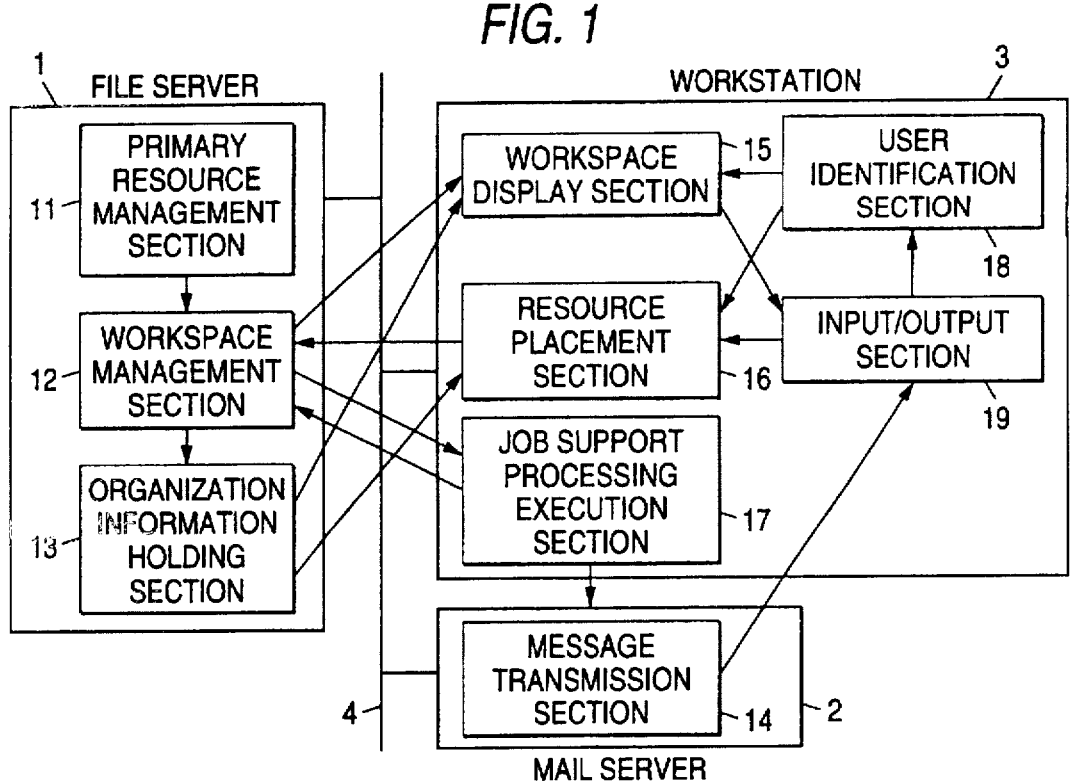

| | | |
|---|---|---|
| RESOURCE NAME | : | RESEARCH REPORT |
| RESOURCE TYPE | : | DOCUMENT |
| CREATOR | : | DOI |
| CREATION DATE AND TIME | : | 93/12/10   13:30 |
| APPLICATION | : | WORD PROCESSOR |

| | | |
|---|---|---|
| WORKSPACE NAME | : | REPORT WRITING |
| BASE IMAGE | : | (IMAGE IN FIG. 6) |
| RESOURCE LIST | : | (SEE EXAMPLE IN FIG. 7) |
| AREA INFORMATION LIST | : | (SEE EXAMPLES IN FIG. 9 & 10) |
| WORKSPACE ID | : | /workspaces/report writing |
| DEFAULT DIR | : | /resources/system dept./report draft/ |

FIG. 6

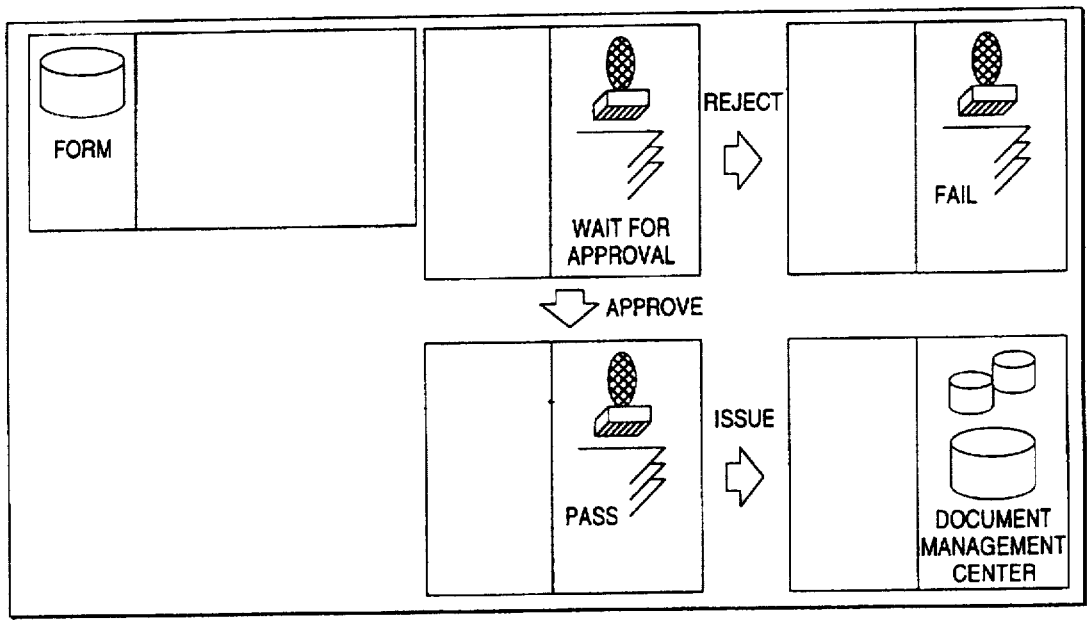

FIG. 7

| | | | |
|---|---|---|---|
| 1 | RESOURCE NAME | : | BUSINESS TRIP REPORT |
| | REFERENCE RESOURCE | : | resources/document management center/form/business trip report |
| | ALLOCATION POSITION | : | (x1, y1) |
| | AREA | : | a |
| 2 | RESOURCE NAME | : | RESEARCH REPORT |
| | REFERENCE RESOURCE | : | resources/document management center/form/research report |
| | ALLOCATION POSITION | : | (x2, y2) |
| | AREA | : | a |
| 3 | RESOURCE NAME | : | AOKI1 |
| | REFERENCE RESOURCE | : | resources/system research dept./research report draft/Aoki1 |
| | ALLOCATION POSITION | : | (x3, y3) |
| | AREA | : | b |

FIG. 9

1. AREA ID : a
   POSITION : (a1, a2) (a3, a4)
   DISPLAY RIGHT : ALL PERSONS
   PLACEMENT RIGHT : DOCUMENT MANAGEMENT CENTER MEMBERS
   PROGRAM :

2. AREA ID : b
   POSITION : (b1, b2) (b3, b4)
   DISPLAY RIGHT : RESOURCE CREATOR
   PLACEMENT RIGHT : ALL PERSONS
   PROGRAM :

3. AREA ID : c
   POSITION : (c1, c2) (c3, c4)
   DISPLAY RIGHT : RESOURCE CREATOR OR CREATOR'S SUPERIOR
   PLACEMENT RIGHT : RESOURCE CREATOR
   PROGRAM : send-mail
   (MAIL NAME: REQUEST FOR REPORT APPROVAL
   TRANSMISSION SOURCE: #work space
   DESTINATION: #placed resource creator's superior
   MESSAGE: I REQUEST YOU TO APPROVE THE REPORT)

4. AREA ID : d
   POSITION : (d1, d2) (d3, d4)
   DISPLAY RIGHT : RESOURCE CREATOR OR CREATOR'S SUPERIOR
   PLACEMENT RIGHT : RESOURCE CREATOR'S SUPERIOR
   PROGRAM : send-mail
   (MAIL NAME: REPORT APPROVAL RESULT
   TRANSMISSION SOURCE: #work space
   DESTINATION: #placed resource creator
   MESSAGE: I HAVE APPROVED YOUR REPORT)

FIG. 10

```
5  AREA ID         : e
   POSITION        : (e1, e2)  (e3, e4)
   DISPLAY RIGHT   : RESOURCE CREATOR OR CREATOR'S SUPERIOR
   PLACEMENT RIGHT : RESOURCE CREATOR'S SUPERIOR
   PROGRAM         : send-mail
                     (MAIL NAME: REPORT APPROVAL RESULT
                      TRANSMISSION SOURCE: #workspace
                      DESTINATION: #placed resource creator
                      MESSAGE: I HAVE REJECTED YOUR REPORT)

6  AREA ID         : f
   POSITION        : (f1, f2)  (f3, f4)
   DISPLAY RIGHT   : RESOURCE CREATOR OR CREATOR'S SUPERIOR
   PLACEMENT RIGHT : RESOURCE CREATOR OR CREATOR'S SUPERIOR
   PROGRAM         : store-resource
                     (TO BE STORED: #placed resource
                      TO BE STORED IN: resources/document management center/
                                       issuance report)
```

FIG. 11

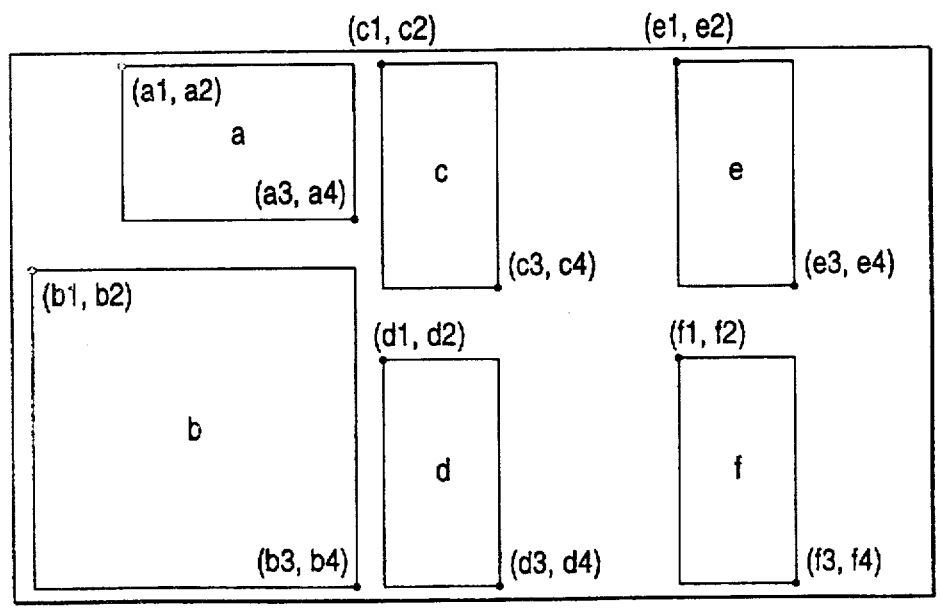

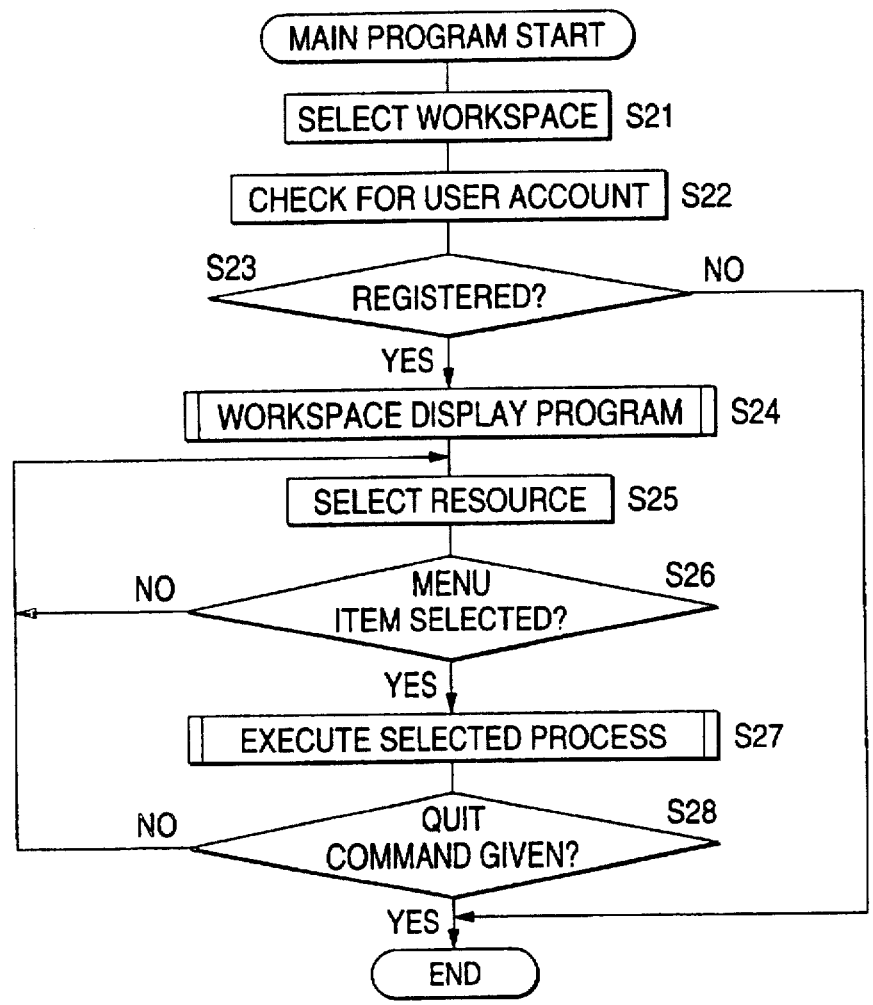

(root)/
    resources/
        system research department/
            report drafts/
                Aoki1
            patent drafts/
        document management center/
            forms/
                bisiness trip reports/
                research reports
            issuance reports/
            applied patents/

| Mail reader (Chiba) | QUIT |
|---|---|
| Transmission date and time: 94/5/11  10:30 Transmission source: /workspaces/report writing Destination: Chiba Mail name: Request for report approval Message:     I request you to approve the report. | |

```
(root)/
    resources/
        system research department/
            report drafts/
            patent drafts/
        document management center/
            forms/
                bisiness trip reports/
                research reports
            issuance reports/
                Aoki1
            applied patents/
```

FIG. 30

| TYPE | : | SCHEDULE |
|---|---|---|
| START DATE AND TIME | : | 94/5/4    9:00 |
| END DATE AND TIME | : | 94/5/12   12:00 |

| TYPE | : | SCHEDULE |
|---|---|---|
| START DATE AND TIME | : | 94/5/14   9:00 |
| END DATE AND TIME | : | 94/5/16   17:30 |

| TYPE | : | RESULT |
|---|---|---|
| START DATE AND TIME | : | 94/5/9    9:00 |
| END DATE AND TIME | : | 94/5/9    17:30 |

| TYPE | : | RESULT |
|---|---|---|
| START DATE AND TIME | : | 94/5/12   9:00 |
| END DATE AND TIME | : | 94/5/12   12:00 |

| TYPE | : | RESULT |
|---|---|---|
| START DATE AND TIME | : | 94/5/14   13:00 |
| END DATE AND TIME | : | 94/5/14   17:30 |

FIG. 31

| WORKSPACE ID | : | /workspaces/prior art survey |
|---|---|---|
| RECORD DATE AND TIME | : | 94/5/12  10:00 |
| BASE IMAGE | : | (BASE IMAGE AT THE RECORD DATE AND TIME) |
| RESOURCE LIST | : | (RESOURCE LIST AT THE RECORD DATE AND TIME) |
| MESSAGE | : | SURVEY COMPLETION |

| WORKSPACE ID | : | /workspaces/prior art survey |
|---|---|---|
| RECORD DATE AND TIME | : | 94/5/14  13:00 |
| BASE IMAGE | : | (BASE IMAGE AT THE RECORD DATE AND TIME) |
| RESOURCE LIST | : | (RESOURCE LIST AT THE RECORD DATE AND TIME) |
| MESSAGE | : | SURVEY 2 IS STARTED |

| WORKSPACE ID | : | /workspaces/prior art survey |
|---|---|---|
| RECORD DATE AND TIME | : | 94/5/11  10:00 |
| BASE IMAGE | : | (BASE IMAGE AT THE RECORD DATE AND TIME) |
| RESOURCE LIST | : | (RESOURCE LIST AT THE RECORD DATE AND TIME) |
| MESSAGE | : | WRITING COMPLETION |

| WORKSPACE ID | : | /workspaces/prior art survey |
|---|---|---|
| RECORD DATE AND TIME | : | 94/5/11  14:00 |
| BASE IMAGE | : | (BASE IMAGE AT THE RECORD DATE AND TIME) |
| RESOURCE LIST | : | (RESOURCE LIST AT THE RECORD DATE AND TIME) |
| MESSAGE | : | PATENT 1 IS STARTED |

FIG. 37

| | | |
|---|---|---|
| 1 | AREA ID           : | a |
|   | POSITION          : | (a1, a2)  (a3, a4) |
|   | DISPLAY RIGHT     : | RESOURCE CREATOR |
|   | PLACEMENT RIGHT:    | RESOURCE CREATOR |
|   | PROGRAM           : | record-workspace<br>(MASSAGE: (# PLACEMENT RESOUECE NAME) IS |

| | | |
|---|---|---|
| 2 | AREA ID           : | b |
|   | POSITION          : | (b1, b2)  (b3, b4) |
|   | DISPLAY RIGHT     : | RESOURCE CREATOR |
|   | PLACEMENT RIGHT:    | RESOURCE CREATOR |
|   | PROGRAM           : | |

| | | |
|---|---|---|
| 3 | AREA ID           : | c |
|   | POSITION          : | (c1, c2)  (c3, c4) |
|   | DISPLAY RIGHT     : | RESOURCE CREATOR |
|   | PLACEMENT RIGHT:    | RESOURCE CREATOR |
|   | PROGRAM           : | |

| | | |
|---|---|---|
| 4 | AREA ID           : | d |
|   | POSITION          : | (d1, d2)  (d3, d4) |
|   | DISPLAY RIGHT     : | RESOURCE CREATOR |
|   | PLACEMENT RIGHT:    | RESOURCE CREATOR |
|   | PROGRAM           : | store-resource<br>(AREA: a<br>  MOVE DESTINATION: /RESOURCES/PRIMARY HOLDING<br>                              /WORK AREA)<br>store-resource<br>(AREA: c<br>  MOVE DESTINATION: /RESOURCES/PRIMARY HOLDING<br>                              /REFERENCE AREA) |

| | | |
|---|---|---|
| 5 | AREA ID : | e |
| | POSITION : | (e1, e2)  (e3, e4) |
| | DISPLAY RIGHT : | RESOURCE CREATOR |
| | PLACEMENT RIGHT : | RESOURCE CREATOR |
| | PROGRAM : | record-workspace<br>(MESSAGE: SURVEY COMPLETION)<br>store-resource<br>(AREA: a<br> MOVE DESTINATION: /RESOURCES/DOCUMENT<br>                                              MANAGEMENT CENTER/SURVEY<br>                                              RESULT)<br>delete-resource<br>(AREA: c) |

FIG. 47

| WORKSPACE NAME | ROUTINE PROCESSING WORKSPACE |
|---|---|
| BASE IMAGE | null |
| JOF DEF. INFO. | (SEE FIG. 48) |
| RESOURCE LIST | (SEE FIG. 50) |
| WORKSPACE DIR. | /workspace/routine.job |

FIG. 48

| INFLOW RESOURCE COND. | #REFERENCE TYPE: FORM |
|---|---|
| OUTFLOW RESOURCE COND. | #REFERENCE TYPE: FORM |
| WS COND. FOR ENABLING INFLOW | null |
| WS COND. FOR ENABLING OUTFLOW | null |
| AREA INFO. LIST | (SEE FIG. 49) |
| JOB-SUPPORT PROCESSING PROGRAM AT INFLOW TIME | if (#resource name == "question*") then {<br>    send-mail    (mail name: Question<br>                  source: Routine Processing workspace<br>                  destination: Aoki,<br>                  message: Question about #resource name from #creator);<br>    change-attr    (resource: #resource name,<br>                    assigned area: Acceptance box<br>else {<br>    send-mail    (mail name: Request for processing #resource name,<br>                  source: Routine Processing workspace<br>                destination: Aoki,<br>                message: Request for #resource name from #creator);<br>    change-attr    (resource: #resource name,<br>                  processing state: Reception box area);} |
| JOB SUPPORT PROCESSING PROGRAM AT OUTFLOW | null |

FIG. 49

| AREA NAME | ACCEPTANCE BOX |
|---|---|
| POSITION IN WS | (5, 30) |
| RESOURCE CONDITION FOR ENABLING INFLOW | #REFERENCE TYPE: FORM |
| RESOURCE CONDITION FOR ENABLING OUTFLOW | null |
| AREA CONDITION FOR ENABLING INFLOW | INFLOW OR VARIOUS FORMAT AREA |
| AREA CONDITION FOR ENABLING OUTFLOW | PROCESSING AREA |
| JOB-SUPPORT PROCESSING PROGRAM AT INFLOW | send-mail (mail name: Acceptance notification of #resource name, source: Routine processing ws, destination: Suzuki, message: Resource has been accepted.); |
| JOB-SUPPORT PROCESSING PROGRAM AT OUTFLOW | send-mail (mail name: Processing start notification of #resource name, source: Routine processing ws, destination: #creator, message: Processing has been accepted.); |

FIG. 50

| REFERENCE NAME | GOING-OUT AND TRAVEL EXPENSE FORM |
|---|---|
| REFERENCE TYPE | FORM |
| ASSIGNED AREA | VARIOUS FORMAT AREA |
| APPROVAL | null |
| PLACEMENT POSITION | (12, 7) |
| CREATOR | AOKI |
| REFERENCE RESOURCE DIR | /resources/form/going-out and travel expenses |
| STARTED APPLICATION | /resources/bin/TextEdit |

| | |
|---|---|
| ☐ VARIOUS FORMAT AREA | INFLOW/OUTFLOW PROPATIES |
| INFLOW RESOURCE COND. | REFERENCE TYPE: FORM |
| FROM AREA COND. | |
| PROCESSING PROGRAM | |
| OUTFLOW RESOURCE COND. | REFERENCE TYPE: FORM |
| TO AREA COND. | |
| PROCESSING PROGRAM | COPY DOCUMENT FOR OUTFLOW AND CAUSE THE COPY TO FLOW OUT |

WORKSPACE MANAGEMENT APPARATUS

BACKGROUND OF THE INVENTION

1. Field of the Invention

The present invention relates to an information processing system for managing resources such as documents, electronic mail, application programs, and input/output units required for executing jobs.

2. Description of the Related Art

Nowadays, various office jobs can be executed by using information machines such as personal computers and workstations. The resources such as documents, electronic mail, application programs, and input/output units are managed with a file system, database, etc.

It is effective on smoothly advancing jobs to collect a necessary document set and tools for each job. Hierarchical directories and desktops are known as conventional arts for systematically arranging the resources that can be handled by the information machines.

The hierarchical directories are adopted by file systems of operating systems such as UNIX (registered trademark) and MS-DOS (registered trademark), for example. The user can hold information together in directory units, and further put a plurality of directories into a hierarchical structure. The information machine adopting the hierarchical directories enables the user to create directories corresponding to jobs and store related resources in the directories.

However, the file systems of UNIX, MS-DOS, etc., simply show individual resources stored in the directories for the user as a filename list. Thus, it is difficult for the user to understand through intuition what types of resources are used in jobs.

Then, an information management method called a desktop has been developed by Star (trade name) of Xerox. FIGS. 61A and 61B are illustrations of the desktop. The desktop holds a personal work environment and provides a two-dimensional plane with the top of a desk as a metaphor as shown in FIG. 61A. The resources related to the jobs are placed on the two-dimensional plane as graphics called icons corresponding to the types. In FIG. 61A, data such as documents, a folder for combining documents, peripheral machines such as a printer, application programs, references, etc., are placed as symbols that the user easily understands through intuition. In addition, tools such as a clock and a calculator and other resources are placed. The user can place the icons on the desktop in positions appropriate for his or her jobs as he or she desires.

Further, in Star, an icon called a reference can be created and placed on the desktop to access the resources managed by a distributed file system called a file server. An alias can be assigned to a shared resource in response to a personal need by the reference function.

Although one desktop was provided for one person as a personal work environment at the beginning, a system for providing more than one two-dimensional plane for placing resources has also been developed. Macintosh (registered trademark) of Apple and Rooms (registered trademark) of Xerox are known as systems provided by such a conventional art.

In Macintosh of Apple, the art is applied to a file system with hierarchical directories. A two-dimensional plane called a folder corresponding to each directory is managed and the resources held in the directory can be placed thereon. For example, if the folder in FIG. 61A is opened, additional display of a two-dimensional plane as shown in FIG. 61B can be provided.

In Rooms of Xerox, a desktop called a room can be defined for each job. The room is provided not only for systematically arranging resources, but also for managing the application execution state. The user can move to a room for another job with the current application state held in each room.

To use more than one environment for more than one job or hand a job over to another person, it becomes necessary for the user to image or understand the structure and nature of the job to execute in the environment. The above-mentioned directories and desktops can be an aid in making the user understand the job structure by devising resource-proper information such as the names and types of resources, placement on each two-dimensional plane, and the hierarchical structure with reference to other directories and desktops. For example, suitable names can be given to the resources and the closely related resources are placed near. However, how the resources are handled or what relation exists between the resources in a specific job cannot simply be represented only by the placement and names of the resources or the hierarchical structure of the directories and folders.

Another conventional art for supporting jobs includes work flow management systems such as LotusNotes (registered trademark) of Lotus and InConcert of Xerox. The work flow management system is a system for supporting jobs by automatically describing and deforming documents in accordance with a predetermined job flow.

In LotusNotes, a program embedded in a document is executed, whereby automatic processing is performed. That is, a job flow is distributed and described inside each document. In InConcert, a job flow is represented outside a document. A procedure for distributing a necessary document set to necessary persons in each step of a job can be programmed. The techniques are not those wherein the structure and state of a job are shown for the user in an easy-to-understand manner by imparting meaning to each element of a document set from the viewpoint of the job.

A conventional art that can present the information structure in a job to the user in an easy-to-understand manner is described, for example, in Unexamined Japanese Patent Publication (kokai) No. Sho 60-108975, wherein the user uses his finger or a pointing device to specify a predetermined area of a sketch image present ad to the user, whereby another sketch image or a computer resource such as a document related to the area can be presented to the user. FIGS. 62A and 62B are illustrations of an Example of a display screen of a conventional information processing system using sketches. As shown in FIG. 62A, for example, a sketch modeled after a view of the entire office having a desk and a cabinet is displayed. If the user specifies a drawing area of the cabinet on the display screen, a sketch modeled after the inside of the drawing is displayed as shown in FIG. 62B. Further, as the user specifies a predetermined area in the sketch, he or she can obtain the final document information. Since the art enables the user to define sketches as he or she desires, the job structure can be represented appropriately. The card-type information system typified by HyperCard of Apple widely used in recent years is also a system using an information retrieval technique with sketches.

The system with sketches and the desktop system with placement of icons are the same in that the user can access the computer resources by specifying graphics and differ in that the former system contains separately a defining mode of sketches and the relation between the areas on the sketch and the resources and a resource retrieval mode using the defined sketches and relation. In the sketch definition mode, the user can define sketches as he or she desires and therefore can represent the information structure most suitable for his or her own job. In the retrieval mode, sketch change is not allowed, whereby consistency in the job structure can be maintained. In the system with icons, the mode is not separated and the user cannot define the icon graphics freely, but can move or delete the icons on the desktop at any time.

Not only the contents, but also the locations of resources such as documents have important meaning. Particularly, the resources used for a job are not adventitiously located and are collected together with other resources related to the job, occupying a part of a flow of the job. In other words, when the job is executed, a role and meaning are imparted to each element of the resource set from the viewpoint of the job.

For example, in a survey job, to create a survey result report, other relevant information documents are referenced. In this case, the survey result report is a resource output from the job and any other information is input resources to the job. It can be expected that imparting of meaning to such a resource set from the viewpoint of the job is presented to the user together with the resource set to aid in the user's understanding of the flow and state of the job.

Such imparting of meaning to the resources is possible for each job and cannot previously be standardized. In the same job, meaning imparted to the resources varies with the job progress. For example, a purchase request before approved has different meaning from the request after approved although they are the same resource. Further, the resource set also varies with resource generation, deletion, move, etc.

Further, it is necessary to be able to describe different meanings for the same resource from the worker difference and job difference. For example, a survey request is an input resource for a survey department when executing a job, but an output resource for other departments such as a merchandise development department.

However, the method with icons enables the user to change only the positions and names of the icons freely for each job; it is insufficient to represent the job structure. The method with sketches enables the user to impart meanings to resources freely by using an image representing the job structure in the sketch image definition mode. However, in the retrieval mode actually using the meaning imparted to the resources, the user cannot change the resource meaning appropriately in accordance with the job progress.

On the other hand, it is very important to manage the relation between resources such as documents and the date and time for carrying out a job. The relation between the resources and the date and time is also important from standpoints of a schedule and past job records. Particularly in recent years, the information amount has become enormous and it has become extremely difficult to classify and systematically arrange information; attention is given to an information retrieval system using a time axis. For example, an organization method based on arranging of information in time sequence is proposed in Yukio NOGUCHI, "Choseirihou," Chuoukouronsha, 1993.

A conventional art for presenting the relation between resources and the date and time for the user is described, for example, in Unexamined Japanese Patent Publication (kokai) No. Hei 5-35737, etc., wherein document icons are placed on a calendar from which document data can be retrieved. The art has the advantage that without directly specifying the date and time for retrieving a document, the user can use a document icon displayed on the calendar to get information on an increase in and type change of documents for a rough period and make reference to the information for a retrieval from his or her somewhat vague memory.

By the way, the object to be managed for carrying out a job is essentially the job itself and not resources contained in the job. However, in the art for placing the document icons on the calendar, management cannot be executed in job units and only indirect management means using relevant document resources, etc., is provided.

The resources which became required in a job are often stored in relation to the job. For example, the user may remember that he or she referenced a document in execution of some job at some time although he or she forgets the document name. However, in the art for placing the document icons on the calendar, only the relation between the calendar and resources is held and information cannot be retrieved based on such vague memory about the job.

SUMMARY OF THE INVENTION

It is therefore an object of the invention to provide an information processing system which manages resources related to a specific job as a set for supporting job execution. Meaning reflecting the job structure can be imparted to the resource set related to the job as desired and the meaning can be changed appropriately with progress of the job.

It is another object of the invention to provide an information processing system which manages a resource set related to a job in relation to the time for enabling time axis management of the job itself and enables the user to retrieve a resource from his or her vague memory about jobs and the time.

An information processing system according to the present invention is comprised of; a resource reference information storage section for storing resource reference information for referring to a resource used for making progress of a job; a resource administration information storage section for storing resource administration information indicating a state of the resource responsive to progress of the job in relation to the resource reference information; a resource condition storage section for storing a resource condition which is a condition for enabling resource reference information to be added to or deleted from the resource reference information storage section; a resource reference information change instruction section for instructing the resource reference information storage section to add or delete the resource reference information; a resource reference information change determination section for determining whether or not the resource reference information can be added to or deleted from the resource reference information storage section based on the resource condition stored in the resource condition storage section and the instruction given by the resource reference information change instruction section; and a resource reference information change section for adding or deleting resource reference information if the resource reference information change determination section determines that resource reference information can be added or deleted.

In addition, an information processing system according to the present invention is comprised of a resource reference information storage section for storing resource reference information for referring to a resource used for making progress of a job; a resource administration information storage section for storing resource administration information indicating a state of the resource responsive to progress of the job in relation to the resource reference information; a resource condition storage section for storing a resource condition which is a condition for enabling change of the resource administration information stored in the resource administration information storage section; a resource administration information change instruction section for instructing the resource administration information storage section to change the resource administration information; a resource administration information change determination section for determining whether or not the resource administration information stored in the resource administration information storage section can be changed based on the resource condition stored in the resource condition storage section and the instruction issued by the resource administration information change instruction section; and a resource administration information change section for changing the resource administration information if the resource administration information change instruction section; and determines that the resource administration information can be changed.

Further, an information processing system according to the present invention is comprised of: a primary resource management section using resource proper information indicating attributes of resources existing in a computer system for managing the resources; a plurality of workspace management section each for managing resource reference information for referring to the resources which are managed by the primary resource management section and used to make progress of a job, and for managing resource administration information related to the resource reference information and indicating the resource state responsive to progress of the job; and a job progress section for changing at least one of the resource reference information and the resource administration information to make progress of the job.

The information processing system according to the present invention is capable of managing resources related to a specific job as a set for supporting job execution. Meaning reflecting the job structure can be imparted to the resource set related to the job as desired and the meaning can be changed appropriately with progress of the job.

Further, the information processing system according to the present invention is capable of managing a resource set related to a job in relation to the time for enabling time axis management of the job itself and enables the user to retrieve a resource from his or her vague memory about jobs and the time.

BRIEF DESCRIPTION OF THE DRAWING

In the accompanying drawings:

FIG. 1 is a block diagram showing a first embodiment of an information processing system of the invention;

FIG. 2 is an illustration of an example of a directory structure;

FIG. 6 is an illustration of an example of a base image in the first embodiment of the information processing system of the invention;

FIG. 7 is an illustration of an example of resource administration information in the first embodiment of the information processing system of the invention;

FIGS. 9 is an illustration of an example of area information in the first embodiment of the invention;

FIGS. 10 is an illustration of an example of area information in the first embodiment of the invention (continued);

FIG. 11 is an illustration of an example of area data in the first embodiment of the invention;

FIG. 12 in an illustration of an example of department information in the first embodiment of the information processing system of the invention;

FIG. 13 is a flowchart showing an example of the operation in the first embodiment of the information processing system of the invention;

FIG. 30 is an illustration of an example of date and time information;

FIG. 31 is an illustration of an example of record information;

FIG. 37 is an illustration of area information in the second embodiment of the invention;

FIG. 47 is an illustration of an example of a data structure of job relevant information in the third embodiment of the information processing system of the invention;

FIG. 48 is an illustration of an example of a data structure of job definition information in the third embodiment of the information processing system of the invention;

FIG. 49 is an illustration of an example of a data structure of area information in the job definition information in the third embodiment of the information processing system of the invention;

FIG. 50 is an illustration of an example of a data structure of resource administration information in the third embodiment of the information processing system of the invention;

PREFERRED EMBODIMENTS OF THE INVENTION

Figures 3, 4, 5:
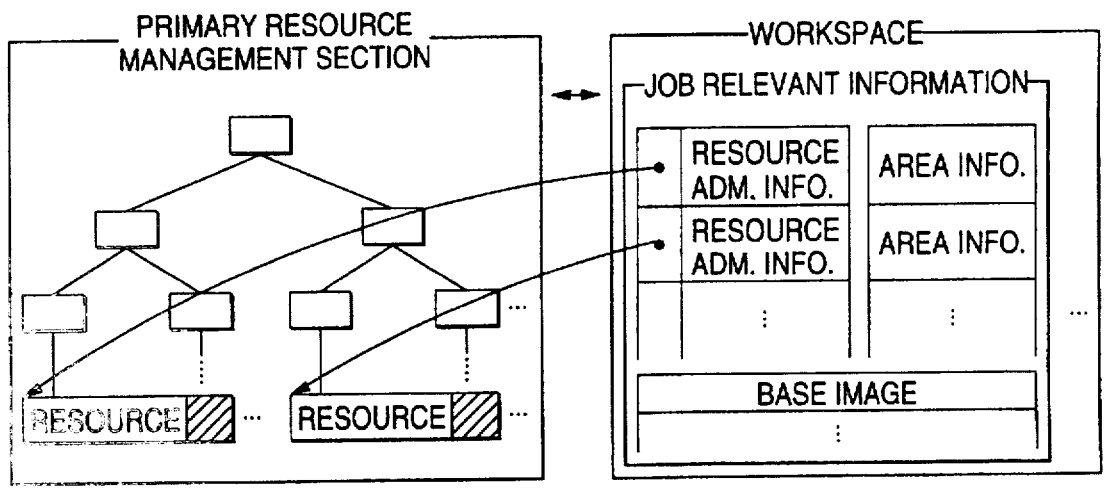
FIG. 3 is an illustration of an example of resource proper information.
FIG. 4 is a conceptual drawing of the relation between primary resources and a workspace in the first embodiment of the information processing system of the invention.
FIG. 5 is an illustration of an example of the data structure of job relevant information in the first embodiment of the information processing system of the invention.

Referring now to the accompanying drawings, there are shown preferred embodiments of the invention.

FIG. 1 is a block diagram showing of an information processing system of a first embodiment of the invention, wherein reference numeral 1 represents a file server; 2, a mail server; 3, a workstation; 4, a network; 11, a primary resource management section; 12, a workspace management section; 13, an organization information holding section; 14, a message transmission section; 15, a workspace display section; 16, a resource placement section; 17, a job support processing execution section; 18, a user identification section; and 19, an input/output section. In the description to follow, job relevant resource reference units are called workspaces. The arrow in FIG. 1 represents a flow of information.

In the embodiment, the workstation 3 for executing personal work and the file server 1 and the mail server 2 for handling shared information are connected by the network 4 as an example. However, such a configuration is not necessarily required; for example, the system may be constructed in one computer without using the network 4. The file server 1 manages information used by a plurality of users in common. It contains the primary resource management section 11, the workspace management section 12, the organization information holding section 13, etc. The primary resource management section 11 manages computer-handled resources such as documents. Here, directories are used as a resource management method. In addition to the directories, a database, etc., may be used as the resource management method. The resources are not limited to documents and may be application programs, input/output units, etc. The workspace management section 12 is means for managing information representing workspaces themselves. The workspace is a management unit of a collection of resources related to a job. Here, the information representing the workspace itself is also regarded as a resource and is managed as a part of the directories as in the primary resource management section 11. The organization information holding section 13 holds information concerning members in the organization as department information. The organization structure is represented by the department information.

The mail server 2 is shared by a plurality of users for exchanging electronic mail with each other. It contains the message transmission section 14 which uses electronic mail to transmit necessary messages from users or specific applications to destinations.

The workstation 3 is used by the user to do work. Here, a plurality of persons use the workstations connected to the network for carrying out their jobs. The workstation 3 contains the workspace display section 15, the resource placement section 16, the job support processing execution section 17, the user identification section 18, and the input/output section 19. The workspace display section 15 displays icons corresponding to resources referenced by workspaces by using information on base images and positions of resources held in relation to jobs. The resource placement section 16 is means for changing the icon positions corresponding to the resources in the workspace display section 15. The icon positions can be changed by the user who executes move operation, etc. The user need not execute resource placement in an interactive mode; the positions may be changed by a program. When the resource placement section 16 places a resource in a specific area, the job support processing execution section 17 interprets and executes the description of processing for supporting the job held in relation to the area. The workspace holds such a job support processing description in relation to a specific area as job relevant information. The user identification section 18 identifies the user. Here, user information is used as information for changing the behavior of the workspace display section 15 and the resource placement section 16. The input/output section 19 consists of input/output units such as a display, a keyboard, and mouse. Here, standard input/output control of window display used for various applications in common, keyboard entry, icon and button operation, etc., is performed.

Next, an example of the data structure used in the first embodiment of the invention will be discussed. In the embodiment, the primary resource management section 11 and the workspace management section 12 are provided each as a part of directories of a hierarchical structure. FIG. 2 is an illustration of an example of the directory structure. In the representation of the data structure shown in FIG. 2, indentation denotes a level, the names with a slash '/' as a suffix denote directory names, and other names denote resource names. For example, "resources/," "document management center/," and "forms/" are directory names which are hierarchical in this order, and "business trip reports" and "research reports" are resource names.

In the directory hierarchy, the resources are managed under the directory "resources/." Further, in the embodiment, information representing the workspace itself is also regarded as a resource and is managed as a part of a directory as in the primary resource management section 11. In the directory hierarchy, the workspaces are managed under the directory "workspaces/."

The primary resource management section 11 has resource proper information as information related to each resource and uses the resource proper information to manage the resource. FIG. 3 is an illustration of an example of the resource proper information. The resource proper information includes entries such as the resource name indicating the name of the resource, the resource type indicating the type of resource, the creator indicating the name of the person creating the resource, the creation date and time indicating the date and time at which the resource was created, and application information indicating the default application applied when the resource is opened. Normally, information indicating the application used to create the resource is held as the application information. FIG. 3 shows a specific example of the resource proper information with the resource name "research report," the resource type "document," the creator "Doi," the creation date and time "Oct. 12, 1993 13:30," and the application "word processor." The resource proper information is held in relation to the resource corresponding to the resource name "research report."

The workspace managed by the workspace management means 12 is an information unit for executing resource management independently of the primary resource management method. Resource management with the workspace is executed using job relevant information which is information for managing the resources related to a job. Unlike the resource proper information, the job relevant information is significant only in the relation between the resources and job and is not attendant on the resources themselves.

FIG. 4 is a conceptual drawing of the relation between the primary resources and workspace in the first embodiment of the information processing system of the invention. The resources are managed by the primary resource management section 11, for example, as a hierarchical directory structure. The hatched portion to the right of each resource denotes the resource proper information related to the resource. This information may be managed separately from the resource. The workspace holds information required for a job as job relevant information as described above and has information entries such as resource administration information, area information, and base image. The resource administration information is related to the resources managed by the primary resource management section 11, whereby the information for each job can be collectively managed independently of the management method of the primary resource management section 11.

FIG. 5 is an illustration of an example of the data structure of job relevant information in the first embodiment of the information processing system of the invention. As shown in the figure, the job relevant information consists of entries, such as the workspace name indicating the name of the workspace, base image information, which is base image data, a resource list, which is a list of resource administration information, an area information list, which is a list of area information, workspace ID indicating a pointer to workspace data in the primary resource management section 11, and default DIR indicating a default directory for storing a new created resource. The specific example shown in FIG. 5 sets the workspace name "report writing," the workspace ID "/workspaces/report writing," and the default ID "/resources/system research division/report draft/." FIG. 6 is an illustration of an example of a base image in the first embodiment of the information processing system of the invention. An image used as a base when icons are displayed, for example, as shown in FIG. 6 is set as the base image.

The resource administration information is information for referencing the resources related to a job. FIG. 7 is an illustration of an example of the resource administration information in the first embodiment of the information processing system of the invention. The resource administration information consists of the resource name Indicating the name of a resource, reference resource information, which is a pointer to a resource in the primary resource management section 11, placement position information indicating the position in which the icon corresponding to the resource is to be placed, and area information indicating the ID of the area in which the icon corresponding to the resource is placed. The placement position information may differ from the actual icon display position just after the icon corresponding to the resource is moved and when redisplay is not made. FIG. 7 shown a list of three resource administration information pieces. The first resource administration information contains the resource name "business trip report," the reference resource "resources/document management center/form/business trip report," the allocation position "(x1, y1)," and the area "a." That is, the resource having the resource name "business trip report" exists as one of the resources related to the job indicated by the workspace. The primary resource management section 11 manages the resource as "resources/document management center/form/business trip report." The icon corresponding to the resource is placed in the screen position "(x1, y1)" and the ID of the area in which the icon is placed is "a." Likewise, the second resource administration information contains the resource name "research report," the reference resource "resources/document management center/form/ research report," the allocation position "(x2, y2)," and the area "a." That is, the resource having the resource name "research report" exists as one of the resources related to the job indicated by the workspace. The primary resource management section 11 manages the resource as "resources/ document management center/form/research report." The icon corresponding to the resource is placed in the screen position "(x2, y2)" and the ID of the area in which the icon is placed is "a." Likewise, the third resource administration information contains the resource name "Aoki1," the reference resource "resources/system research department/ research report draft/Aoki1," the allocation position "(x3, y3)," and the area "b." That is, the resource having the resource name "Aoki1" exists as one of the resources related to the job indicated by the workspace. The primary resource management section 11 manages the resource as "resources/ system research department/research report draft/Aoki1." The icon corresponding to the resource is placed in the screen position "(x3, y3)" and the ID of the area in which the icon is placed is "b."

Figure 8:
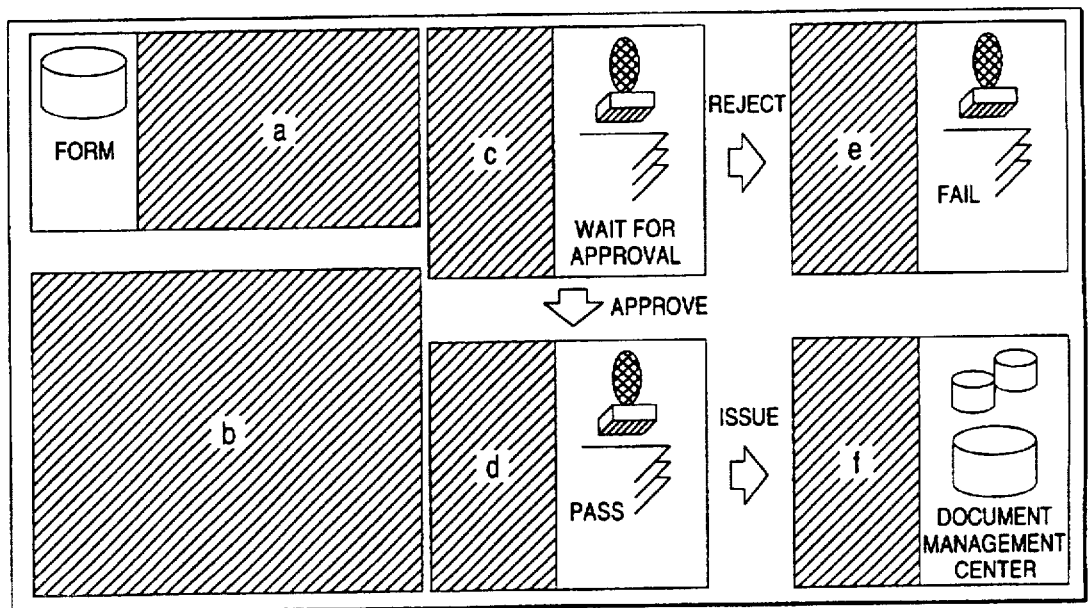
FIG. 8 is an illustration of an example of areas on a base image in the first embodiment of the information processing system of the invention.

The area information is information for defining areas having different meanings when the workspace is displayed on a two-dimensional plane. FIG. 8 is an illustration of an example of areas on a base image in the first embodiment of the information processing system of the invention. Of the base image shown in FIG. 6, the hatched portions in FIG. 8 are defined as areas. The hatched areas are areas in which the icons corresponding to the resources are placed. The access right when the icon corresponding to the resource is placed and the program started at the placement time are related to each area, whereby meanings can be imparted to the areas. That is, a different meaning can be imparted to one resource depending on the area in which the icon corresponding to the resource is placed. In the example shown in FIG. 8, while the icon corresponding to one document is placed in the area a, it means that the document is blank; if the icon is placed in the area c, it means that the document is completed and waits for approval; if the icon is placed in the area d, it means that the document has been approved; if the icon is placed in the area e, it means that the document is not approved; and if the icon is placed in the area f, it means that the approved document Is issued.

FIGS. 9 and 10 are an illustration of an example of the area information in the first embodiment of the invention. The area information consists of the area ID, which is the identifier of the area, position information, which is area data, the display right indicating a condition of users who may display the resource placed in the area, the placement right indicating a condition of users who may place the resource in the area, and program information indicating the program started when the resource is placed in the area. FIG. 11 is an illustration of an example of the area data in the first embodiment of the invention. The example assumes that the areas are all rectangular areas like the areas hatched in FIG. 8 and that the upper-left and lower-right corner positions of each rectangular area on the screen are the area data. That is, in FIG. 11, the area data of the area a is (a1, a2) (a3, a4).

In the example shown in FIG. 9, the area information concerning on the area a in FIG. 11, namely, the area information of the area ID "a" has "(a1, a2) (a3, a4)" as the position information. Further, "all persons" as the display right and "document management center members" as the placement right are specified. That means that the icon of the resource placed in the area a is displayed for all persons, but only the document management center members can place the icon of the resource in the area a. No program information is set in the area a. For the area b in FIG. 11, "(b1, b2) (b3, b4)" as the position information, "resource creator" as the display right, and "all persons" as the placement right are specified.

For the area c in FIG. 11, "(c1, c2) (c3, c4)" as the position information, "resource creator or creators superior" as the display right, and "resource creator" as the placement right are specified. Also, program "send-mail" for transmitting mail is specified as the program information. As shown in FIG. 8, the area c has meaning of wait for approval. At the point in time when a resource is placed in the area, the approver needs to be informed that a wait Is made for approval. Thus, it is desired to transmit a message to the effect that a wait is made for approval to the approver by mail. To do this, in the example shown in FIGS. 9 and 10, the program for transmitting a message to the effect that approval is requested to the placed resource creator's superior by mail is specified corresponding to the area c. Likewise, the program for transmitting a message to the effect that the report is approved to the placed resource creator by mail is specified in the area d, and the program for transmitting a message to the effect that the report is not approved to the placed resource creator by mail is specified in the area e. Further, program "store-resource" for registering approved documents is specified in the area f. Information such as the position, display right, and placement right is also set in the areas d to f.

FIG. 12 is an illustration of an example of the department information in the first embodiment of the information processing system of the invention. The organization information holding section 13 holds the department information as described above. The department information holds information concerning members in each department. A list of the department information represents the organization structure. The department information shown in FIG. 12 consists of the department indicating the name of the department, the department chief indicating the name of the department chief, and the members listing the names of the members. In the example shown in FIG. 12, the system research department is a department consisting of three members Aoki, Baba, and Chiba, who is the department chief. The information management center is a department consisting of three members Doi, Endo, and Fujii, who is the department chief. For example, the department information is used to identify a member's superior, limit the display right, the placement right, etc.

FIG. 13 is a flowchart showing an example of the operation in the first embodiment of the information processing system of the invention. When the main program is started by the user, first at step S21, the workspace to be used is selected as instructed by the user. Next, at step S22, the user is asked about his or her name and password and is checked for his or her user account. Whether or not the name and password entered by the user at step S22 are registered is determined at step S23, and the combination of the name and password is not valid, the process is terminated. If the combination of the name and password is valid, control advances to step S24 at which a workspace display program is executed. A base image is displayed on the display screen and the icons corresponding to the resources are placed in their respective placement areas and superposed on the base image.

At step S25, a resource is selected as instructed by the user. To select the resource, for example, the user can use the mouse to move a cursor onto the resource icon in the workspace display and click. When the cursor is positioned anywhere other than icons, if the user clicks the mouse button in the workspace display, a menu is displayed. Further, if the user releases the mouse button on the required operation item on the menu, the operation corresponding to the menu item is selected. For example, Copy, Move, Delete, Change Name, etc., can be provided as menu items for selecting the operation corresponding to one of the menu items. Mouse even processing is performed by the window system. Of course, other specification methods can also be used. Whether or not a menu item is selected is determined at step S26. If no menu item is selected, control returns to step S25.

When it is determined that a menu Item is selected at step S26, at step S27 the process selected out of the menu is applied to the resource selected at step S25. At step 28, whether or not a quit command is given by the user is determined. To give the quit command, for example, the user can click a quit button in the upper-right corner of the window. Mouse event processing involved in windows is performed by the window system. If no quit command is given, control returns to step S25. If the quit command is given, the process is terminated.

Figure 14:
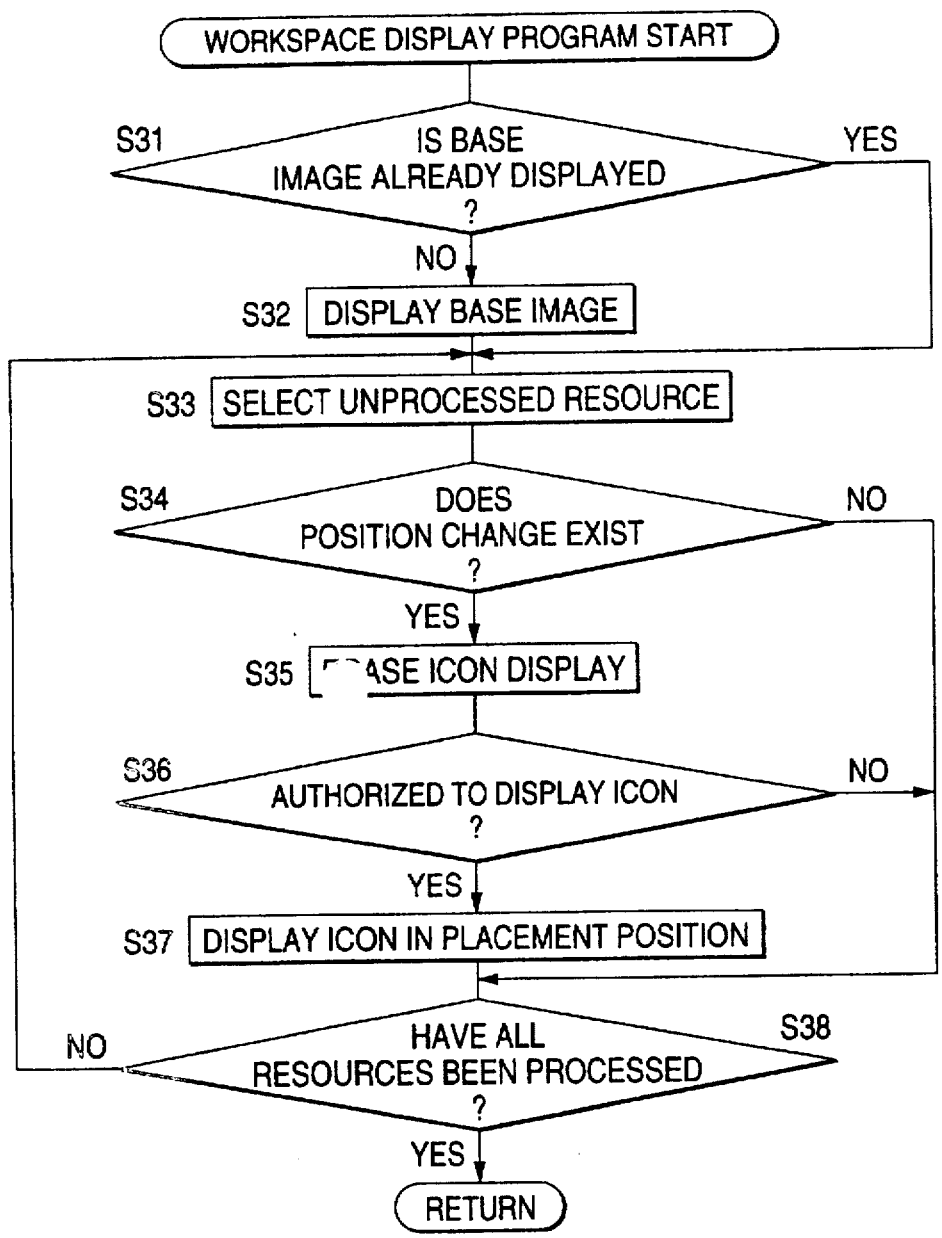
FIG. 14 is a flowchart showing an example of the operation of a workspace display program.

FIG. 14 is a flowchart showing an example of the operation of the workspace display program executed at step S24 of FIG. 13. The workspace display program uses the base image, the resource administration information list, the area information list, etc., in the job relevant information held in the workspace selected at step S21 of FIG. 13 to display the workspace. First, at step S31, whether or not the base image is already displayed is determined. If the base image is not displayed, it is displayed at step S32.

Undisplayed resource administration information is selected out of the resource list at step S33. Whether or not there is a difference between the placement position in the resource administration information selected at step S33 and the display position is determined at step S34. The position changed by a move program, etc., is held in the placement position in the resource administration information. If the value differs from the current position being displayed, it means that redisplay is required. If redisplay is required, first the display of the icon corresponding to the resource selected at step S35 is erased. Next, whether or not the user is authorized to display the icon in the placement area is determined at step S36. Since the resource administration information holds the area ID containing the placement position, the area information about each area may be referenced via the value and the display right information in the area information may be referenced. Whether or not the user matches the condition set as the display right is determined, for example, using the department information as shown in FIG. 12. If the user is authorized to display the icon, it is displayed in the placement position at step S37.

Whether all resources contained in the resource list have been processed is determined at step S38. If an unprocessed resource is contained, control returns to step S33 for processing the unprocessed resource. Upon completion of processing for all resources contained in the workspace, the workspace display program process is terminated.

Figure 15:
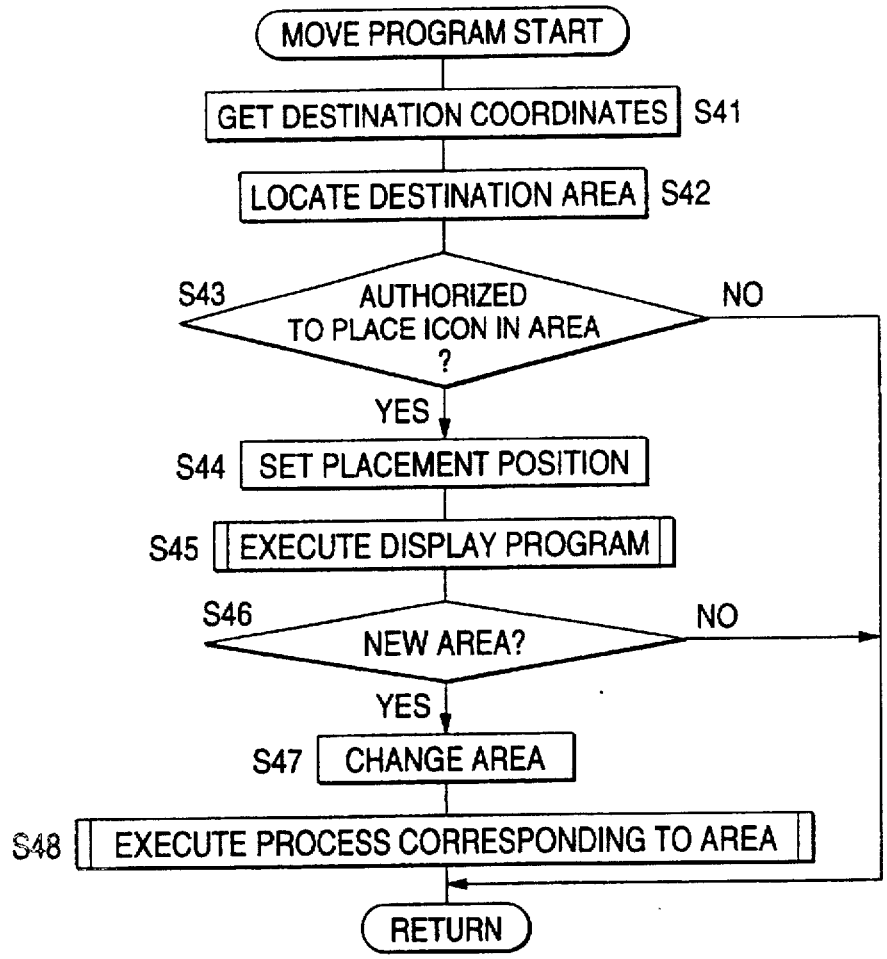
FIG. 15 is a flowchart showing an example of the operation of a move program.

FIG. 15 is a flowchart showing an example of the operation of the move program. At step S27 of FIG. 13, the process selected in the menu is executed. The menu as mentioned above contains items such as Copy, Move, Delete, and Change Name. Here, the operation of the Move process is shown in FIG. 15 as an example.

First, the coordinates of the destination of the icon corresponding to the resource selected at step S25 of FIG. 13 by the user are gotten at step S41. To specify the destination to which the icon is to be moved, the user can select Move out of the menu, then moves the cursor to the destination and click. At step S41, the coordinates of the specified destination are gotten. The area containing the destination coordinates is located at step S42 by selecting the area information containing the destination coordinated out of the area information list.

Whether or not the user is authorized to place the icon in the destination area is determined at step S43. As shown in FIGS. 9 and 10, the placement right is set in each area. At step S43, whether or not the user satisfies the condition of the placement right may be determined. If the user does not have the placement right, the move program is terminated.

At step S44, the icon placement position is set in the coordinates of the specified destination. At step S45, the workspace display program shown in FIG. 14 is executed for displaying an image with the icon moved to the destination.

Whether or not area change associated with the move occurs is determined at step S46. That is, whether or not the value of the area ID held in the resource administration information matches the area located at step S42 is determined. If area change associated with the move does not occur, the move program Is terminated. If area change occurs, the value of the area ID in the resource administration information is changed at step S47.

As shown in the example in FIGS. 9 and 10, a program can be preset in each area. Since a move of the icon to a new area is checked at step S46, the process held corresponding to the area is executed at step S48.

Figure 16:
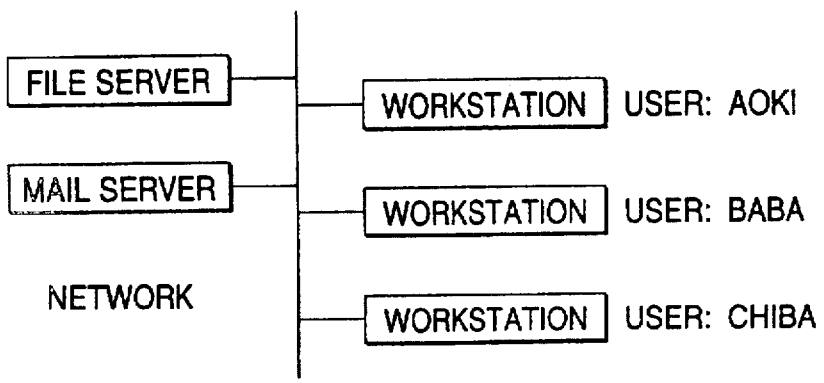
FIG. 16 is a block diagram showing an example of a specific use form in the first embodiment of the invention.

The operation examples will be discussed based on a specific example. FIG. 16 is a block diagram showing an example of a specific use form in the first embodiment of the invention. In the example, users named Aoki, Baba, and Chiba have their respective workstations and share the file server and mail server.

Figure 17A:
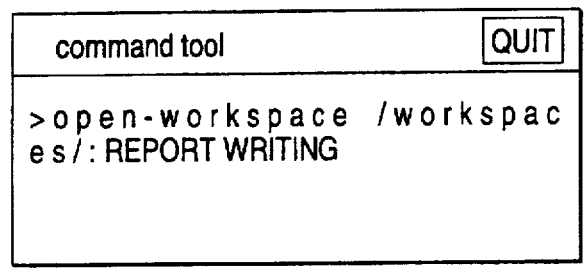
FIGS. 17A and 17B are illustrations of a specific example of starting the information processing system in the first embodiment of the invention.
Figure 17B:
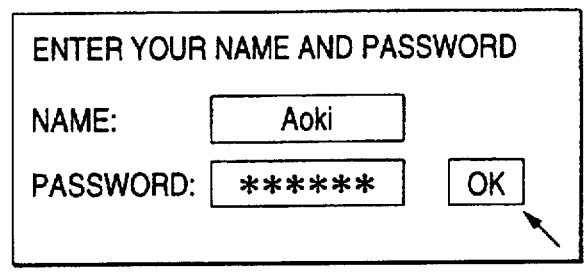

FIG. 17A and 17B are illustrations of a specific example of starting the information processing system in the first embodiment of the invention. To start the information processing system in the embodiment, for example, as shown in FIG. 17A, the user can execute command "open-workspace" from a command line. Of course, a desired workspace may be selected from the icon indicating the workspace. The "open-workspace" command can specify workspace data by arguments. In the example, "/workspaces/report writing" is specified.

Subsequently, as shown in FIG. 17B, the system asks the user about his or her name and password. Then, the user enters them. The example assumes that Aoki starts the system and enters his or her name "Aoki" and password. The entered password is not displayed intact and here an asterisk "*" is displayed. When the user identification section 18 in FIG. 1 checks that the entered name and password are registered, the system is started actually.

To terminate the workspace, the user clicks the quit button displayed in the upper-right corner of the window.

Figure 18:
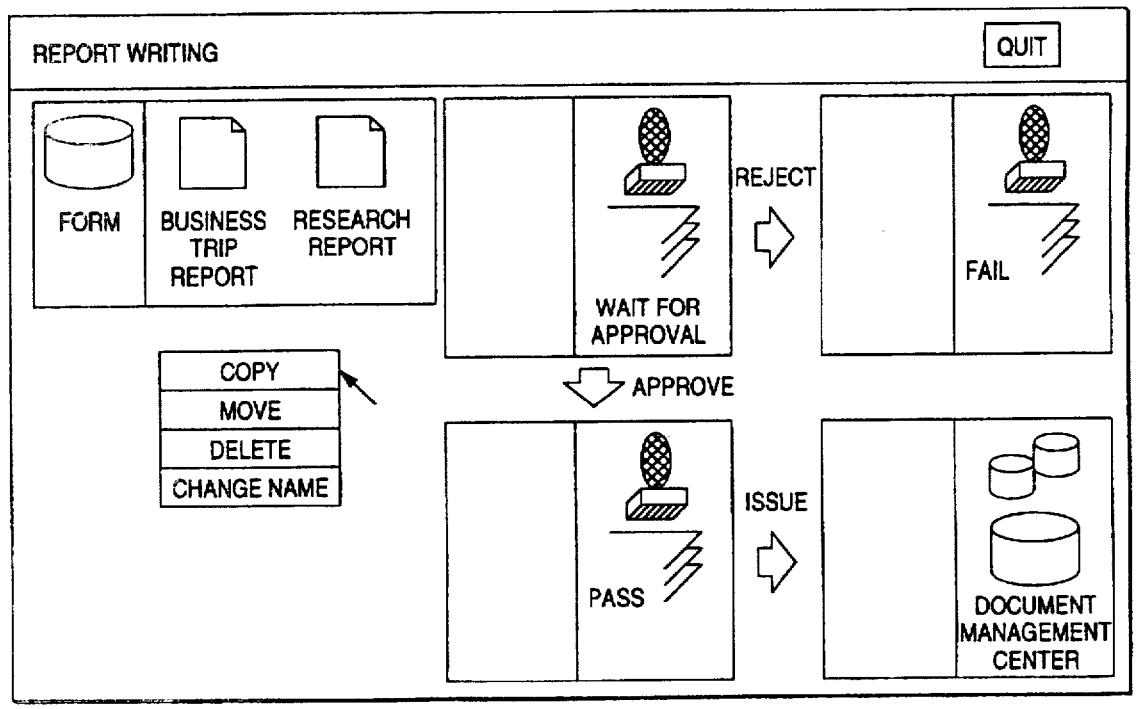
FIG. 18 is an illustration of an example of a workspace at the start time in the specific example in the first embodiment of the information processing system of the invention.

FIG. 18 is an illustration of an example of a workspace at the start time in the specific example in the first embodiment of the information processing system of the invention. When the information processing system is started, a window Is opened; for example, workspace display appears as shown in FIG. 18. The workspace collects necessary information for a sequence of steps from writing reports to getting approval to issuing the reports.

The workspace provides two methods for imparting meaning to a resource set. One is to present a base image to aid in intuitional understanding and memory of the user. The other is to relate resource processing computer programs to the areas. Human being understanding and computer control can be ganged to support job execution by predefining the two meaning imparting methods in relation to each other.

In the specific example, meaning is imparted to the user with the base image shown in FIG. 6. Meaning in the computer is imparted to the areas a, b, c, d, e, and f as follows:

Area a: Form area wherein resources to be used are placed as report forms.

Area b: Work area wherein resources used for writing are placed.

Area c: Approval wait area wherein resources in a wait state for approval are placed.

Area d: Approval area wherein approved resources are placed.

Area e: Rejection area wherein unapproved resources are placed.

Area f: Registration area wherein resources to be registered are placed.

The example assumes that the information shown in FIG. 5 is defined as job relevant information, that the information shown in FIGS. 9 and 10 is defined as area information related to the areas, and that the two resource administration information entries corresponding to the resource names "business trip report" and "research report" shown in FIG. 7 are defined in the resource administration information list in the initial state.

In FIG. 18, icons corresponding to the two resources "business trip report" and "research report" and a menu are superposed on the base image shown in FIG. 6. The two resources are report forms and the icons are placed in the area indicating the forms. That is, the icons corresponding to the two resources are placed in the area a shown in FIG. 11. In the initial state, the menu is not displayed.

Figures 19, 20:
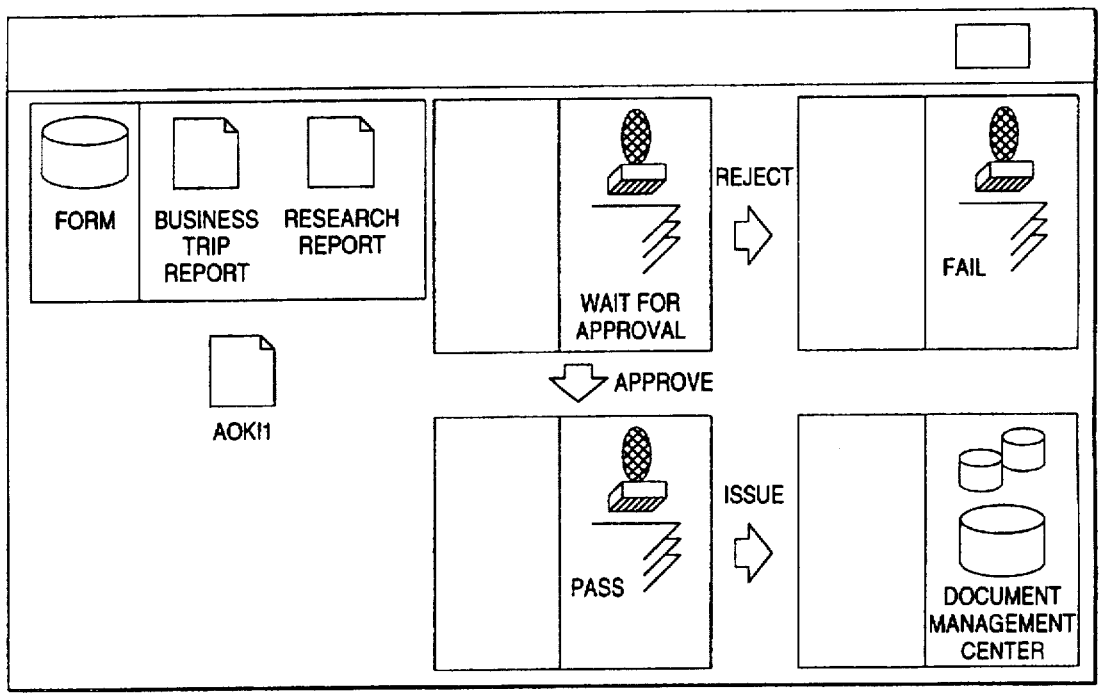
FIG. 19 is an illustration of an example of a workspace with an edit document created.
FIG. 20 is an illustration of an example of the directory structure after the document is copied.

When the user selects one of the displayed resources and presses the mouse button, the menu appears. If Aoki selects the research report form in the area a and Copy in the menu shown in FIG. 18 to write a new research report, a "research report" copy is generated and an icon corresponding to a new resource generated is displayed in the area b, namely, the work area. Further, he selects Change Name in the menu and enters a new name "Aoki1." FIG. 19 is an illustration of an example of the workspace with an edit document created. The document "research report" is copied and the name is changed as described above, whereby the icon corresponding to the edit document "Aoki1" is placed in the work area.

FIG. 20 is an illustration of an example of the directory structure after the document is copied. As the document is copied, a new file is added to the directory managed by the primary resource management section 11. It is created as resources/system research department/report drafts/Aoki1 in FIG. 20. In addition, the resource administration information corresponding to the document "Aoki" is also copied into the job relevant information in the workspace for addition. The resource administration information contains information pointing to the file "Aoki1" added to the directory. In the example, the resource name in the resource administration information and that in the resource administration information in the workspace are the same, but generally may be different.

Aoki writes the document with a word processor, etc. He can start the word processor for editing the document by selecting the icon in the workspace and double clicking the mouse button. The word processor can be started by using the application information in the resource proper information shown in FIG. 3, for example. When the document "research report" is copied, the resource proper information is also copied; the resource proper information shown in FIG. 3 is also attached to the document "Aoki1." Such application information, which should be set for each resource independently of meaning imparted in the workspace, is held as the resource proper information.

Figures 21A, 21B:
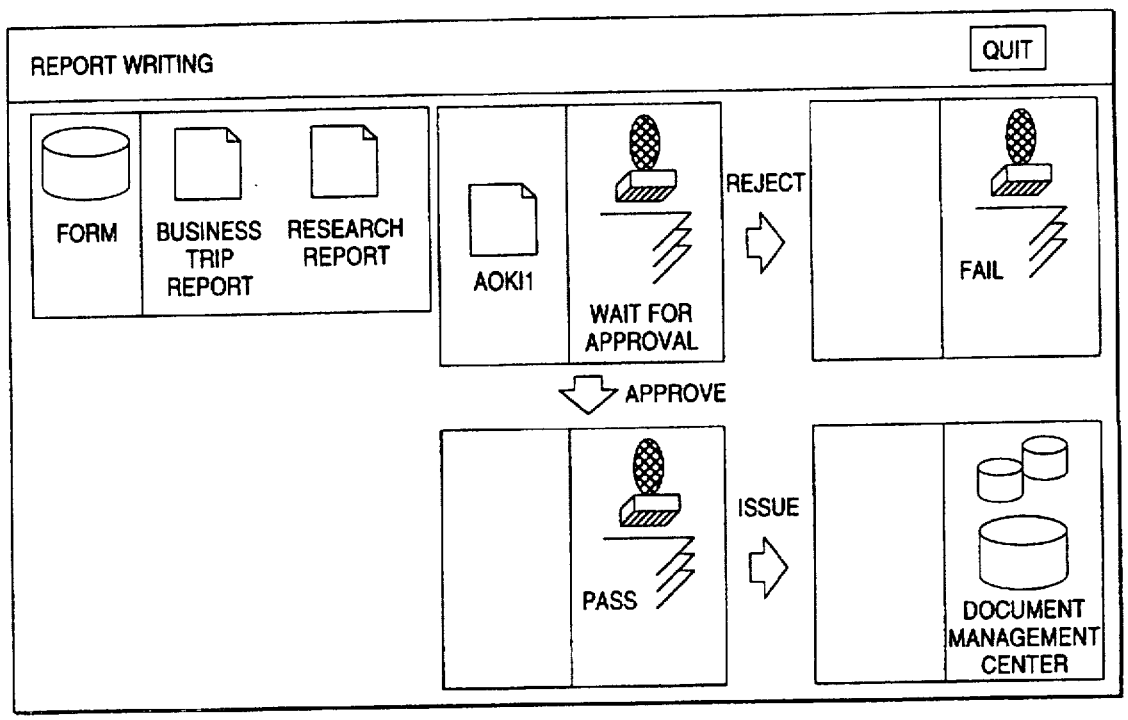
FIGS. 21A and 21B are illustrations of an example of the workspace after move operation.

Upon completion of editing, he selects Move out of the menu for moving the document icon to the approval wait area, namely, the area c. FIGS. 21A and 21B are illustrations of an example of the workspace after the move operation. FIG. 21A shows the state in which the icon has been moved to the approval wait area. When a resource is moved to the approval wait area, namely, the area c shown in FIG. 11, the program related to the area is started. As shown in FIG. 9, the mail transmission program (send-mail) is defined in the area c and therefore is started, whereby a request for approving the report is sent to Chiba who is Aoki's superior by mail, as shown in FIG. 21B.

Figure 22A:
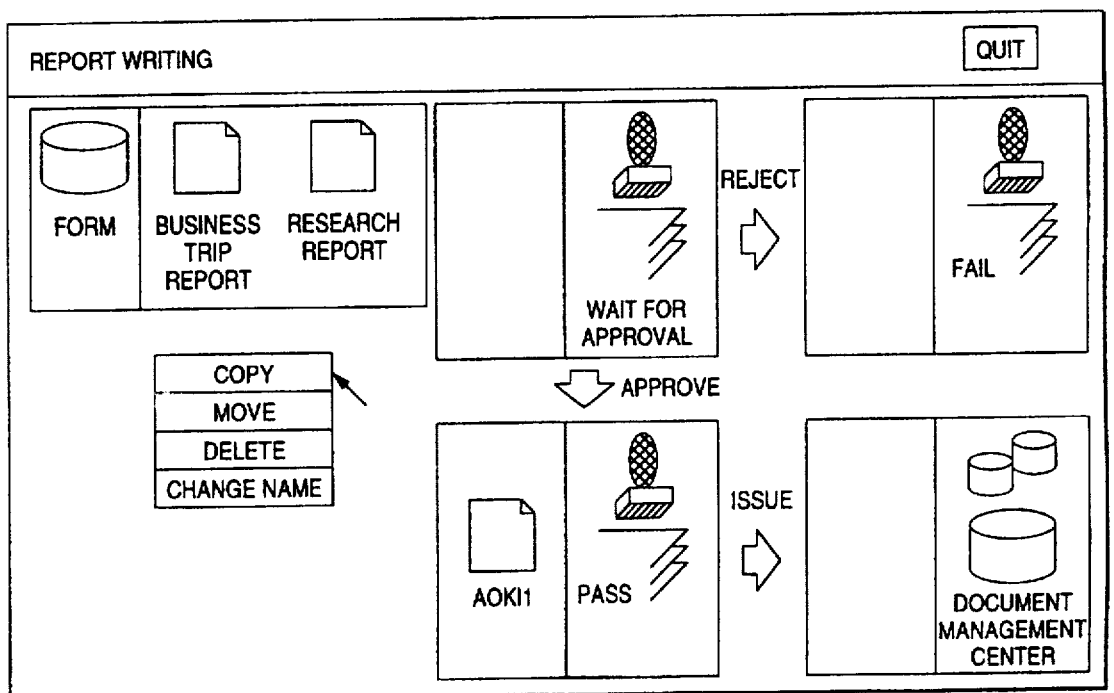
FIGS. 22A and 22B are illustrations of an example of the workspace when a report is approved.
Figure 22B:
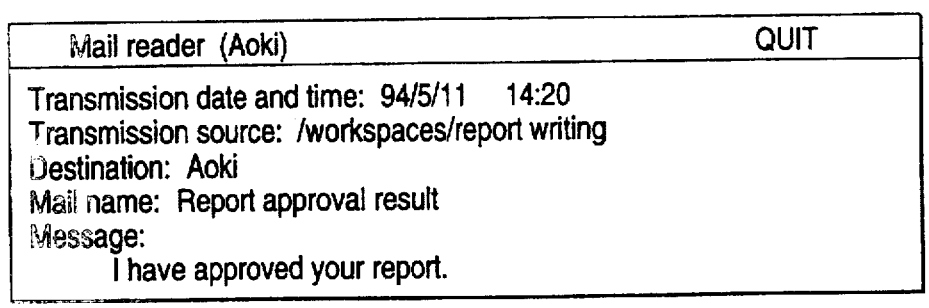
Figure 23A:
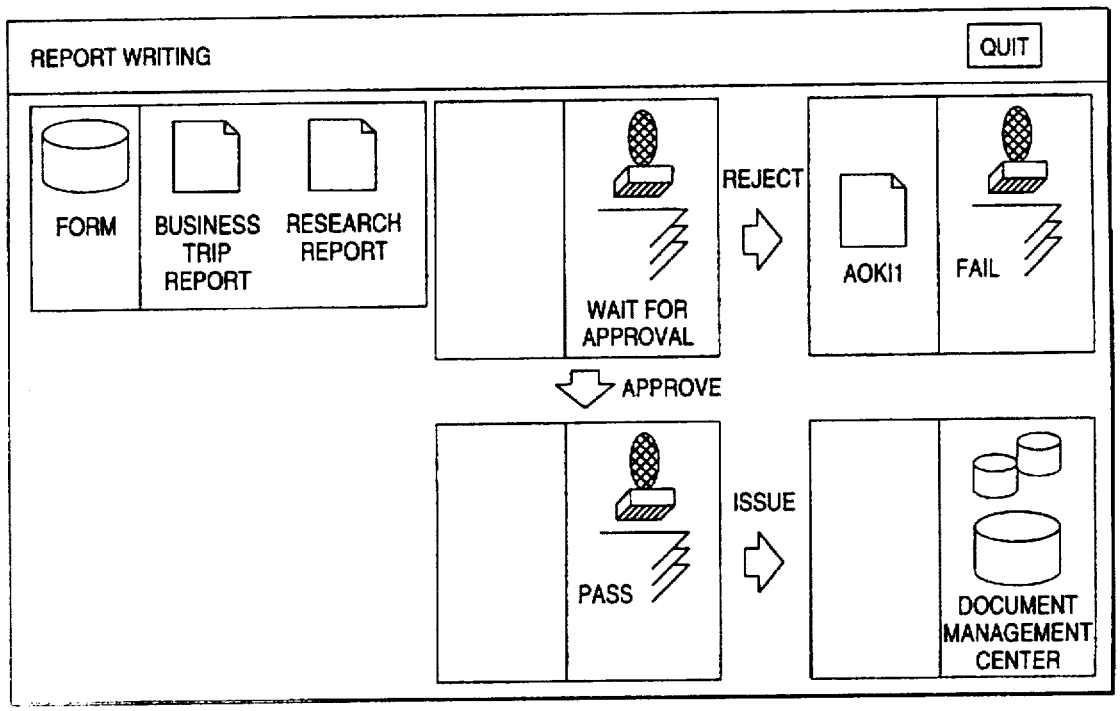
FIGS. 23A and 23B are illustrations of an example of the workspace when the report is rejected.
Figure 23B:
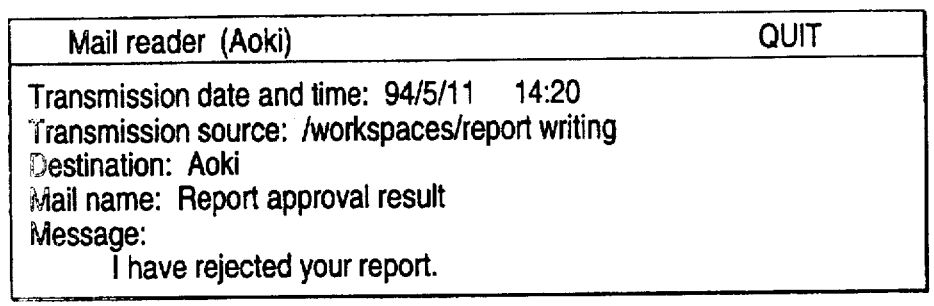

When receiving the request through the mail, Chiba starts the same workspace, for example, as shown in FIGS. 17A on his workstation like Aoki described above for viewing the report Aoki1. To approve the report, Chiba moves the icon corresponding to the document "Aoki1" to the approval area. To reject the report, he moves the icon to the rejection area. FIGS. 22A and 22B are illustrations of an example of the workspace when the report is approved. FIGS. 23A and 23B are illustrations of an example of the workspace when the report is rejected. If Chiba approves the report and moves the icon to the approval area, namely, the area d in FIG. 11, the display changes as shown in FIG. 22A. In addition, since the mail transmission program (send-mail) is defined in the area d as shown in FIG. 9, a message to the effect that the report has been approved is sent from Chiba to Aoki through the mail as shown in FIG. 22B. Likewise, if Chiba rejects the report and moves the icon to the rejection area, namely, the area e in FIG. 11, the display changes as shown in FIG. 23A. In addition, since the program for transmitting a message to the effect that the report has been rejected by mail is defined in the area e as shown in FIG. 10, a message as shown in FIG. 23B is sent from Chiba to Aoki through the mail.

Figures 24, 25:
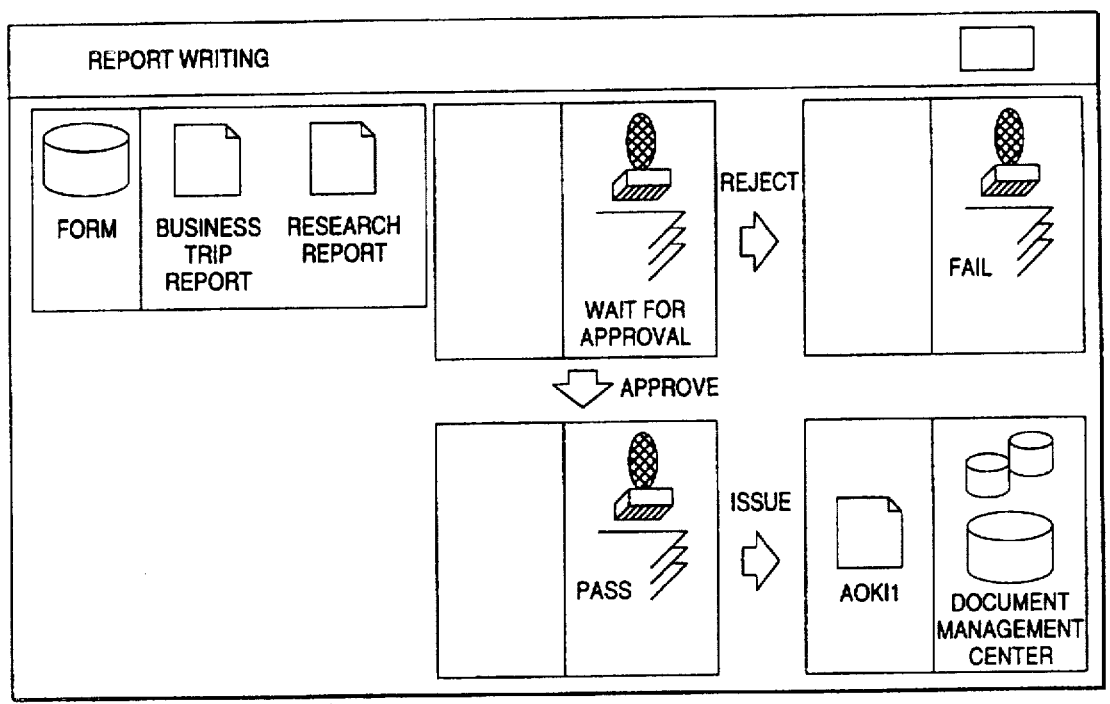
FIG. 24 is an illustration of an example of the workspace when the document is issued.
FIG. 25 is an illustration of an example of the directory structure after the document is registered.

FIG. 24 is an illustration of an example of the workspace when the document is issued. If the report is approved, Aoki moves the icon corresponding to the approved report document "Aoki1" to the registration area for issuing the document, as shown in FIG. 24. The resource registration program (store-resource) is defined as shown in FIG. 10 in the registration area, namely, the area f in FIG. 11. As the icon is moved, the program is started for registering the report "Aoki1" written by Aoki in the document management center.

FIG. 25 is an illustration of an example of the directory structure after the document is registered. As the document is registered, the document is first moved under the directory resources/document management center/issuance report/, as shown in FIG. 25. In the process from writing the document to waiting for approval to approval, no document move occurs on management of the primary resource management section 11, because the state change relevant, to the job is managed by the workspace of course, in document registration, the document need not be moved either. It is only moved on management of the primary resource with the directory.

In the example, Aoki and his superior, Chiba do not operate the workstations while viewing the same workspace display. For example, assume in FIG. 20 that when Aoki waits for approval of the report "Aoki1," Baba who is Aoki's colleague waits for approval of report "Baba1" and is writing "Baba2."

Figure 26:
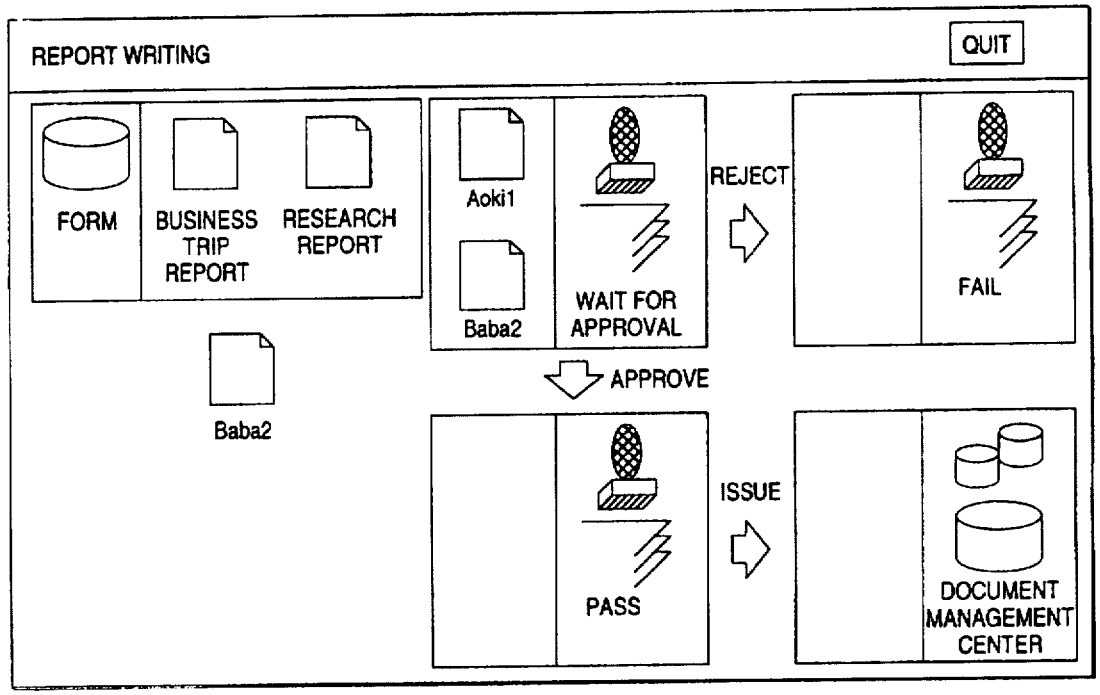
FIG. 26 is an illustration of an example of the shared workspace.
Figure 27:
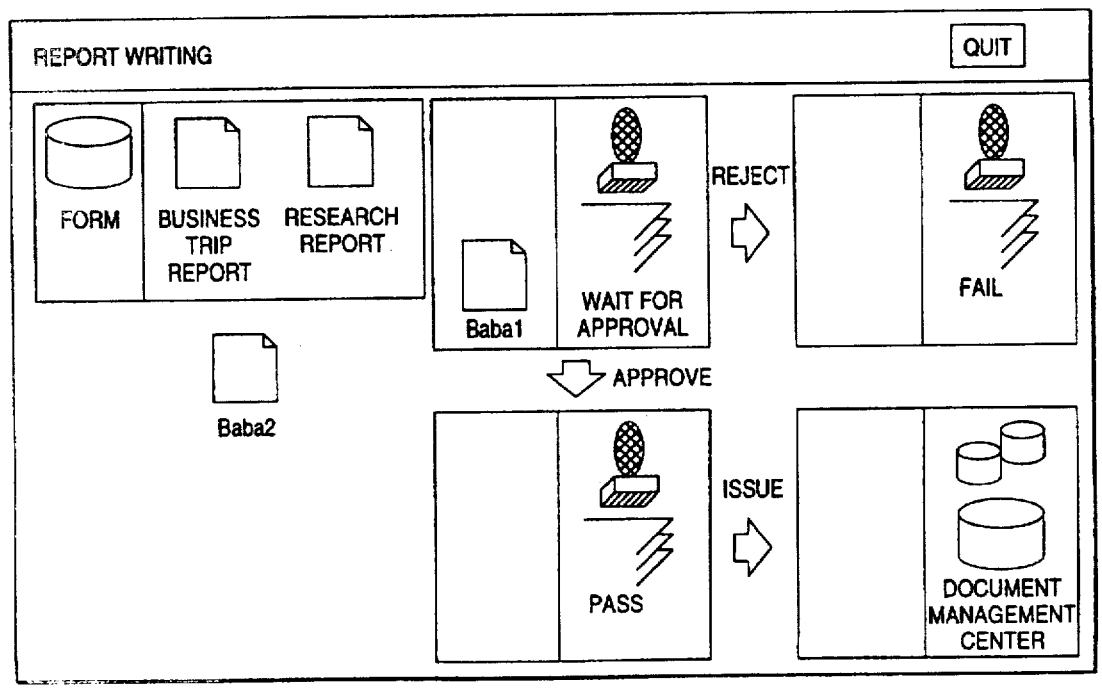
FIG. 27 is an illustration of an example of the workspace viewed by Baba.
Figure 28:
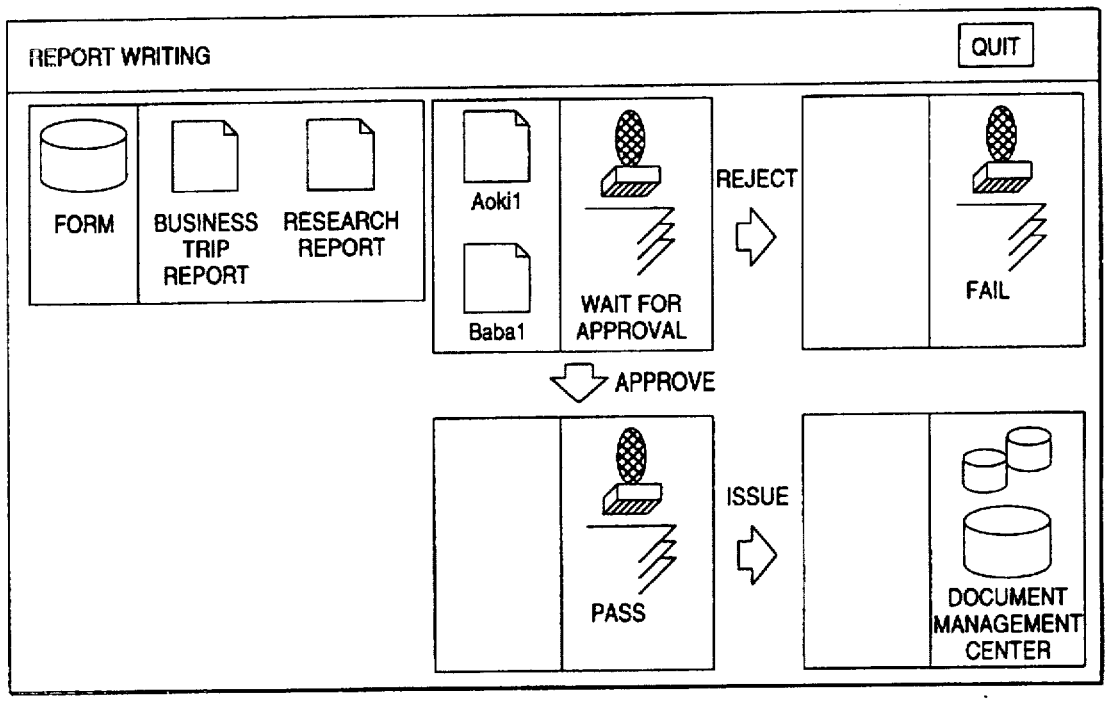
FIG. 28 is an illustration of an example of the workspace viewed by Chiba.

FIG. 26 is an illustration of an example of the shared workspace, FIG. 27 is an illustration of an example of the workspace viewed by Baba, and FIG. 28 is an illustration of an example of the workspace viewed by Chiba. Since the workspace is shared, when all information is displayed, icons corresponding to Aoki's and Baba's reports in a wait for approval and the report being written by Baba are displayed. In the embodiment, display right information is contained in the area information, as shown in FIGS. 9 and 10. The resources displayed in the areas are limited so that the user can see only necessary resources according to the display right information. In the example, the display right of the area b is granted only to the resource creator and that of the area c is granted to the resource creator and his or her superior. Thus, only the document "Aoki1" in a wait for approval is displayed for Aoki, as shown in FIG. 21A, the document "Baba1" in a wait for approval and the document "Baba2" being written are displayed for Baba, as shown in FIG. 27, and the documents "Aoki1" and "Baba1" in a wait for approval are displayed for Baba, as shown in FIG. 28.

Not only display, but also operation is limited depending on the user. For example, only superior Chiba can move the icon from the approval wait area to the approval area based on the placement right information in the area information shown in FIGS. 9 and 10. In the example, the placement right of the area d, the approval area, is granted only to the resource creator's superior, as shown in FIG. 9. Thus, only Chiba can move the icon to the approval area, namely, approve the reports and Aoki cannot approve his report for himself. Likewise, all document management center members are allowed icon placement in the area a; all persons are allowed icon placement in the area b; the resource creators are allowed icon placement in the area c; resource creator's superiors are allowed icon placement in the area e; and the resource creators and their superiors are allowed icon placement in the area f.

In the example, the approval request and the approval result are transferred by mail. Thus, when a resource is placed in a specific area, a message is sent to a specific user, thereby passing the job progress state information for smoothing the progress of the entire job.

As seen from the description made so far, according to the embodiment, job execution can be supported efficiently. Unlike a collection of resources like the conventional directory or holder, the job resource holding units can be used to impart meaning to the resources from the viewpoint of the job. Meaning can be imparted to the resources in the job by using placement of resource display graphics, a base image, or processing description; necessary resources or processing can be provided for the worker at necessary timing.

Figure 29:
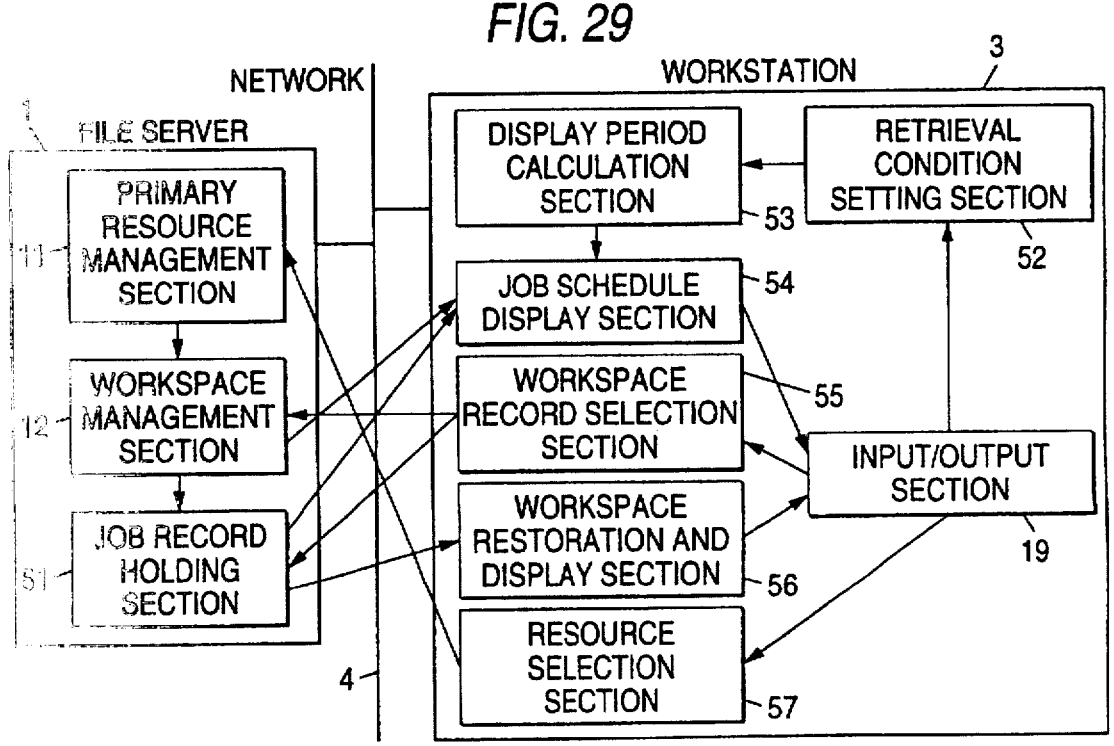
FIG. 29 is a block diagram showing a second embodiment of an information processing system of the invention.

FIG. 29 is a block diagram showing a second embodiment of an information processing system of the invention. Parts identical with or similar to those previously described with reference to FIG. 1 are represented by the same reference numerals in FIG. 29 and will not be discussed again.

Reference numeral S1 represents a job record holding section; 52, a retrieval condition setting section; 53, a display period calculation section; 54, a job schedule display section; 55, a workspace record selection section; 56, a workspace restoration and display section; and 57, a resource selection section. The second embodiment provides a system using a workspace into which resources are integrated in job units au in the first embodiment for managing a schedule in job units. Further, a function of retrieving the resources relevant to a job based on vague memory with respect to the time axis is added to the system. The retrieval function will be referred to as a time axis retrieval tool.

In the embodiment shown in FIG. 29, a workstation 3 for executing personal work and a file server 1 for handling shared information are connected by a network 4 as an example. However, the system is not limited to the configuration; it can be implemented in various forms such as implementation in one computer, for example. The arrow in FIG. 29 represents a flow of information.

The file server 1 contains a primary resource management section 11, a workspace management section 12, and a job record holding section 51. A primary resource management section 11 Is the same as that in the first embodiment. A workspace management section 12 is the same as that in the first embodiment except that it holds a date and time information list in addition to the information held in the first embodiment as job relevant information in a workspace. The job result period taken for carrying out the job can be managed based on the date and time information. The workspace management section 12 contains a job result management function. The job record holding section 51 holds a record information list as job records.

The workstation 3 contains the retrieval condition setting section 52, the display period calculation section 53, the job schedule display section 54, the workspace record selection section 55, the workspace restoration and display section 56, the resource selection section 57, and an input/output section 19. The retrieval condition setting section 52 sets conditions for retrieving a workspace. The display period calculation section 53 calculates the schedule display period from the retrieval conditions set in the retrieval condition setting section 52. The workspace record selection section 54 displays a schedule as long as the period calculated by the display period calculation section 53. The workspace record selection section 55 selects record information corresponding to a pair of the date and time specified by the user on the schedule display and a workspace. The workspace restoration and display section 56 restores and displays the workspace state at the recording time based on the information held in the record information. The resource selection section 57 selects a resource on workspace display as specified by the user. The input/output section 19 is the same as that in the first embodiment.

Next, an example of the data structure used in the second embodiment of the invention will be discussed. Resource proper information is the same as that in the first embodiment. job relevant information in a workspace holds a date and time information list in addition to the information held in the first embodiment. FIG. 30 is an illustration of an example of the date and time information. The date and time information, which is information concerning a schedule, has type information indicating a schedule or the result, start date and time information indicating the job start date and time, and end date and time information indicating the job end date and time.

FIG. 31 is an illustration of an example of the record information. The record information is held in the job record holding section 51. It holds job relevant information contained in the workspace at the recording point in time together with the record date and time and a message indicating a reason for recording, etc. The record information can be made up of workspace ID, which is a pointer to the workspace in the primary resource section 11, record date and time information indicating the date and time at which workspace data was recorded, a base image at the record date and time, a resource list at the record date and time, and a message indicating a reason for recording, etc. In the example shown in FIG. 31, the first record information is a part of the job relevant information recorded at 10 o'clock on May 12, 1994 wherein the workspace ID is "/workspaces/prior art survey," the base image and resource list at the record date and time are recorded, and the message "Survey completed" is added.

Figure 32:
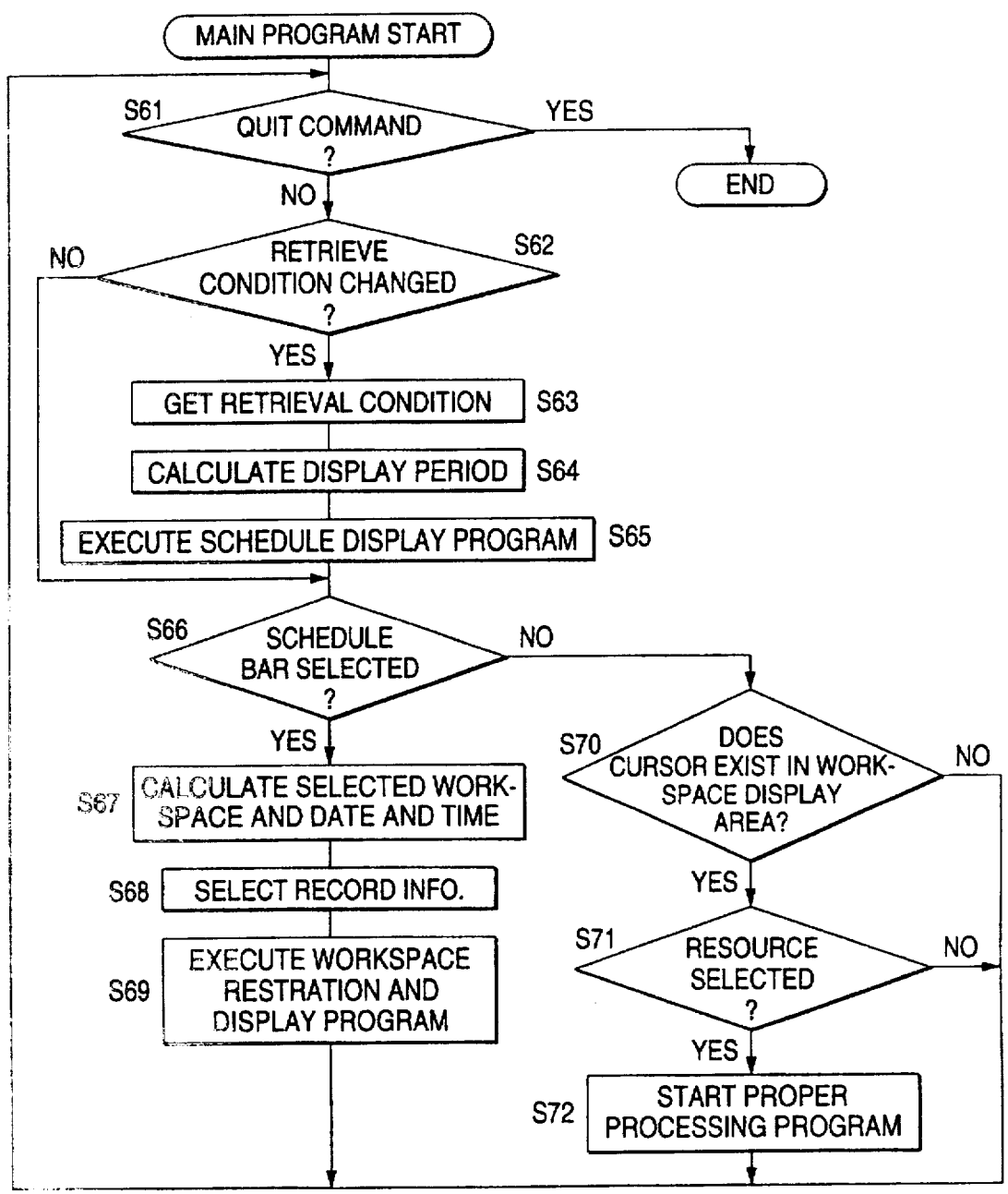
FIG. 32 is a general flowchart showing an example of the operation in the second embodiment of the invention.

FIG. 32 is a general flowchart showing an example of the operation in the second embodiment of the invention. As in the first embodiment, for example, the user can start the system by entering a "time-axis-search" command. Whether or not the user enters a quit command is determined at step S61. If the quit command is entered, the program is terminated. Whether or not the user changes a retrieval condition is determined at step S62. If the retrieval condition is not changed, control advances to step S66 without performing a retrieval process or a schedule display process. If the retrieval condition is changed, control goes to step S63 and executes the retrieval process.

At step S63, the retrieval condition entered by the user is read. At step S64, the record information matching the retrieval condition is gotten and one period containing the gotten record information is calculated. At step S65, a schedule display program is executed with respect to the display period calculated at step S64 and schedule bars are displayed.

Whether or not the user selects one of the displayed schedule bars is determined at step S66. For example, the user can select one of the schedule bars by moving the cursor onto the schedule bar and clicking the mouse button. The displayed schedule bars are related to workspaces. When the schedule bar is selected, control advances to step S67 at which the workspace corresponding to the user-selected schedule bar is identified and at the same time, the date and time corresponding to the specified position is calculated. At step S68, the record information recorded at the date and time calculated at step S67 or that recorded at the date and time closest to the date and time on and after the calculated date and time is selected from among the record information about the workspace identified at step S67. At step S69, the workspace is restored and displayed based on the record information selected at step S68 and control returns to step S61.

If one of the schedule bar is not selected at step S66, whether or not the cursor exists in the workspace display area is determined at step S70. If the cursor does not exist in the workspace display area, control returns to step S61. If the cursor exists in the workspace display area, whether or not the user further selects a resource Is determined at step S71. For example, the user can select one of the resources by moving the cursor onto the icon of the resource and clicking the mouse button. If one of the resources is selected, the program related to the selected resource is started at step S72. For example, for a document icon or the like, a document edit program related thereto is started. Then, control returns to step S61.

Figure 33:
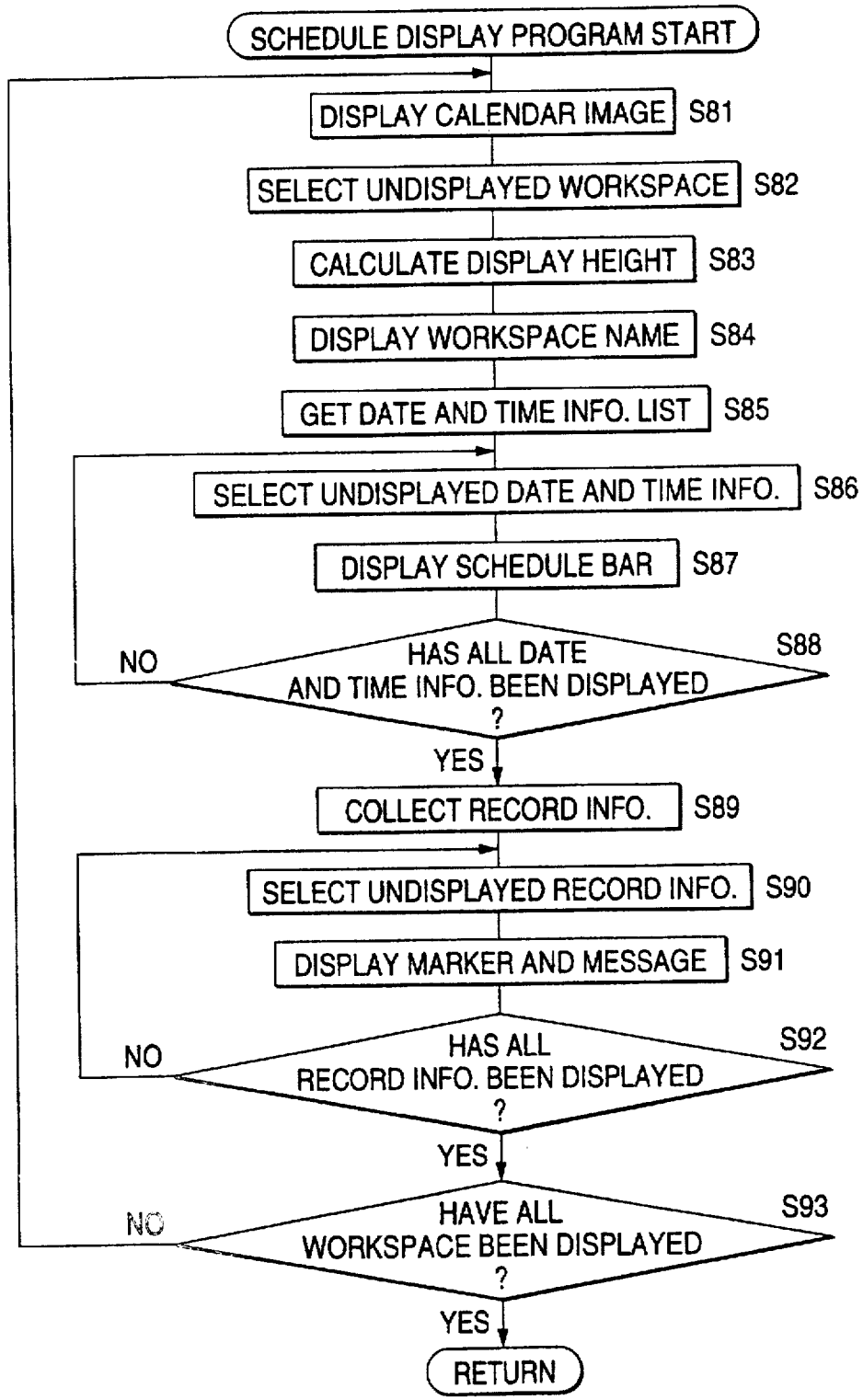
FIG. 33 is a flowchart showing an example of the operation of a schedule display program.

FIG. 33 is a flowchart showing an example of the operation of the schedule display program; it shows the process executed at step S65 in FIG. 32. The schedule display program is a program for displaying a schedule as long as the specified display period. To present the schedule, a diagram corresponding to the date and time information, which is the job relevant information in a workspace, and a diagram corresponding to the record information are placed on calendar display. At step S82, a calendar image as long as the display period is generated and displayed. The workspaces having the schedule or result date and time information in the display period are the workspaces to be displayed. At step S82, an undisplayed workspace is selected from the workspaces to be displayed. At step S83, the display height of the schedule bar corresponding to the selected workspace is calculated and at step S84, the workspace name of the workspace is displayed in the display position of the schedule bar.

At step S85, a date and time information list for the workspace to be displayed is gotten. At step S86, undisplayed date and time information Is selected out of the gotten date and time information list. At stop S87, the schedule bar corresponding to the selected date and time information is displayed as a rectangle crossing the range of the start date and time to the end date and time. Preferably, at the time, the schedule date and time information and result date and time information are distinguished from each other on display in such a manner that the former is displayed as a hollow o rectangle and that the latter is displayed as a hatched rectangle. At step S88, whether all date and time information has been displayed for the current workspace being processed for display is determined. If undisplayed date and time information remains, control returns to step S86.

Upon completion of display of all date and time information, record information about the current workspace being processed for display is collected at step S89. At step S90, undisplayed record information is selected from among the record information collected at step S89 and at stop S91, a marker and a message are displayed based on the selected record information. For example, a triangular mark can be displayed in the record date and time position of the record information of the schedule bar and further a message held as the record information can be displayed near the mark. At step S92, whether all record information concerning the current workspace being processed for display has been displayed is determined. If undisplayed record information exists, control returns to step S90 for displaying the remaining record information.

At step S93, whether all workspaces to be displayed have been displayed is determined. If an undisplayed workspace remains, control returns to stop S82 for performing display processing for the remaining workspace. Upon completion of displaying all workspaces to be displayed, the schedule display program is terminated and control returns to the main program.

Figure 34:
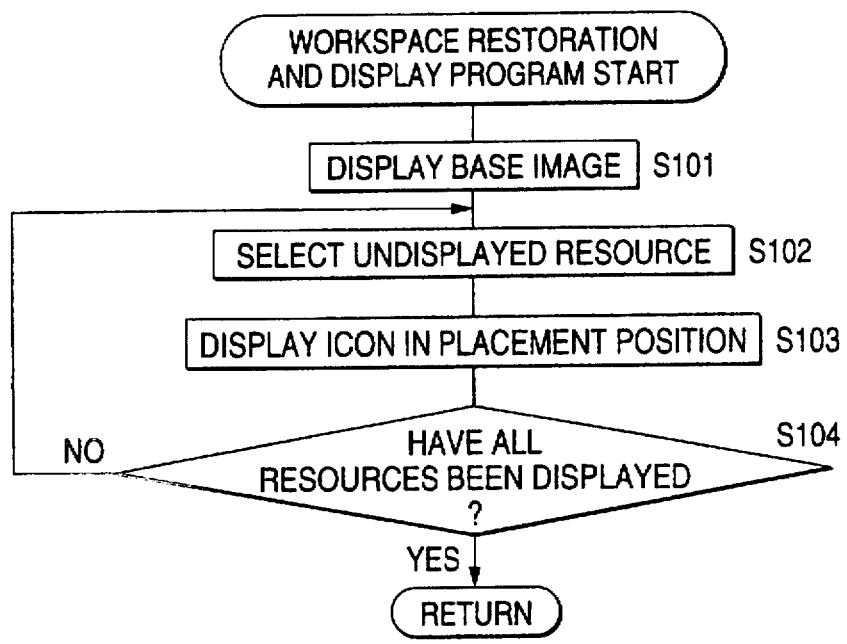
FIG. 34 is a flowchart showing an example of the operation of a workspace restoration and display program.

FIG. 34 is a flowchart showing an example of the operation of the workspace restoration and display program; it shows the process executed at step S69 in FIG. 32. The workspace restoration and display program restores and displays a workspace based on the information held in the specified record information.

At step S101, the base image held in the record information is displayed. At step S102, an undisplayed resource is selected out of the resource list held in the record information. At step S103, the icon corresponding to the selected resource is displayed in the placement position. At step S104, whether all resources in the resource list have been displayed is determined. If an undisplayed resource exists, control returns to step S102 for performing display processing for the remaining resource. Upon completion of displaying all resources, the process is terminated.

Figure 35:
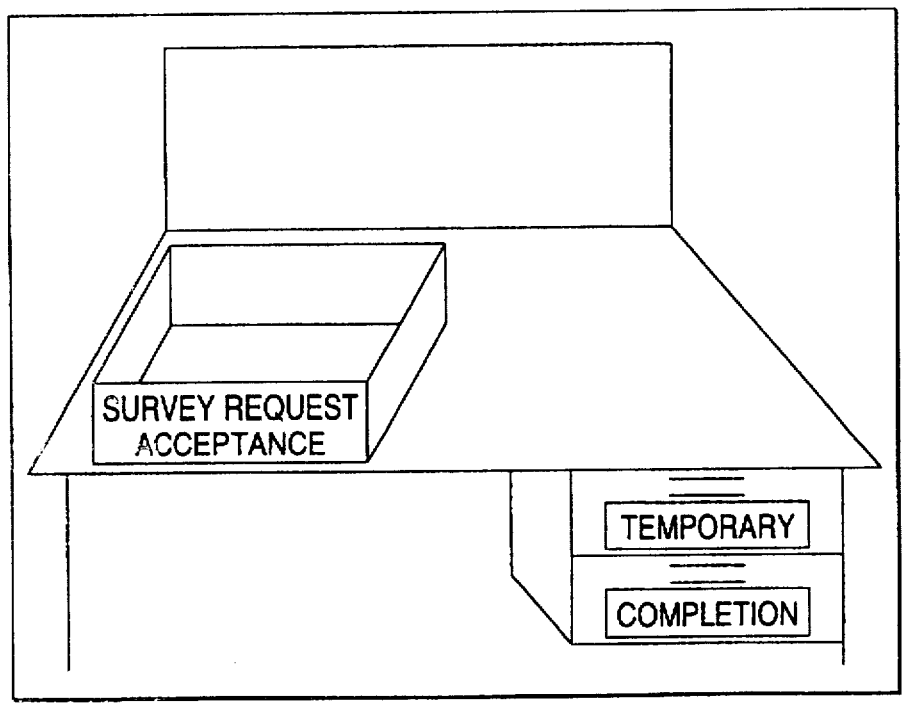
FIG. 35 is an illustration of an example of a base image in the second embodiment of the invention.
Figure 36A:
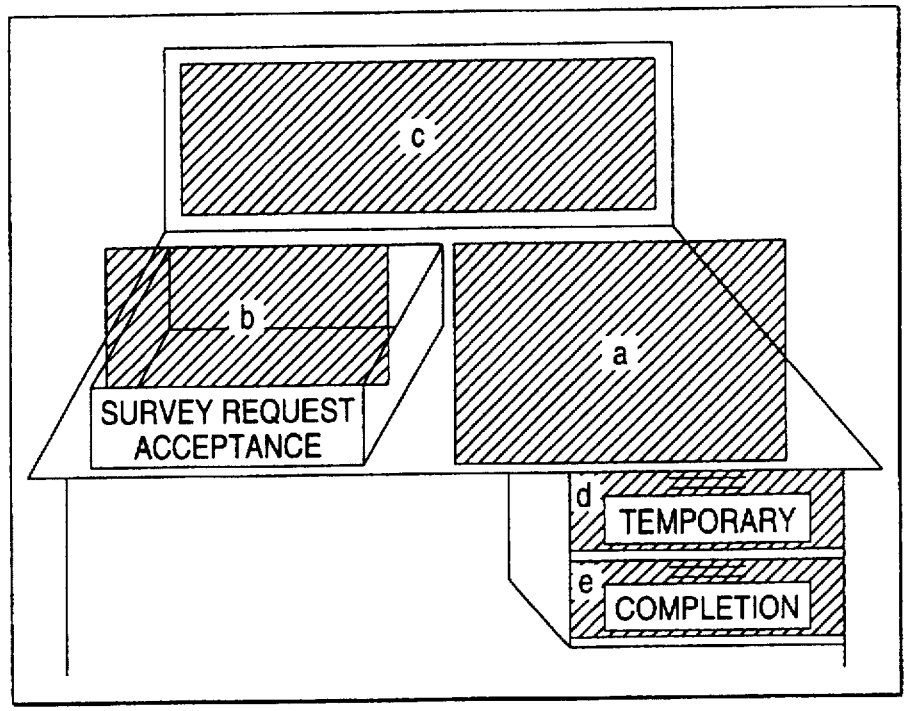
FIGS. 36A and 36B are illustrations of areas on the base image in the second embodiment of the invention
Figure 36B:
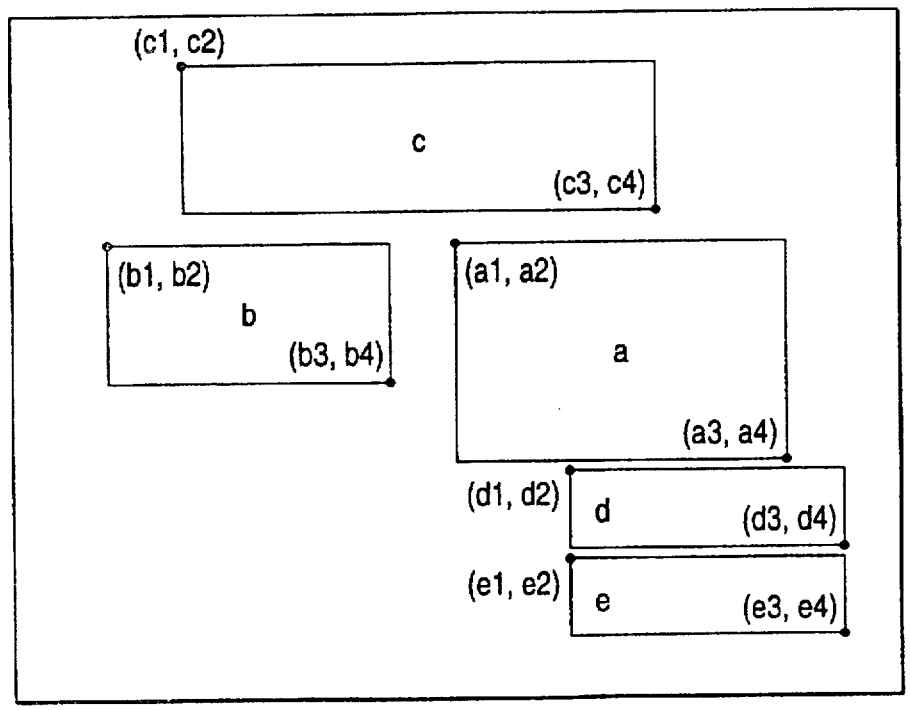
Figures 38, 39:
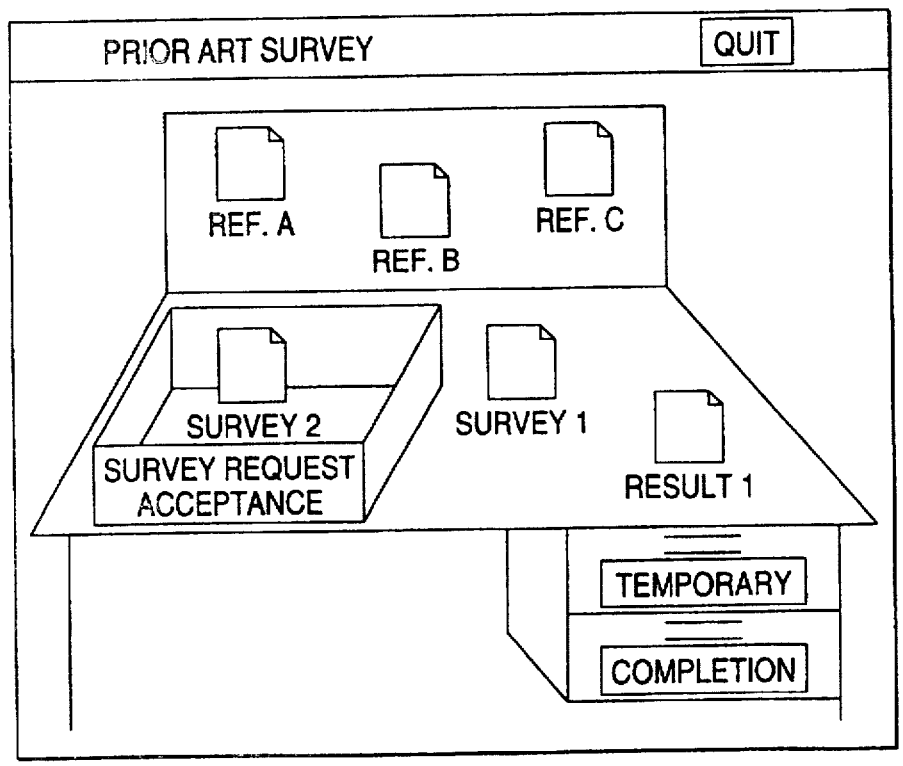
FIG. 38 is an illustration of area information in the second embodiment of the invention (continued)
FIG. 39 is an illustration of the workspace state just before survey 1 is complete.

Next, the operation in the second embodiment of the invention will be discussed based on a specific example. Here, how to retrieve resources related to a job using a workspace will be described. First, a specific example of the workspace used in that specific example will be discussed. FIG. 35 is an illustration of an example of a base image in the second embodiment of the invention. FIGS. 36A and 36B are illustrations of areas on the base image in the second embodiment of the invention. FIGS. 37 and 38 are an illustration of area information in the second embodiment of the invention.

The workspace is named "prior art survey" wherein upon acceptance of a survey request, a survey is made and the result is registered. The areas are superposed on the base image shown in FIG. 35 and are defined as shown in FIGS. 36A and 36B. The areas impart the following meanings to resources:

Area a: Work area wherein work resources for summarizing the survey result, etc., are placed.

Area b: Request acceptance area wherein resources for requesting a survey are placed.

Area c: Reference area wherein resources for accessing survey information are placed.

Area d: Temporary storage area used for a temporary storage command.

Area e: Completion area used for a survey completion command.

Imparting of meaning for computer control in the areas is performed based on the area information shown in FIGS. 37 and 38. The position, display right, and placement right of each area is set in the area information. A program started when a resource is placed is also described in the areas a, d, and e. It is described as a combination of the following commands: Command record-workspace for generating record information and adding it to the job record holding section 51, command store-resource for temporarily saving the resource specified in the specified area , and command delete-resource for deleting the resource in the specified area. These commands are used to define processing in the areas.

In the area information corresponding to the area a, the workspace state when a resource is placed in the work area (area a) is recorded by the command record-workspace. At this time, a message to the effect that the survey shown in the resource is started is registered. In the area information corresponding to the area d, the command store-resource is used twice to move the resources in the work area (area a) and the reference area (area c) to different places. In the area information corresponding to the area e, first a message indicating survey completion and the workspace state are recorded by the command record-workspace, then the resource in the work area (area a) is moved to a different place by the command store-resource and the resource in the reference area (area c) is deleted by the command delete-resource. The program in the area d or e is started when a resource is placed in the area. Resultantly, the placed resource is moved to a predetermined place. Therefore, no resources remain placed in the areas.

Each program is started with placement of a resource in the corresponding area as a trigger as with the first embodiment, but may be started with mouse clicking as a trigger, for example.

Any other information for providing the workspace is also set as with the first embodiment and the operation on the workspace is also similar to that In the first embodiment.

Figure 40:
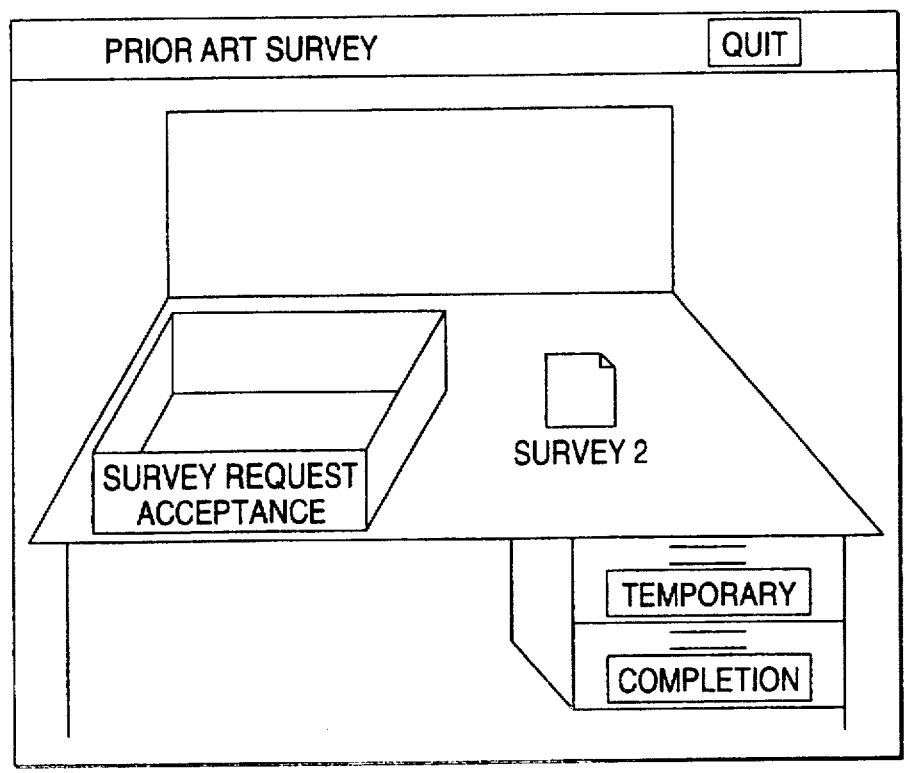
FIG. 40 is an illustration of the workspace state just after survey 2 is started.

FIG. 39 is an illustration of the workspace state just before survey 1 is complete. FIG. 40 is an illustration of the workspace state just after survey 2 is started. In FIG. 39, "survey 1," a survey request, and "survey result 1," the survey result, are placed in the work area a, "survey 2," the next survey request, is placed in the request acceptance area, and "reference material A," "reference material B," and "reference material C" as materials used for survey 1 are placed in the reference area. When survey 1 is complete, the icon is moved as in the first embodiment. That is, "survey result 1" is moved to the completion area. Then, the program is defined in the completion area (area e), as shown in FIG. 38, thus is executed as the icon is placed. When the program is executed, first a message indicating the survey completion and the workspace state are recorded, then "survey 1" and "survey result 1" in the work area (area a) are moved to the directory /resources/document management center/survey result and the reference materials in the reference area (area c) are deleted.

Subsequently, survey 2 is started. To do this, the user moves the icon of "survey 2" placed in the request acceptance area to the work area. The program is defined in the area information corresponding to the work area (area a), thus is executed as the icon is placed. As shown in FIG. 37, the program defined in the area information corresponding to the area a is used to record a message to the effect that the survey shown in the resource is started and the workspace state. Thus, the message to the effect that survey 2 is started and the information on the workspace shown in FIG. 40 are recorded.

Figure 41:
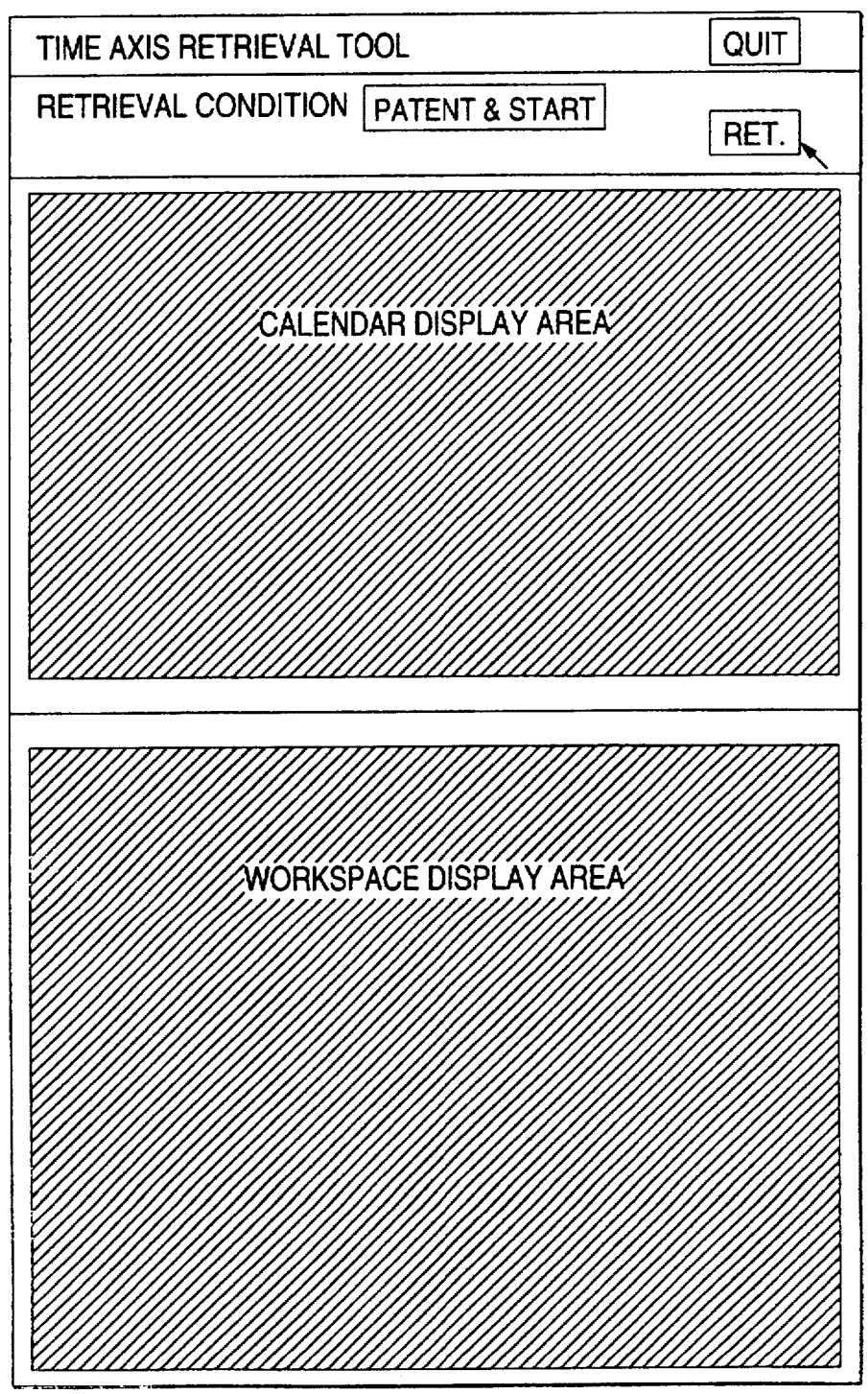
FIG. 41 is an illustration of an example of a retrieval condition input screen in a time axis retrieval tool.

Next, the time axis retrieval tool is started. To start the time axis retrieval tool, for example, the user can enter a command on a command line as in the first embodiment. FIG. 41 is an illustration of an example of a retrieval condition input screen in the time axis retrieval tool. As shown in the figure, the time axis retrieval tool display screen consists of a retrieval condition setting area, a calendar display area, and a workspace display area. To terminate the time axis retrieval tool, the user clicks a quit button in the upper-right corner of the window.

For example, let's consider a case for finding a "document not directly related to patent 1, but likely seen at about the time writing of patent 1 was started." If the user is thus vague in his or her memory, usually, as he or she sees relevant information, he or she recalls little by little for advancing the search. The operation will be discussed by taking retrieval beginning with the condition as an example.

As shown in FIG. 41, condition "'patent 1' & 'start'" is set as the retrieval condition. The user enters the condition and, for example, clicks a retrieval button for instructing the system to retrieve such a workspace record containing words "patent 1" and "start" at the same time from the record information. For example, assuming that the record information shown in FIG. 31 is held in the job record holding section 51, the fourth patent writing workspace record information in FIG. 31 has the message "patent 1 is started" and is retrieved. The display period calculation section 53 calculates the display period based on the date and time "Nov. 5, 1994 14:00" at which the record information was recorded. In the example, one week containing Nov. 5, 1994 becomes the display period. Of course, the system can also be configured so as to enable the user to specify the display period.

Based on the calculated display period, the record information recorded within the display period is gotten. For example, all record information shown in FIG. 31 is gotten. The job schedule display section 54 displays a 1-week schedule containing Nov. 5, 1994 in the calendar display area based on the gotten record information.

Figure 42:
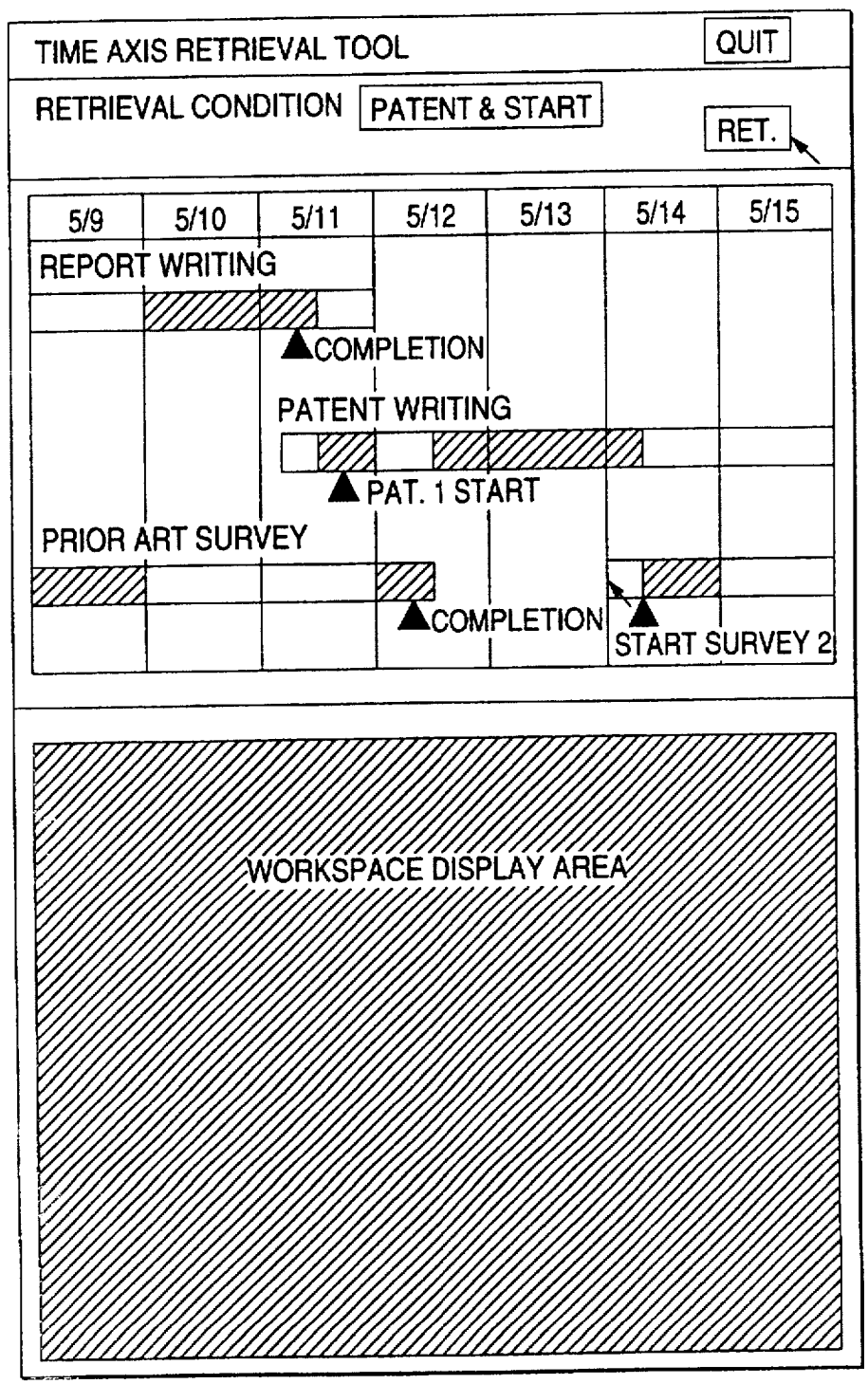
FIG. 42 is an illustration of an example of a schedule display screen in the time axis retrieval tool.

FIG. 42 is an illustration of an example of a schedule display screen in the time axis retrieval tool. Horizontal rectangles indicating the schedule, which are called schedule bars, indicate job schedule and result in workspace units. The character string in the upper-left portion of each schedule bar denotes the corresponding workspace name. The gotten record information, namely, the record information shown in FIG. 31 is provided for the three workspaces of prior art survey workspace, report writing workspace, and patent writing workspace. Therefore, three schedule bars are displayed corresponding to the workspaces in FIG. 42.

The schedule bar contains hollow and hatched portions; the hollow portion indicates the schedule date and time and the hatched portion indicates the result date and time. The display method is not limited to it and various methods such as inverting and color and intensity changing can be used. Both schedule and result dates and times are fetched from the date and time information concerning the workspaces. The record information on each workspace is shown as a triangular mark below the corresponding schedule bar. The marker and the character string indicating the message are displayed in the corresponding record date and time position.

For example, the user can see the job schedule displayed as in FIG. 42 for grasping the job contents before and after writing of patent 1. Here, assume that the user recalls the document seen in the prior art survey made before writing of patent 1 as the desired document. Then, he or she searches the prior art survey workspace.

Figure 43:
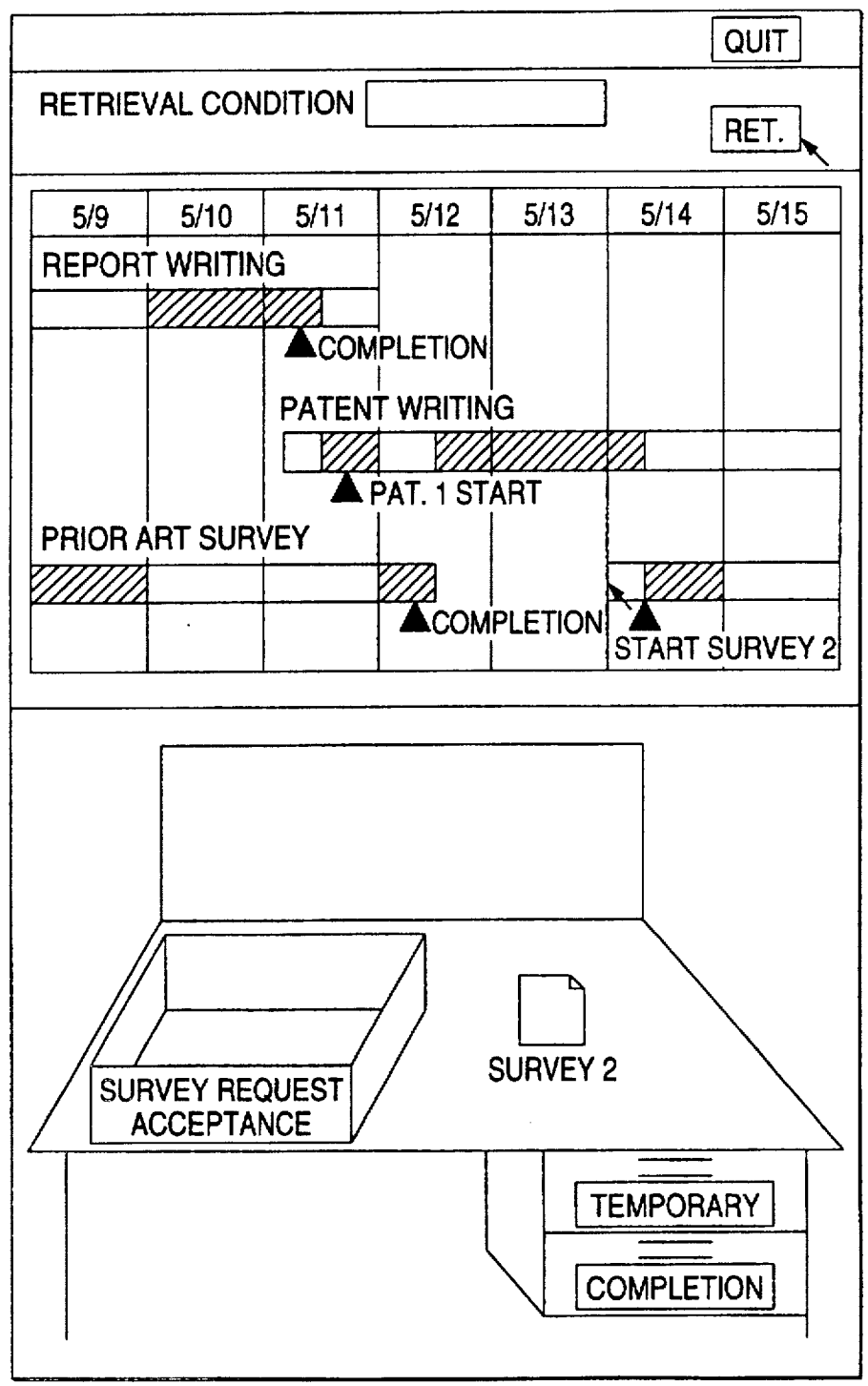
FIG. 43 is an illustration of an example of workspace restoration and display in the time axis retrieval tool.

To find the workspace, the user selects the corresponding schedule bar. The found workspace is displayed in the workspace display area. At this time, the then workspace state is restored and displayed from the most recent record information on and after the date and time corresponding to the position pointed to by the mouse. FIG. 43 is an illustration of an example of workspace restoration and display in the time axis retrieval tool. For example, as shown in FIG. 43, when the user points to the 5/14 position of the schedule bar indicating the prior art survey workspace, the workspace state recorded on 5/14 is restored and displayed. The restored workspace state is the workspace state when survey 2 was started, shown in FIG. 40.

Figure 44:
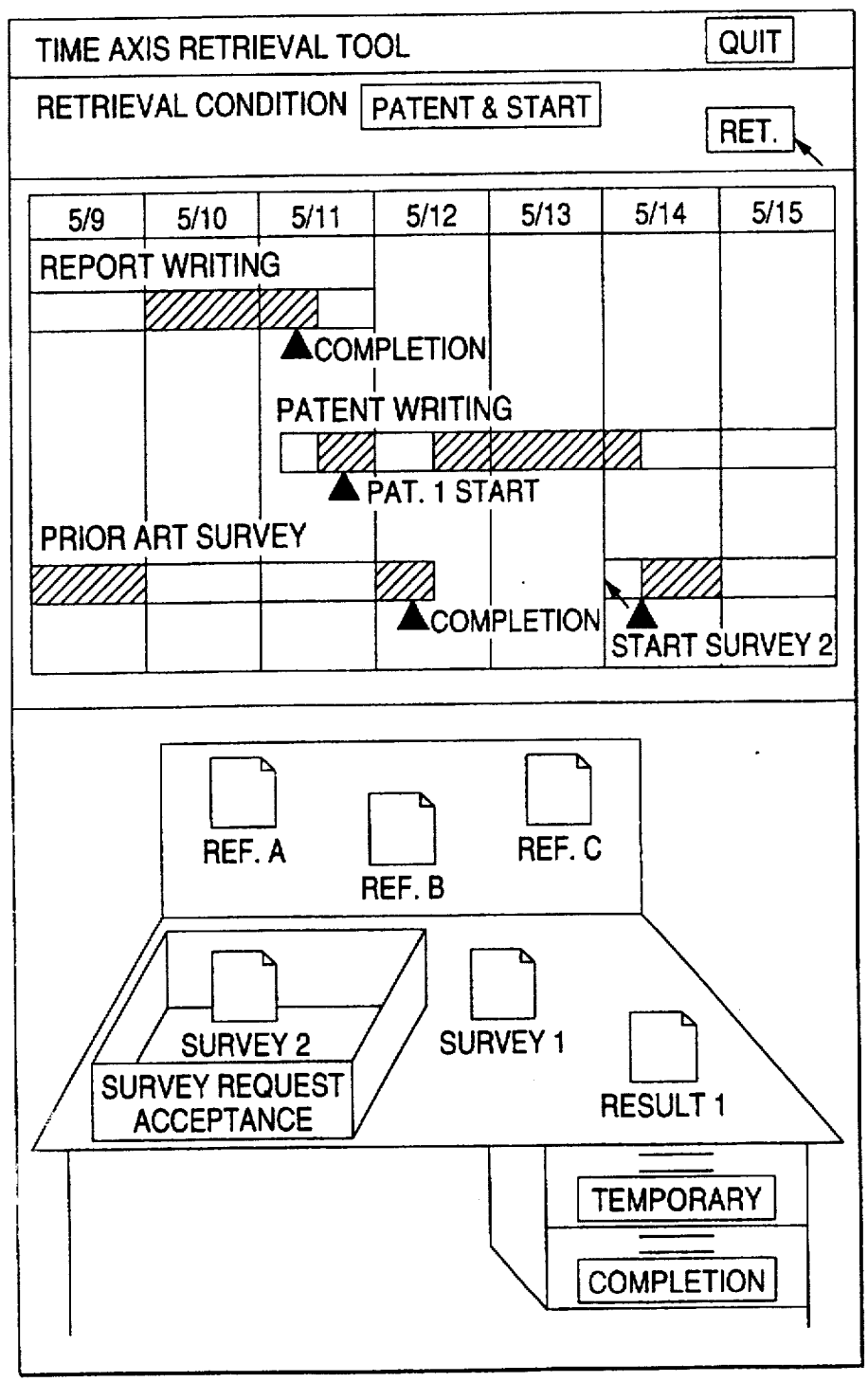
FIG. 44 is an illustration of another example of workspace restoration and display in the time axis retrieval tool.

In the example, the user needs to obtain the workspace state at about the time he or she started writing patent 1. To do this, the user may point to the 5/11 position of the schedule bar indicating the prior art survey workspace. FIG. 44 is an illustration of another example of workspace restoration and display in the time axis retrieval tool. As shown in FIG. 44, as the user points to 5/11, the workspace state is restored and displayed based on the most recent record information on and after the date, namely, the record information recorded on 5/12. The user can find the documents referenced on the date on the workspace and use the mouse to access the desired document. In the retrieval example, the fact that the management section of the job units of the workspaces is provided and that a schedule is managed and displayed in the job units has important meaning. If document names, etc., are not stored, it is difficult to find a desired document although date and time information and document names are directly related to each other for display as in the prior art (Unexamined Japanese Patent Publication (kokai) No. Hei 5-35737). From the right beginning, the fact that what job was executed at what time is more significant as a schedule than the fact that what document was referenced at what time. Generally, for retrieval based on one's vague memory, as one sees relevant information, he or she recalls little by little and the search method changes. Further, it is known that human beings are excellent in memory of rough visual information and the context or the cause and effect relation as compared with computers. The base image presented by the workspace and contextual display of a job on schedule display help human beings to recall effectively.

Since jobs are represented as resource units, the units can be used for work schedule management. A unit summarized for each job is placed on a schedule and can be used as a schedule and record.

Figure 45:
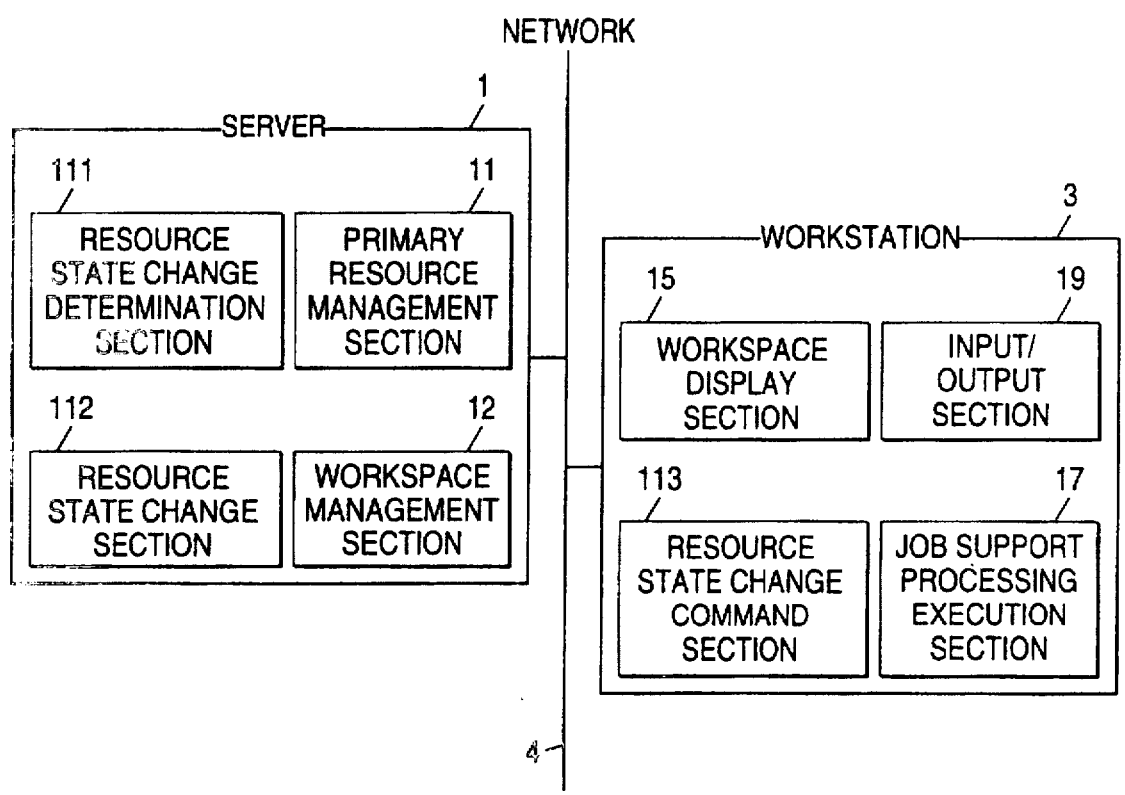
FIG. 45 is a block diagram showing a third embodiment of an information processing system of the invention.

FIG. 45 is a block diagram showing a third embodiment of an information processing system of the invention. Parts identical with or similar to those previously described with reference to FIG. 1 are represented by the same reference numerals in FIG. 45 and will not be discussed again. Reference numeral 111 represents a resource state change determination section; 112, a resource state change section; and 113, a resource state change command section. In the embodiment, a workstation 3 for executing personal work and a file server 1 for handling shared information are connected by a network 4 as an example. However, such a configuration is not necessarily required; for example, the system may be constructed in one computer without using the network 4. The file server 1 manages information used by a plurality of users in common. It contains a primary resource management section 11, a workspace management section 12, the resource state change determination section 111, and the resource state change section 112. The workspace management section 12 collects job relevant resources for management and imparts meaning in each workspace to computer-handled resources such as documents for management. Here, directories are used as a resource management method. Various resources and resource management methods can be used as in the first embodiment. The resource state change determination section 111 is responsive to a command input from the resource state change command section 113 for collating job definition information contained in job relevant information held by the workspace management section 12 with resource administration information and determining whether or not resource state change is enabled. If the resource state change determination section 111 enables resource state change, the resource state change section 112 changes, adds, or deletes resource reference information or resource administration information of the specified resource.

The workstation 3 contains a workspace display section 15, a job support processing execution section 17, an input/output section 19, and the resource state change command section 113. The resource state change command section 113 gives a command to change the resource administration information corresponding to resource reference information or change the area to which a resource belongs for the user to use a workspace to make job progress. The resource state change command can be given by the user in an interactive mode, for example. However, in addition to this form, the command may also be given by a program. It may be given in any of the following manners: The user directly generates, erases, starts, references, edits, or moves a resource; a resource is caused to flow in from the outside or flow out to the outside; the user enters the command or selects it out of a menu; or a script executed by the job support processing execution section 17 is used.

When the resource state is changed, the job support processing execution section 17 interprets and executes the description of processing for supporting the job held in relation to the workspace or area. The workspace holds such a job support processing description in relation to a workspace or a specific area as job relevant information.

The workspace display section 15 displays the resource names or icons corresponding to the resources held in a workspace by using information on the positions of the resources held in relation to jobs or the processing state. It may display them as a two-dimensional or three-dimensional image using a base image or list them by sorting the resource names in alphabetical order or generation date and time order.

To display the state of a resource, the color, form, or font of the resource name or icon for representing the resource may be changed. The processing state may be displayed as an attribute value. The resource name or icon may be displayed in a different area conforming to the processing state for displaying the resource.

Figure 46:
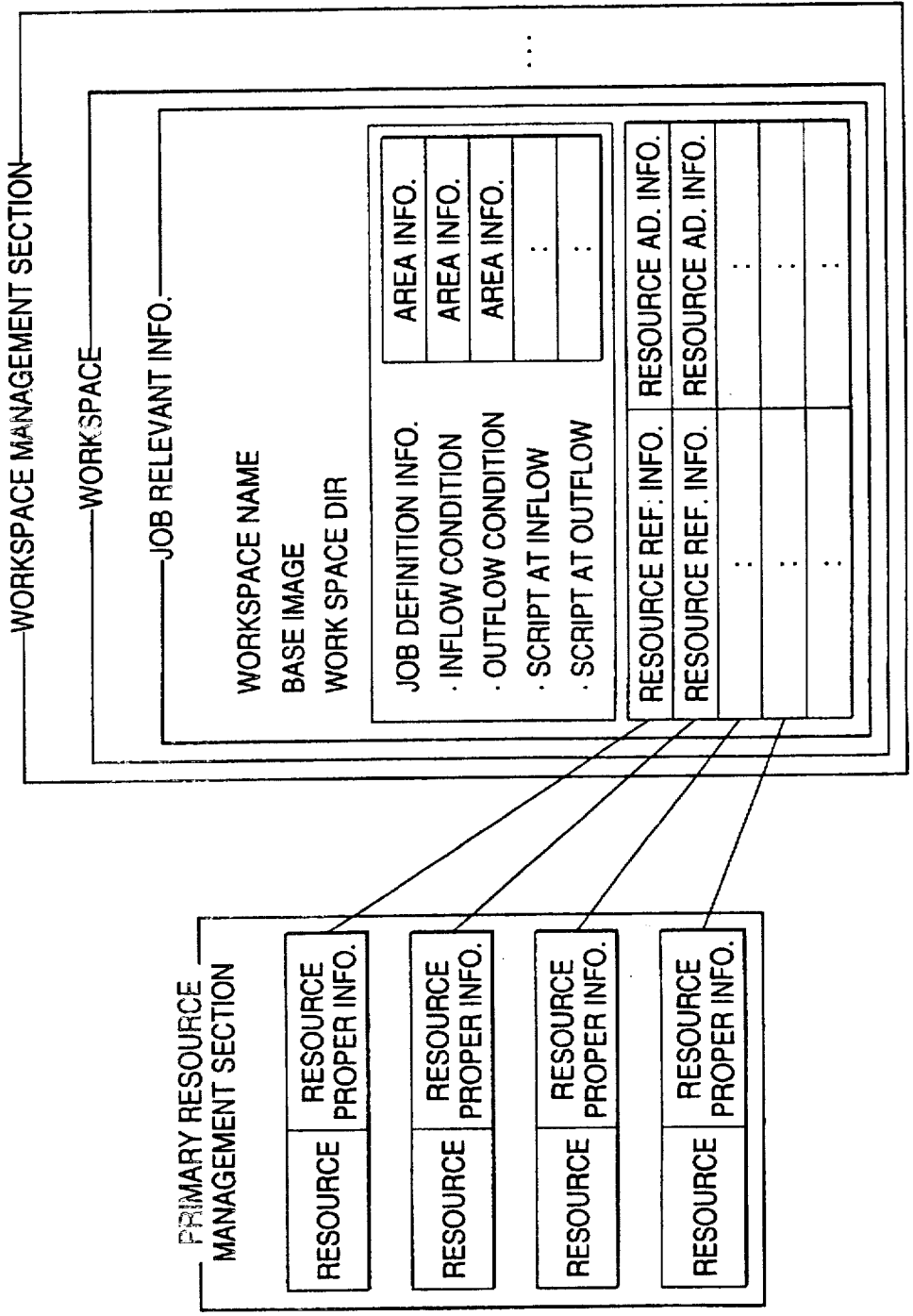
FIG. 46 is a conceptual drawing showing an example of a directory structure in primary resource management section 11 and workspace management section 12 in the third embodiment of the information processing system of the invention.

Next, an example of the data structure used in the third embodiment of the invention will be discussed. The primary resource management section 11 and the workspace management section 12 are provided each as a part of directories of a hierarchical structure as shown in the first embodiment or by a database. FIG. 46 is a conceptual drawing showing an example of the directory structure in the primary resource management section 11 and the workspace management section 12 in the third embodiment of the information processing system of the invention. The primary resource management section 11 manages resources and resource proper information such as the resource names, the creators, the data types, and the creation dates and times, as in the first embodiment. The workspace management section 12 manages one or more workspaces. Each workspace has job relevant information and uses resource reference information for relation to the resources managed by the primary resource management section 11.

FIG. 47 is an illustration of an example of the data structure of the job relevant information in the third embodiment of the information processing system of the invention. As shown in the figure, the job relevant information in the third embodiment can be made up of the workspace name indicating the name of the workspace, a base image, which is base image data, information such as a workspace reference directory, job definition information, and a source list, for example. The specific example shown in FIG. 47 sets "routine processing workspace" as the workspace name, "null" indicating that no base image is used as the base image, and "/workspace/routine job" as the workspace DIR. The job definition information and source list will be discussed below.

FIG. 48 is an illustration of an example of the data structure of the job definition information in the third embodiment of the information processing system of the invention. The job definition information has conditions on inflow (addition) and outflow (deletion) of a resource to and from the workspace, scripts executed when resource inflow and outflow are performed, and a list of areas on the screen when the workspace is displayed. The example shown in FIG. 48 has a condition of resource itself and a condition of the workspace before inflow or after outflow as the resource inflow, outflow condition to, from the workspace. In the specific example, resources whose reference type is "form" are specified as the resource inflow and outflow conditions to and from the workspace. Thus, inflow or outflow of resources whose reference type is not "form" is inhibited. The workspace conditions are not specified and "null" is set in the fields.

In the example shown in FIG. 48, job support processing at the resource inflow and outflow times can be set. Processing to be performed when a command such as resource inflow to or outflow from the workspace, resource generation, erasion, start, reference, or edit, or a resource move to a specific area is given is described in a job support processing program. The specific example shown in FIG. 48 describes job support processing at the resource inflow time to one workspace. If the name of the inflow resource contains "question," a message of "question about ... from ..." is sent to "Aoki" in charge by mail and the resource is moved to an acceptance box area. If the name of the inflow resource does not contain "question," the resource is determined to be a "request," a message of "request for ... from ..." is sent to "Aoki" in charge by mail, and the resource is moved to an acceptance box area.

FIG. 49 is an illustration of an example of the data structure of area information in the job definition information in the third embodiment of the information processing system of the invention. The area information has the area name, which is the name of the area, the position in the workspace, conditions on resource inflow to and outflow from the area, and scripts executed when resource inflow and outflow are performed. The specific example shown in FIG. 49 sets "acceptance box" as the area name and "(5, 30)" as the display position in the workspace. A condition that inflow is enabled if the resource reference type is "form" is set as the resource condition for enabling inflow, and the resource condition for enabling outflow is not set. A condition that resource inflow to the area is enabled for inflow from another workspace or "various format area" is set as the area condition for enabling inflow. A condition that outflow is enabled only if the outflow destination area is "processing area" is set as the area condition for enabling outflow. Further, processing for transmitting a message of "resource has been accepted" to the user causing the resource to flow into the workspace by mail when resource inflow occurs is described as a job support processing program executed when resource inflow to the "acceptance box area" occurs. Processing for transmitting a message of "processing has been accepted" again to the same user by mail is described as a job support processing program executed when resource outflow from the "acceptance box area" occurs.

FIG. 50 is an illustration of an example of the data structure of the resource administration information in the third embodiment of the information processing system of the invention. The resource list in the job relevant information is a resource administration information list. The resource administration information has the placement area on the workspace, the assigned area, resource reference information, which is a pointer to the resource to be referenced, etc. In the specific example shown in FIG. 50, the resource administration information consists of information pieces such as the reference name, which is the name used when the resource is referenced, the reference type, the area to which the resource is assigned, approval or no approval, the placement position on the workspace, the resource creator, reference resource DIR, which is resource reference information, and application started when the resource is referenced. Specifically, "going-out travel expense form" is set as the reference name, "form" as the reference type, "various format area" as the assigned area, null (no approval) as the approval, "(12, 7)" as the placement position, "Aoki" as the creator, "/resources/form/going-out travel expenses" as the reference resource DIR, and "/resources/bin/TextEdit" as the started application when the resource is referenced.

The resource administration information example shown in FIG. 50 contains the resource reference information, which is information for referencing the resource. However, in LO addition, various organization methods can be used in such a manner that the resource reference information is managed separately from the resource administration information and that they are related to each other. To manage the resource reference information separately from the resource administration information, their relation can be changed as desired, whereby the user can easily provide and change the resource administration information indicating the resource state.

Figure 51:
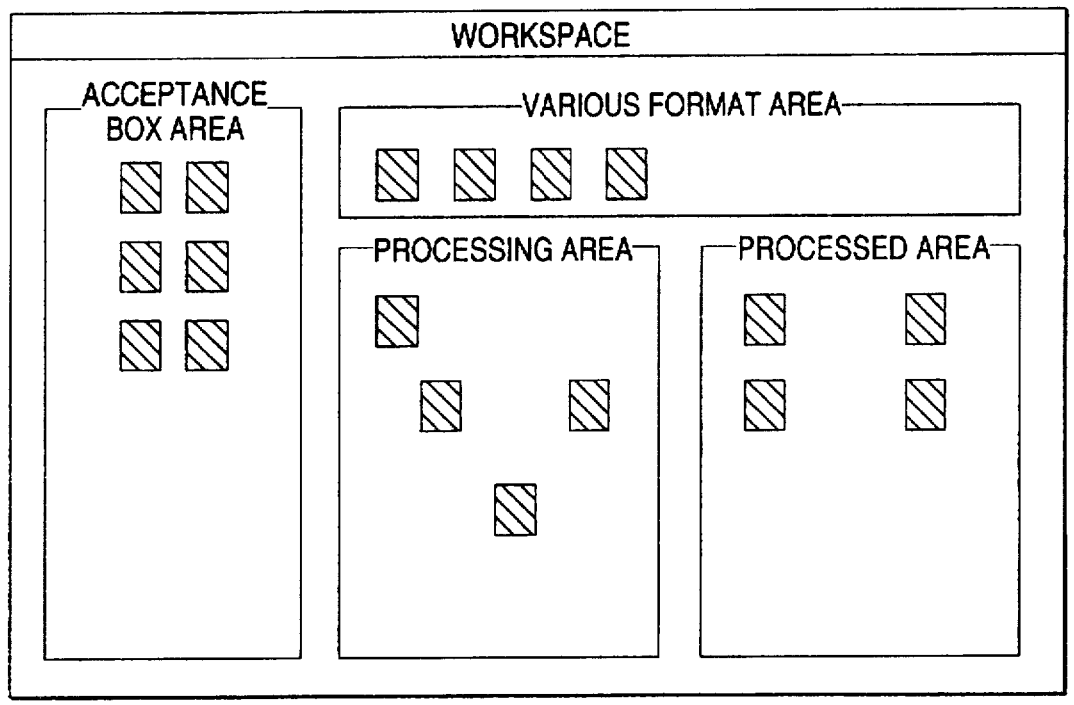
FIG. 51 is an illustration of an example of workspace display in the third embodiment of the information processing system of the invention.

FIG. 51 Is an illustration of an example of workspace display in the third embodiment of the information processing system of the invention. In the example, the various format area, acceptance box area, processing area, and processed area are set on the display screen, and the workspace display section 15 displays the areas and the icons corresponding to the resources assigned to the areas. The example shows the areas by rectangular frames instead of using a base image. Alternatively, such rectangular frames may be used as a base image. A workspace resource may be assigned to one of the areas, no areas, or a plurality of areas at the same time.

Figure 52:
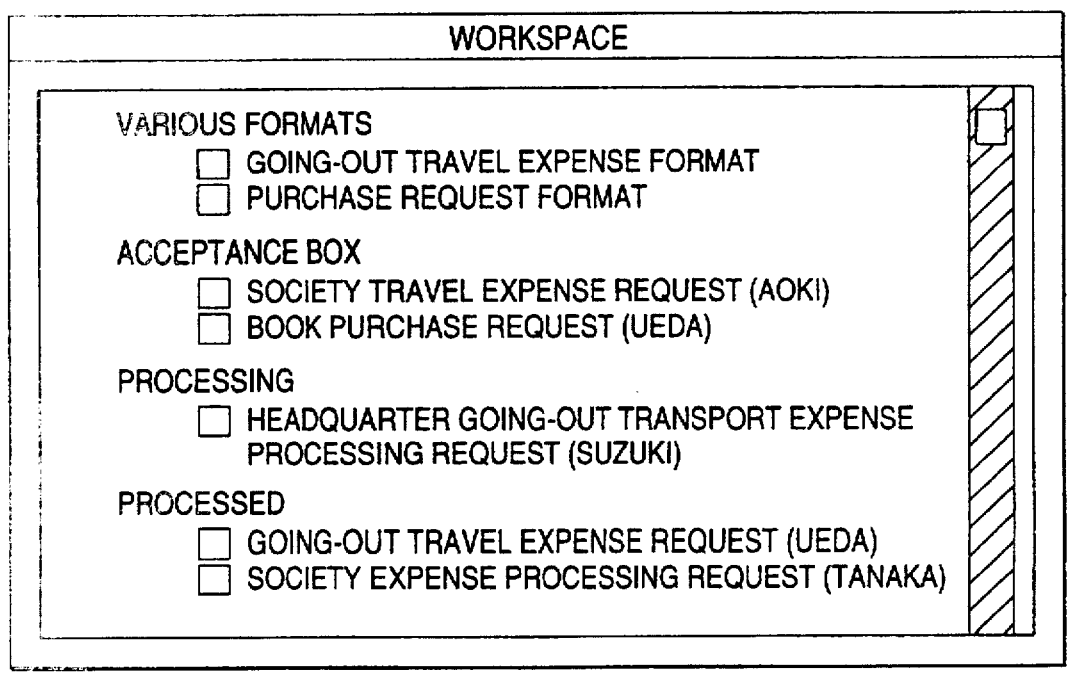
FIG. 52 is an illustration of another example of workspace display in the third embodiment of the information processing system of the invention.

FIG. 52 is an illustration of another example of workspace display in the third embodiment of the information processing system of the invention. In the example, the workspace display is represented by a resource name list. Here, it is classified into the areas such as various formats, acceptance box, processing, and processed, and the resource names are listed under the area name of each area. Alternatively, the resource names may be sorted in alphabetical order or according to the creation dates and times and the assigned areas may be displayed as attributes. The rule as to how the resources are displayed according to the processing state is held in the job relevant information for each workspace.

Figure 53:
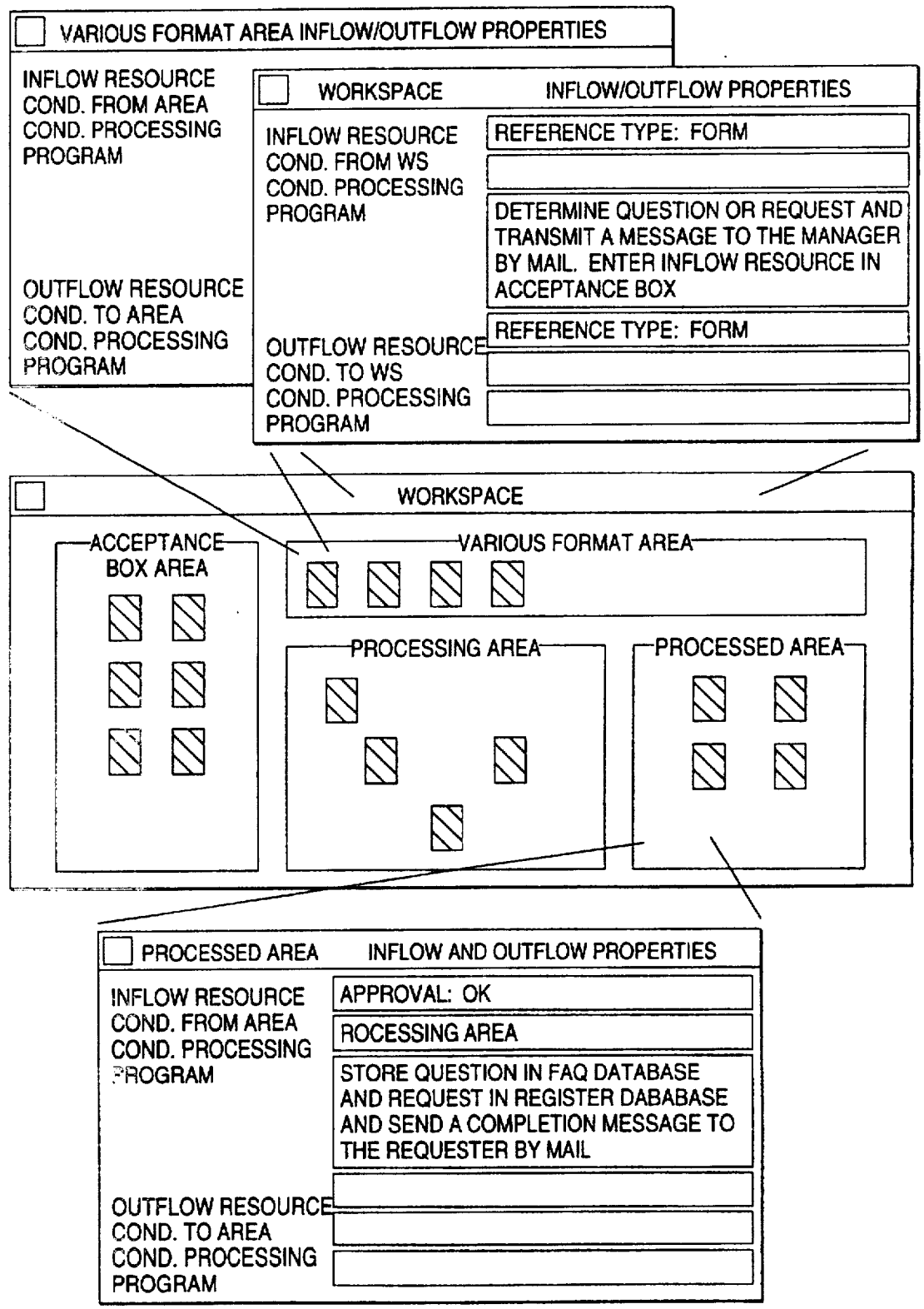
FIG. 53 is an illustration of an example of a screen on which the job definition information for a workspace is being set in the third embodiment of the information processing system of the invention.
Figures 54, 55:
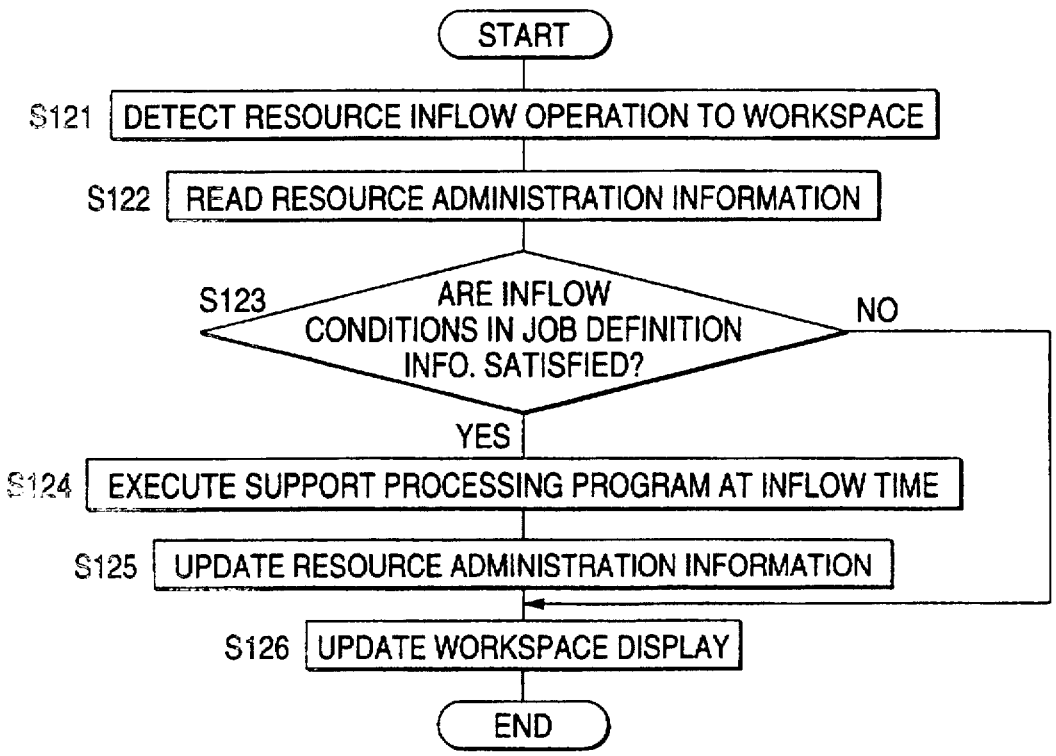
FIG. 54 is an illustration of another example of a screen on which the job definition information for a workspace is being set in the third embodiment of the information processing system of the invention.
FIG. 55 is a flowchart showing an example of the operation at the resource inflow time in the third embodiment of the information processing system of the invention.

Next, an example for setting inflow and outflow conditions to and from a workspace and each area and scripts is given. FIGS. 53 and 54 are illustrations showing an example of a screen on which the job definition information for a workspace is being set in the third embodiment of the information processing system of the invention. The example shows a state in which windows for setting inflow and outflow properties from the various format area, processed area, and workspace pop up on workspace window display as shown in FIG. 51. For convenience, the window for setting the various format area inflow and outflow properties is hidden in the window for setting the workspace inflow and outflow properties, thus is shown in FIG. 54.

In the workspace inflow and outflow property window, the reference type "form" is specified as resource conditions for executing inflow and outflow, whereby only resources with "form" described as the reference type attribute in the resource administration information can be added to and deleted from the workspace. Such use enables only the manager to change, for example, the application, etc., required for the workspace in addition to the form. A processing program at the workspace inflow time determines the question or request form and adds the inflow resource to the acceptance box area. The function is described in FIG. 53. Inflow source and outflow destination workspace conditions are not set. A processing program at the resource outflow time is not set.

As shown in FIG. 54, in the various format area inflow and outflow property window, the reference type "form" is specified as inflow and outflow resource conditions, thereby preventing such careless operation moving the application in another area to the area or the application in the area to another area. A processing program at the outflow time is described so as to copy the document for outflow and cause the copy to flow out. Therefore, if an attempt is made to take out one form from the various format area, the outflow processing program is started and creates a copy of the primary resource pointed to by the form and a reference for referencing the copy and causes the new created reference to flow out. Inflow source and outflow destination workspace conditions and an inflow processing program are not defined.

In the processed area, condition that approval information in the resource administration information is OK is set as the resource condition at the inflow time, and the processing area Is specified as the inflow source area condition. Further, a procedure for storing a question resource in FAQ database and a request resource in register database and transmitting a completion message to the requester by mail is described as the inflow processing program, whereby in the processed area, only resources with the approval attribute OK in the processing area are accepted and at inflow, a question and a request are discriminated from each other and stored in their respective databases, then a completion message is transmitted by mail to the user causing the resource to flow into the workspace. Such condition setting can prevent trouble such that a blank form or an unapproved document is entered in the processed area in error, and smooth job progress can be made.

FIG. 55 is a flowchart showing an example of the operation at the resource inflow time in the third embodiment of the information processing system of the invention. If a resource inflow operation command to the workspace is detected at step S121, the resource administration information is read at step S122. Subsequently, at step S123, a check is made for the resource condition of the inflow condition to the workspace and the inflow source workspace condition in the job definition information. If the inflow is not enabled, the workspace display is restored to the former state at step S126 and the process is terminated. If the inflow is enabled, the job support processing program at the inflow time in the workspace is executed at step S124. The resource administration information is updated at step S125. The workspace is redisplayed at step S126 and the process is terminated.

The operation at the resource outflow time is almost similar to the operation at the resource inflow time described above. A resource outflow command is detected. A check is made for the resource condition of the outflow condition from the workspace and the outflow destination workspace condition in the job definition information. If the outflow is enabled, the job support processing program at the outflow time in the workspace is executed. The resource administration information is updated. The workspace is redisplayed and the process is terminated.

Figure 56:
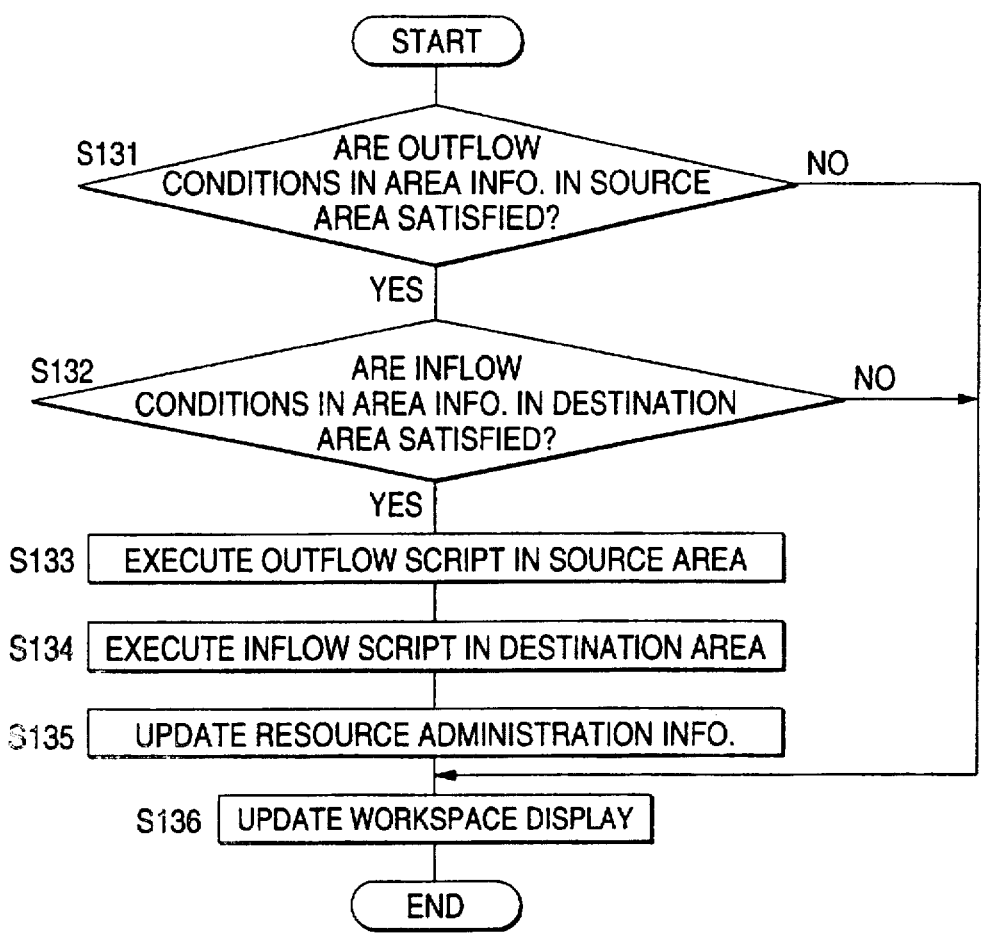
FIG. 56 is a flowchart showing an example of the move operation of a resource from one area to another in the third embodiment of the information processing system of the invention.

FIG. 56 is a flowchart showing an example of the move operation of a resource from one area to another in the third embodiment of the information processing system of the invention. If a move operation command of a resource from one area to another is detected, first at step S131, conditions as to whether or not the resource can be allowed to flow out from the source area and whether or not the destination area is enabled to be the outflow destination are checked. Subsequently, at step S132, conditions as to whether or not the resource can be allowed to flow into the destination area and whether or not the source area is enabled to be the inflow source are checked. If all the conditions are satisfied, at step S133, the outflow script in the source area is started and executed. Further, at step S134, the inflow subscript in the destination area is started and executed. At step S135, the resource administration information is updated. At step S136, the workspace is redisplayed and the process is terminated.

To move a resource from one area in one workspace to one area in another workspace, the outflow operation from the source workspace and the inflow operation to the destination workspace are further performed.

Next, an example of the operation in the third embodiment of the invention will be discussed based on a specific example. Here, an example of using a routine processing workspace for executing routine jobs such as purchase and going-out travel expense adjustment in one department is used. The system configuration Is similar to that in the specific example in the first embodiment of the invention shown in FIG. 16, wherein one file server and one mail server are provided and the users have their respective workstations. Of course, the configuration is not necessarily be required; the user may use the same workstation or personal computer and one workstation may serve as both file and mail servers.

Figure 57:
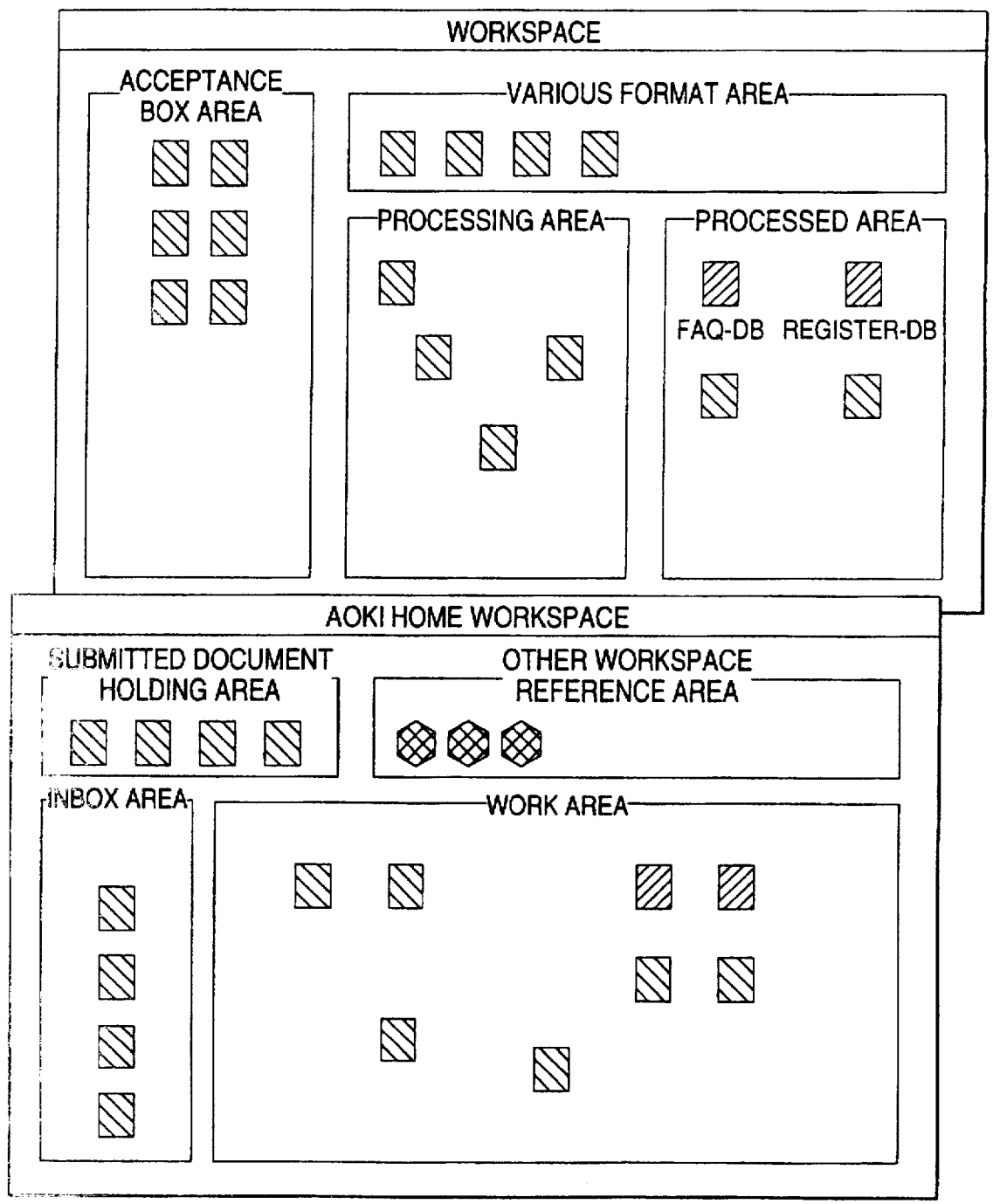
FIG. 57 is an illustration showing a specific screen display example of workspaces in the third embodiment of the information processing system of the invention.

FIG. 57 is an illustration showing a specific screen display example of workspaces in the third embodiment of the information processing system of the invention; it shows a display screen example where the routine processing workspace and an Aoki home workspace are displayed. The routine processing workspace is a shared workspace where entry areas in the format shown in FIG. 51 are displayed. The reference resource icons of a request form for purchase and going-out travel expense adjustment, etc., a question form etc., are displayed in the various format area. Each member in the department uses the workspace in such a manner that he or she takes out a necessary form from the workspace, completes the form, and again causes it to flow into the routine processing workspace.

Assume that the Aoki home workspace is a workspace for Aoki to execute a routine job. It Is provided with a submitted document holding area, an inbox area, a work area, and an other workspace reference area. Aoki views the Aoki home workspace and the routine processing workspace on his own workstation. The information on the workspaces exists in the file server and he will open the workspaces for reference or edit.

Figure 58:
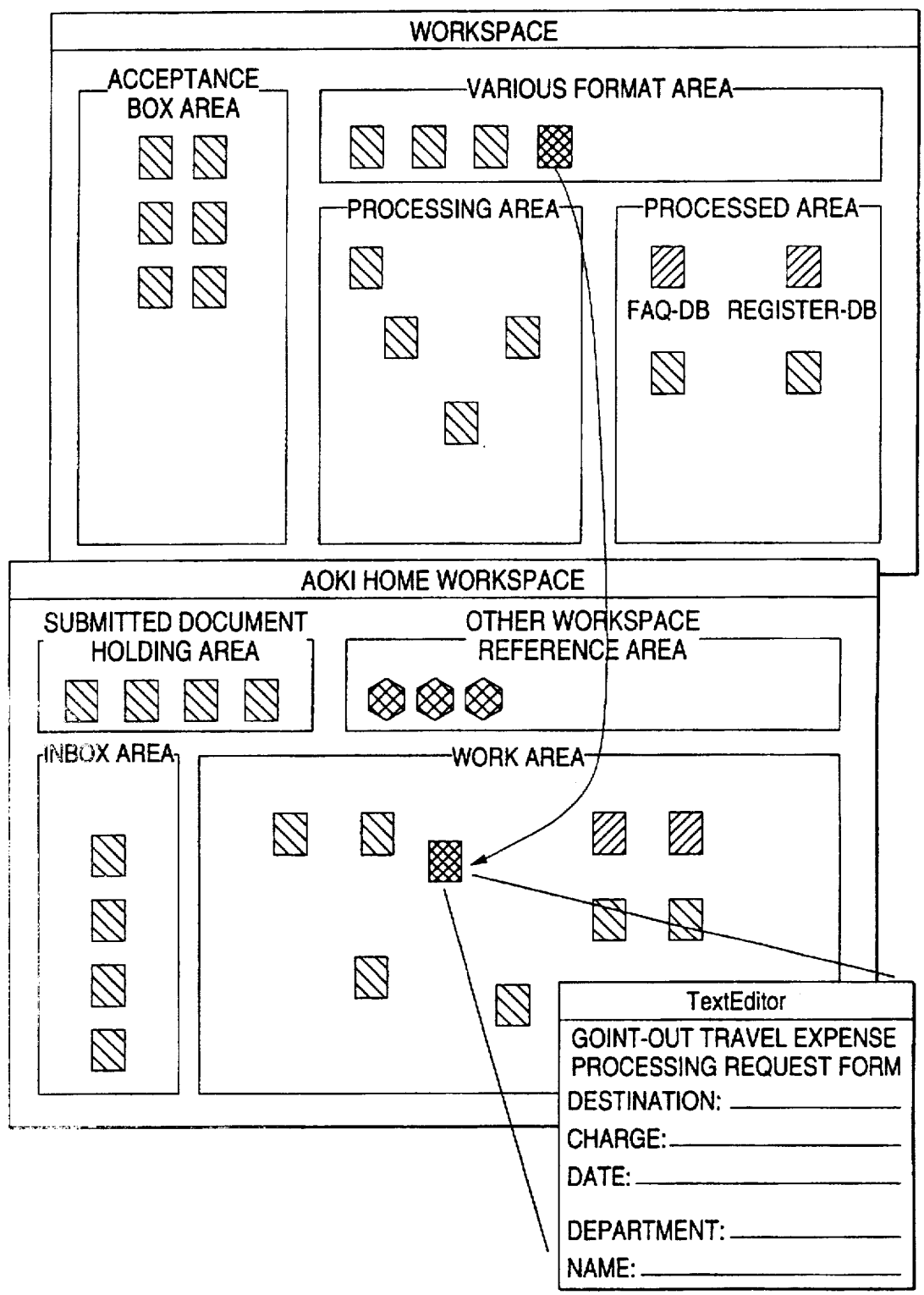
FIG. 58 is an illustration of a scene for copying a form from a routine processing workspace into an Aoki home workspace in the specific example in the third embodiment of the information processing system of the invention.

FIG. 58 is an illustration of a scene for copying a form from the routine processing workspace into the Aoki home workspace in the specific example in the third embodiment of the information processing system of the invention. To adjust going-out travel expenses, first Aoki copies the going-out travel expense form from the routine processing workspace into the Aoki home workspace by using a usually used operation method such as dragging and dropping for giving a copy command.

At this time, first the resource outflow conditions in the various format area in the routine processing workspace are checked. The resource outflow conditions in the routine processing workspace are checked. Further, the inflow conditions in the Aoki home workspace of the inflow destination and the inflow conditions in the work area are checked. If the conditions are satisfied, the job support processing program at the outflow time in the various format area, the job support processing program at the outflow time in the routine processing workspace, the job support processing program at the inflow time in the Aoki home workspace, and the job support processing program at the inflow time in the work area are executed in sequence. After a sequence of processing is performed, the going-out travel expense form is copied into the work area in the Aoki home workspace.

For example, Aoki double clicks the Icon of the going-out travel expense form copied into the work area for giving a reference command, whereby the application described in the resource administration information is executed. For example, if the resource administration information shown in FIG. 50 is set, the text editor (/resources/bin/TextEdit) set as the started application is started. The text editor enables Aoki to complete the going-out travel expense form. FIG. 58 also shows the text editor window.

Figure 59:
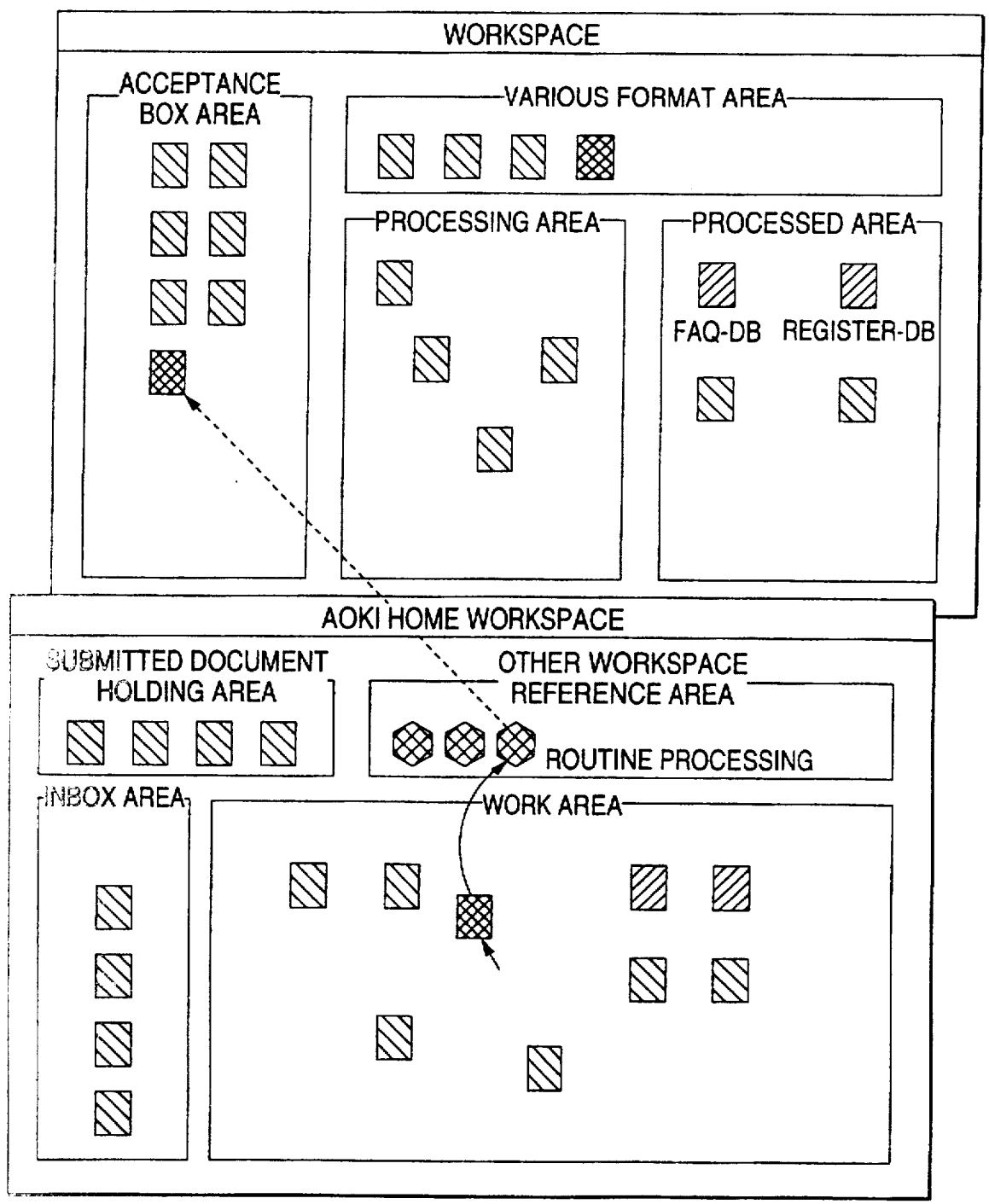
FIG. 59 is an illustration of a scene where the completed form is returned to the routine processing workspace and accepted in the specific example in the third embodiment of the information processing system of the invention.

FIG. 59 is an illustration of a scene where the completed form is returned to the routine processing workspace and accepted in the specific example in the third embodiment of the information processing system of the invention. To return the going-out travel expense form to the routine processing workspace after completing the form by the text editor, Aoki can move or copy the going-out travel expense form from the work area in the Aoki home workspace into the routine processing workspace icon in the other workspace reference area by using a method of dragging and dropping the going-out travel expense form icon in the work area into the routine processing workspace icon in the other workspace reference area.

Then, the outflow conditions in the work area and the Inflow conditions in the other workspace reference area are checked and if the conditions are satisfied, subsequently the job support processing programs at the outflow time and inflow time in the areas are executed. Further, move from the Aoki home workspace to the routine processing workspace is checked and the job support processing program is executed. For example, If the job definition information in the routine processing workspace is set as shown in FIG. 48, the job support processing program at the inflow time transmits a message of "request for going-out travel expenses from Aoki" to the person in charge by mail and places the going-out travel expense form completed by Aoki in the acceptance box area. The person in charge of routine processing can know that the Aoki's going-out travel expense form has flowed into the acceptance box area from the message through the mail from the routine processing workspace.

For the form acceptance operation, for example, a command may be given for direct moving from the work area in the Aoki home workspace to the acceptance box area in the routine processing workspace. In this case, the outflow conditions in the work area and the Aoki home workspace and the inflow conditions in the routine processing workspace and the acceptance box area are checked and the job support processing programs at the outflow time in the work area and the Aoki home workspace and the job support processing programs at the inflow time in the routine processing workspace and the acceptance box area are executed.

Figure 60:
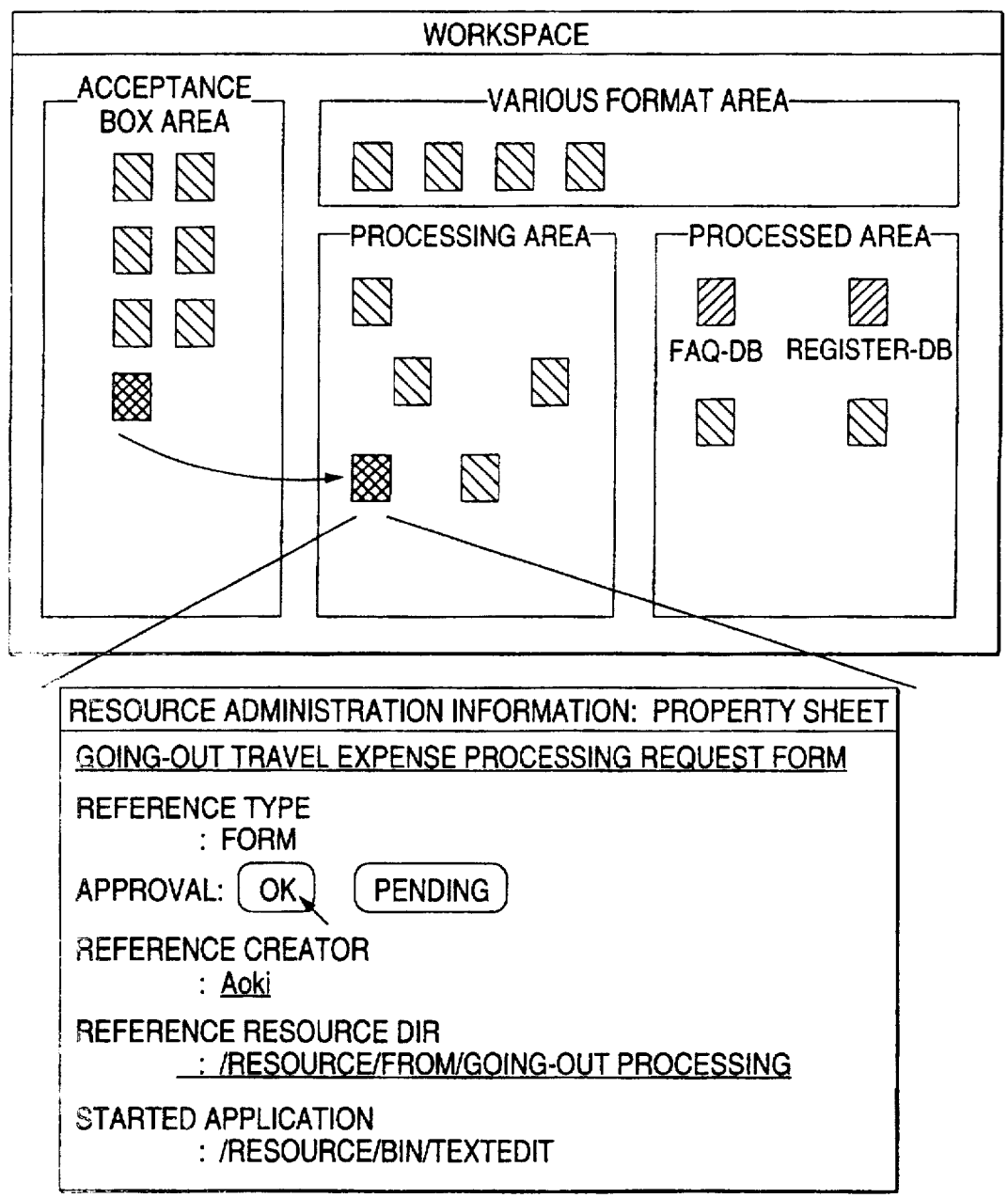
FIG. 60 is an illustration of a scene where the person in charge checks the resource at the reference destination and approves the form in the specific example in the third embodiment of the information processing system of the invention.
Figure 61A:
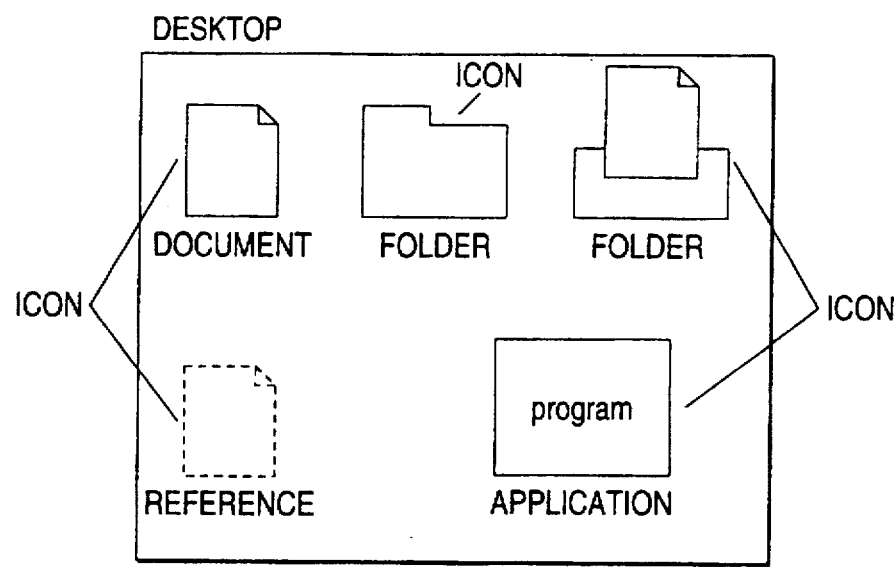
FIGS. 61A and 61B are illustrations of a desktop.
Figure 61B:
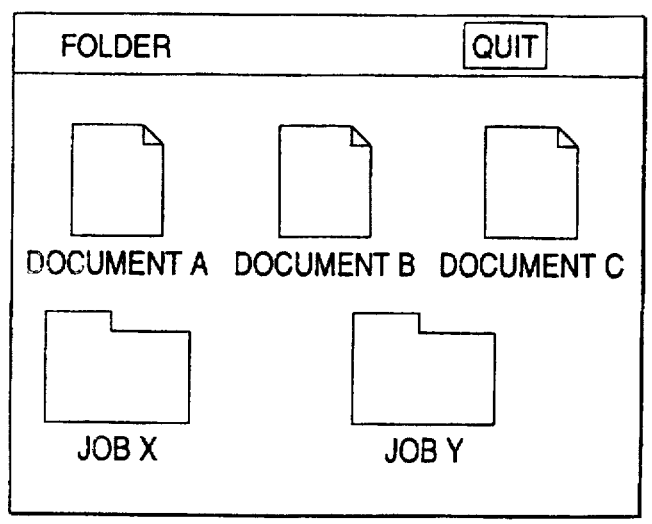
Figure 62A:
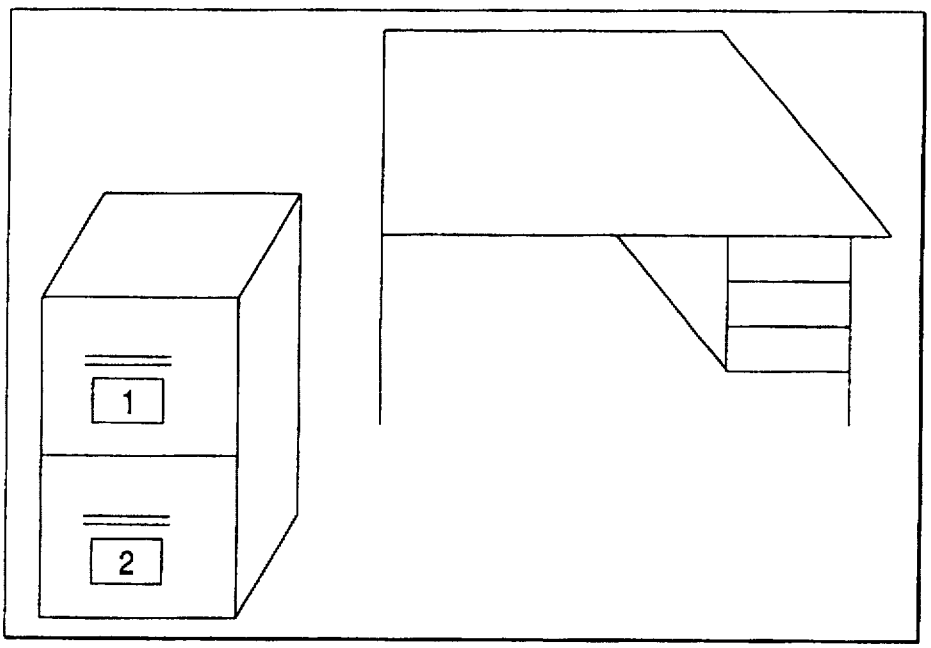
FIGS. 62A and 62B are illustrations of an example of a display screen of a conventional information processing system using drafts.
Figure 62B:
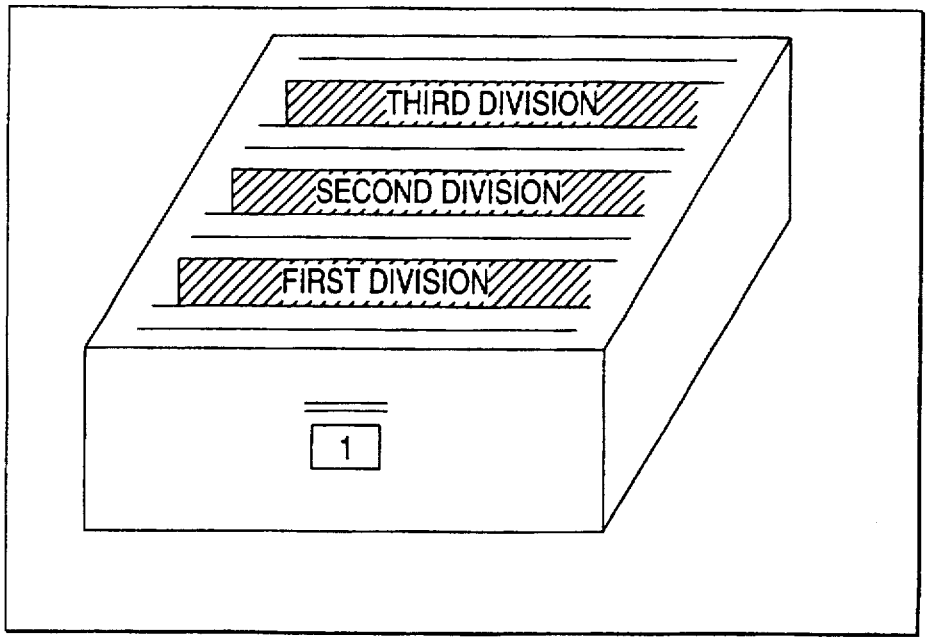

FIG. 60 is an illustration of a scene where the person In charge checks the resource at the reference destination and approves the form in the specific example in the third embodiment of the information processing system of the invention. Viewing the message received through the mail from the routine processing workspace, the person in charge opens the routine processing workspace and moves the going out travel expense form completed by Aoki in the acceptance box area to the processing area to process the Aoki's going out travel expense form. Of course, also at this time, the outflow conditions in the acceptance box area and the inflow conditions in the processing area are checked and the job support processing program at the outflow time in the acceptance box area and the job support processing program at the inflow time in the processing area are executed. For example, when the going-out travel expense form is caused to flow into the processing area, automatically the specified application can also be started for processing the inflow going-out travel expense form. After processing, the person in charge opens the property sheet to change the resource administration information of the going-out travel expense form.

FIG. 60 also shows an example of the resource administration information property sheet window. The resource administration information is displayed on the property sheet and can also be changed. Here, the person in charge changes the attribute "Approval" to "OK" in the resource administration information of the going-out travel expense form.

The person in charge moves the going-out travel expense form to the processed area. The outflow conditions in the processing area and the inflow conditions in the processed area are also checked. For example, whether or not approval is OK in the inflow condition in the processed area is checked, thereby preventing an unprocessed form from flowing into the processed area in error. If the conditions are satisfied, the job support processing program at the outflow time in the processing area and the job support processing program at the inflow time in the processed area are executed in sequence. For example, if the job definition information in the processed area is set as shown in FIG. 53, when the Aoki's going-out travel expense form is moved to the processed area, a processing completion message is sent to Aoki by mail and the going-out travel expense form is stored in the register database.

In the example, the shared workspace on the file server is used to support processing of requests and questions of routine jobs. Each member takes out an entry form of a request, a question, or the like from the workspace, completes the form, and returns it to the workspace. The person in charge responds to the form. This means that each member need not consider who the person in charge Is, and needs only to know the workspace for executing his or her job. The workspace can efficiently support work to be done thereon by checking the inflow and outflow conditions and executing the processing programs.

As seen from the description made so far, improper resource addition or deletion to or from a workspace and improper resource addition or deletion to or from an area on a workspace are limited, whereby resources having nothing to do with job progress can be excluded and careless deletion of necessary resources can be prevented, supporting appropriate processing in the workspace. Further, improper resource state change between areas in a workspace is limited, thereby preparing the way for job progress. An improper resource move between workspaces is limited, whereby resources having nothing to do with job progress can be excluded and processing can be performed in an appropriate way, supporting job execution. When a resource state change occurs, it is detected and automatic job support processing is performed in response to the state change, whereby knowledge for job execution can be embedded and job execution can be supported effectively.

What is claimed is:

1. An information processing system comprising:
   resource reference information storage means for storing resource reference information for referring to a resource used for making progress of a job;
   resource administration information storage means for storing resource administration information indicating a state of the resource reference information changing with the progress of the job in relation to the resource reference information;
   resource condition storage means for storing a resource condition which is a condition for enabling resource reference information to be deleted from said resource reference information storage means in accordance with the resource administration information;
   resource reference information change instruction means for instructing said resource reference information storage means to delete the resource reference information;
   resource reference information change determination means for determining whether or not the resource reference information can be deleted from said resource reference information storage means based on the resource condition stored in said resource condition storage means and the instruction given by said resource reference information change instruction means and the resource administration information of the resource reference information to be deleted; and
   resource reference information change means for deleting resource reference information if said resource reference information change determination means determines that resource reference information can or deleted.

2. An information processing system as claimed in claim 1 further comprising job processing execution means for executing predetermined job support processing relating to the progress of the job as said resource reference information change means deletes the resource reference information.

3. An information processing system as claimed in claim 2 wherein said job support processing is to send a message indicating the resource reference information has been deleted by mail to a user involved in the job.

4. An information processing system as claimed in claim 1 wherein said resource is a document.

5. An information processing system comprising:
   resource reference information storage means for storing resource reference information for referring to a resource used for making progress of a job;
   resource administration information storage means for storing resource administration information indicating a state of the resource reference information changing with the progress of the job in relation to the resource reference information;
   resource condition storage means for storing a resource condition which is a condition for enabling change of the resource administration information stored in said resource administration information storage means in accordance with the resource administration information;
   resource administration information change instruction means for instructing said resource administration information storage means to change the resource administration information;
   resource administration information change determination means for determining whether or not the resource administration information stored in said resource administration storage means can be changed based on the resource condition stored in said resource condition storage means, the instruction issued by said resource administration change instruction means and the resource administration information to be changed; and
   resource administration information change means for changing the resource administration information if said resource administration information change determination means determines that the resource administration information can be changed.

6. An information processing system as claimed in claim 5 further comprising area management means for managing a plurality of areas in which a resource referenced by the resource reference information is displayed in response to the resource state;

wherein said resource administration information contains area information indicating which of the areas managed by said area management means the resource belongs to;

said resource condition storage means stores a condition on which the resource can be moved to one of the areas or a condition on which the resource can be taken out from one of the areas in accordance with the resource administration information;

said resource administration information change instruction means instructs to move the resource between the areas;

if said resource administration information change instruction means instructs to move the resource, said resource administration information change determination means determines whether or not the move is enabled according to the condition stored in said resource condition storage means and the resource administration information of the resource to be moved; and if said resource administration information change determination means determines that the move is enabled, the area information contained in said resource administration information is changed.

7. An information processing system as claimed in claim 6 further comprising:

image information storage means for storing image information indicating a progress state of a job related to the areas managed by said area management means; and display means for superposing the image information stored in said image information storage means on graphics corresponding to resources based on the area information and displaying the resultant image for a user.

8. An information processing system as claimed in claim 5 further comprising job processing execution means for executing predetermined job support processing for job progress as said resource administration information change means changes the resource administration information.

9. An information processing system as claimed in claim 8 wherein said job support processing is to send a message indicating the resource administration information has been changed by mail to a user involved in the job.

10. An information processing system as claimed in claim 6 further comprising job support processing relation means for relating predetermined job support processing for job progress to the areas managed by said area management means; and job processing execution means for executing the job support processing related to the area by said job support processing relation means as said resource administration information change means changes the area information.

11. An information processing system as claimed in claim 5 wherein said resource is a document.

12. A workspace management apparatus comprising:

primary resource management means using resource proper information indicating attributes of resources existing in a computer system for managing resources;

workspace management means for managing area information for managing a plurality of areas on a screen, at least one of the plurality of areas being related to a job support process base information that shows the meaning of the area in a job to the user resource reference information for referring to the resources which are managed by said primary resource management means and used to track progress of the job, and resource administration information related to the resource reference information and indicating the state of resource reference information changing with the progress of the job, the state including area data that specifies the area where an object corresponding to the resource reference information is positioned;

job progress means for changing the area data of the resource administration information to make progress of the job, and job process execution means, when the area data of the resource administration information is changed from or to the value specifying the area related to the job support process, for executing the job support process.

13. A workspace management apparatus comprising:

primary resource management means using resource proper information indicating attributes of resources existing in a computer system for managing the resources;

first and second workspace management means each for managing area information for managing a plurality of areas on a screen, at least one of the plurality of areas being related to a job support process, base image that shows the meaning of the area in a job to the user, resource reference information for referring to the resources which are managed by said primary resource management means and used to track progress of the job, and resource administration information related to the resource reference information and indicating the state of resource reference information changing with the progress of the job, the state including area data that specifies the area where an object corresponding to the resource reference information is positioned;

job progress means for deleting the resource reference information and the resource administration information related to the resource reference information from the first workspace management means and adding resource reference information and resource administration information related to the resource reference information to the second workspace management means so that the resource reference information added to the second workspace management means refers to the resource referenced by the resource reference information deleted from the first workspace management means, and job process execution means, when the area data in the deleted resource administration information in the first workspace management means or the area data in the added resource administration information and the second workspace management means is the value specifying the area related to the job support process, for executing the job support process.

14. A workspace management apparatus comprising primary resource management means using resource proper information indicating attributes of resources existing in a computer system for managing the resources;

first and second workspace management means each for managing
    area information for managing a plurality of areas on a screen, at least one of the plurality of areas being related to a job support process,
    base image that shows the meaning of the area in a job to a user,
    resource reference information for referring to the resources which are managed by said primary resource management means and used to track progress of the job; and
    resource administration information related to the resource reference information and indicating the state of resource reference information changing with the progress of the job, the state including area data that specifies the area where an object corresponding to the resource reference information is positioned;
job progress means for deleting the resource reference information and the resource administration information related to the resource reference information from the first workspace management means and adding resource reference information and resource administration information related to the resource reference information to the second workspace management means so that the resource reference information added to the second workspace management means refers to the resource referenced by the resource reference information deleted from the first workspace management means;
job process execution means when the area data in the deleted resource administration information in the first workspace management means or the area data in the added resource administration information in the second workspace management means is the value specifying the area related to the job support process for executing the job support process;
job result management means for defining relation between said workspace management means with the resource reference information or a resource administration information changed by said job progress means and job result time at which the resource reference information or resource administration is changed to each other for management;
job state record means for relating a specified recording date and time and a state of the resource reference information and a state of the resource administration information at the recording date and time to each other and holding them;
job result display means for displaying the job result time and an object indicating said workspace management means on the time axis in accordance with the relation defined by said job result management means;
specification means for specifying workspace management means and a date and time in accordance with display by said job result display means; and
job record state restoration and display means for retrieving the state of the resource reference information and the state of the resource administration information contained in the specified workspace management means at the specified date and time through said specification means from said job state record means and displaying the retrieval result.

15. An information processing system comprising:
resource reference information storage means for storing resource reference information for referring to a resource used for making progress of a job;
resource administration information storage means for storing resource administration information indicating a state of the resource responsive to progress of the job in relation to the resource reference information;
first workspace management means and second workspace management means each having workspace information storage means for storing workspace management information containing at least an identifier for identifying a pair of said resource reference information storage means and said resource administration information storage means;
resource reference information change instruction means for instructing to add resource reference information for referring to a resource reference by said resource reference information storage means of said first workspace management means to said resource reference information storage means of said second workspace management means;
resource condition storage means for storing a resource condition which is a condition for enabling the resource reference information to be changed in accordance with the workspace management information or resource administration information;
determination means for determining whether or not reference to the resource indicated by said resource reference information change instruction means is enabled based on at least one of the workspace management information in said first workspace management means, the workspace management information in said second workspace management means and resource administration information related to the resource reference information to be changed by the resource reference information change instruction means as well as the resource conditions stored in said resource condition storage means; and
resource reference information change means for adding the resource reference information for referring to the resource referenced by said resource reference information storage means of said first workspace management means to said resource reference information storage means of said second workspace management means if said determination means determines that the reference to the resource is enabled.

16. An information processing system as claimed in claim 15 further comprising job processing execution means for executing predetermined job support processing for job progress as said resource reference information change means adds the resource reference information.

17. An information processing system as claimed in claim 16, wherein said job support processing is to send a message indicating the resource reference information has been added by mail to a user involved in the job.

18. An information processing system as claimed in claim 15, wherein said resource is a document.

* * * * *